US012705721B2

(12) United States Patent
Ziola

(10) Patent No.: US 12,705,721 B2
(45) Date of Patent: Aug. 11, 2026

(54) SYSTEM AND METHOD FOR MODE IDENTIFICATION AND EXTRACTION IN GUIDED WAVE SIGNALS AND NONDESTRUCTIVE METHODS FOR AUTOMATICALLY SENSING, LOCATING, AND/OR CHARACTERIZING PROBLEMS IN STRUCTURES

(71) Applicant: Antech Systems, Inc., Chesapeake, VA (US)

(72) Inventor: Steven Michael Ziola, Centennial, CO (US)

( * ) Notice: Subject to any disclaimer, the term of this patent is extended or adjusted under 35 U.S.C. 154(b) by 457 days.

(21) Appl. No.: 18/300,875

(22) Filed: Apr. 14, 2023

(65) Prior Publication Data

US 2023/0334646 A1 Oct. 19, 2023

Related U.S. Application Data

(60) Provisional application No. 63/388,535, filed on Jul. 12, 2022, provisional application No. 63/331,178, filed on Apr. 14, 2022.

(51) Int. Cl.
*G06T 7/00* (2017.01)
*G01M 3/24* (2006.01)

(52) U.S. Cl.
CPC ............ *G06T 7/0004* (2013.01); *G01M 3/24* (2013.01); *G06T 2207/10132* (2013.01); *G06T 2207/20064* (2013.01); *G06T 2207/20081* (2013.01); *G06T 2207/30108* (2013.01)

(58) Field of Classification Search
CPC ......... G06T 7/0004; G06T 2207/10132; G06T 2207/20064; G06T 2207/20081; G06T 2207/30108; G01M 3/24; G01M 3/243
See application file for complete search history.

(56) References Cited

U.S. PATENT DOCUMENTS

| | | |
|---|---|---|
| 4,482,835 A | 11/1984 | Bar-Cohen et al. |
| 4,581,070 A | 4/1986 | Bar-Cohen et al. |
| 4,582,680 A | 4/1986 | Bar-Cohen et al. |
| 4,674,334 A | 6/1987 | Chimenti et al. |

(Continued)

FOREIGN PATENT DOCUMENTS

| | | |
|---|---|---|
| CN | 102156171 B | 4/2013 |
| CN | 105372330 A | 3/2016 |

(Continued)

OTHER PUBLICATIONS

Structural health monitoring, Lemistre et al 2001 (Year: 2021).*

(Continued)

*Primary Examiner* — Jianxun Yang

(74) *Attorney, Agent, or Firm* — McKinney & Associates, LLC; J. Andrew McKinney, Jr.

(57) ABSTRACT

A system and method are provided herein for determining a characteristic of a guided wave traveling in a structure. The method includes comparing theoretical dispersion curves for the structure and a wavelet transform image of the guided wave to identify a match, which in an embodiment is a cross-correlation. In an exemplary embodiment, the wavelet transform image is a three-dimensional image, and the theoretical dispersion curves are calculated using Lamb mode theory or finite element analysis.

6 Claims, 42 Drawing Sheets

(56) References Cited

U.S. PATENT DOCUMENTS 5,191,796 A 3/1993 Kishi et al.
5,619,423 A 4/1997 Scrantz
5,635,643 A 6/1997 Maji
5,691,476 A 11/1997 Madaras
5,767,410 A 6/1998 Lareau et al.
6,121,856 A 9/2000 Apostolos
6,182,512 B1 2/2001 Lorraine
6,247,367 B1 6/2001 Bar-Cohen et al.
6,363,788 B1 4/2002 Gorman et al.
6,367,328 B1 4/2002 Gorman et al.
6,393,384 B1 5/2002 Anthony et al.
6,420,816 B2 7/2002 Getman et al.
6,595,059 B2 7/2003 Gorman et al.
6,595,061 B2 7/2003 Gorman et al.
6,920,792 B2 7/2005 Flora et al.
7,117,742 B2 10/2006 Kim
7,197,931 B2 4/2007 Kim
7,246,521 B2 7/2007 Kim
7,281,428 B2 10/2007 Kim
7,286,964 B2 10/2007 Kim
7,322,244 B2 1/2008 Kim
7,584,075 B2 9/2009 Kim
7,590,510 B2 9/2009 Kim
7,596,470 B2 9/2009 Kim
7,623,974 B2 11/2009 Cipra
7,743,660 B2 6/2010 Marsh et al.
7,783,433 B2 8/2010 Gordon et al.
7,798,000 B1 9/2010 Murray et al.
7,881,881 B2 2/2011 Giurgiutiu et al.
7,925,455 B2 4/2011 Pado et al.
7,926,349 B2 4/2011 Sargent
7,963,165 B2 6/2011 Sinha
8,042,397 B2 10/2011 Ihn
8,170,809 B2 5/2012 Van Velsor et al.
8,176,786 B2 5/2012 Sohn et al.
8,225,664 B1 7/2012 Sokol et al.
8,290,719 B2 10/2012 Ihn et al.
8,327,709 B2 12/2012 Daraio et al.
8,378,659 B2 2/2013 Scott-Carnell et al.
8,521,453 B1 8/2013 Silverman et al.
8,677,825 B1 3/2014 Dunne
8,996,319 B2 3/2015 Cokonaj
9,020,689 B2 4/2015 Smith et al.
9,201,046 B2 12/2015 Ume et al.
9,444,548 B1 9/2016 Hamory et al.
9,537,677 B2 1/2017 Hines et al.
9,581,570 B2 2/2017 Ceicedo et al.
9,599,576 B1 3/2017 Portune et al.
9,726,618 B2 8/2017 Lowe et al.
10,006,886 B2 6/2018 Campbell
10,054,568 B2 8/2018 Soejima et al.
10,126,274 B2 11/2018 Hall et al.
10,180,410 B2 1/2019 Takahashi et al.
10,234,432 B2 3/2019 Senderos et al.
10,444,202 B2 10/2019 Flynn et al.
10,473,624 B2 11/2019 Philtron et al.
10,488,369 B2 11/2019 Juarez et al.
10,546,207 B2 1/2020 Sundaresan et al.
10,546,371 B1 1/2020 Pyznar
10,571,360 B2 2/2020 Lajnef et al.
10,571,438 B2 2/2020 Berenbaum et al.
10,578,586 B2 3/2020 Ume et al.
10,579,777 B2 3/2020 Ziavras et al.
10,598,635 B2 3/2020 Burks et al.
10,605,631 B2 3/2020 Schenck et al.
10,607,424 B2 3/2020 Batcheller et al.
10,612,996 B2 4/2020 Heo et al.
10,620,166 B1 4/2020 Ko et al.
10,641,710 B2 5/2020 Zaretski et al.
10,641,741 B2 5/2020 Borigo et al.
10,663,370 B2 5/2020 De Baere
10,663,437 B2 5/2020 Cai et al.
10,677,765 B2 6/2020 Raso et al.
10,683,106 B2 6/2020 Minnella
10,697,825 B2 6/2020 Philtron et al.
10,724,994 B2 7/2020 Van Tooren et al.
10,732,066 B2 8/2020 Kruse et al.
10,732,096 B2 8/2020 Denenberg et al.
10,739,314 B2 8/2020 Vinogradov et al.
10,761,067 B2 9/2020 Jack et al.
10,775,351 B2 9/2020 Jhang et al.
10,782,161 B2 9/2020 Silverman et al.
10,794,841 B2 10/2020 Trotta
10,794,867 B2 10/2020 Chung et al.
10,801,316 B2 10/2020 Bardapurkar et al.
10,801,998 B2 10/2020 Giurgiutiu et al.
10,807,621 B2 10/2020 Zhang et al.
10,812,998 B2 10/2020 Kavars et al.
10,823,708 B2 11/2020 Brelati et al.
10,830,665 B2 11/2020 Wu et al.
10,851,947 B2 12/2020 Gong et al.
10,861,147 B2 12/2020 Wang
10,866,149 B1 12/2020 Yoo et al.
10,866,156 B2 12/2020 Kroker et al.
10,866,157 B2 12/2020 Santarone et al.
10,875,661 B2 12/2020 Linde et al.
10,877,003 B2 12/2020 Kessler et al.
10,877,192 B2 12/2020 Bovero et al.
10,908,036 B2 2/2021 Janapati et al.
10,908,077 B2 2/2021 Chattopadhyay et al.
10,909,280 B2 2/2021 Pado et al.
10,914,646 B2 2/2021 Hung et al.
10,914,711 B2 2/2021 De Marchi et al.
10,917,168 B2 2/2021 Huang et al.
10,953,608 B2 3/2021 Jahanbin et al.
10,958,635 B2 3/2021 Lyman et al.
10,962,353 B1 3/2021 Nguyen
10,983,095 B2 4/2021 Giurgiutiu et al.
10,996,203 B2 5/2021 Findikoglu et al.
11,022,429 B2 6/2021 Stull et al.
11,022,436 B2 6/2021 Pialucha
11,022,505 B2 6/2021 Bongards et al.
11,022,561 B2 6/2021 Ziehl
11,035,812 B2 6/2021 Togaru
11,047,829 B2 6/2021 Ducousso et al.
11,060,668 B2 7/2021 Simpson et al.
11,066,920 B2 7/2021 Yao et al.
11,079,357 B2 8/2021 Ihn et al.
11,084,601 B2 8/2021 Abe et al.
11,095,094 B1 8/2021 Chan et al.
11,105,657 B2 8/2021 Soejima et al.
11,119,071 B1 9/2021 Rush, III
11,126,170 B2 9/2021 Wilhelm et al.
11,138,816 B1 10/2021 Bechhoefer
11,144,814 B2 10/2021 Cha et al.
11,150,158 B2 10/2021 Orsak et al.
11,150,221 B2 10/2021 Tamura et al.
11,151,728 B2 10/2021 Chung et al.
11,155,023 B2 10/2021 Dardona et al.
11,169,118 B2 11/2021 Zhang et al.
11,170,070 B2 11/2021 Yi et al.
11,181,439 B2 11/2021 Shiotani et al.
11,181,445 B2 11/2021 Lochry et al.
11,193,890 B2 12/2021 Zaretski et al.
11,193,912 B2 12/2021 Kimura
11,199,524 B2 12/2021 Yu et al.
11,204,244 B2 12/2021 Sato et al.
11,215,481 B2 1/2022 Digonnet et al.
11,219,122 B2 1/2022 Sato et al.
11,221,209 B2 1/2022 Zadok et al.
11,221,284 B2 1/2022 Anderson
11,249,054 B2 2/2022 Burks et al.
11,275,373 B2 3/2022 Thornberg et al.
11,460,450 B2 10/2022 Druet et al.
2001/0006318 A1 7/2001 Getman et al.
2002/0062693 A1 5/2002 Gorman et al.
2002/0088281 A1 7/2002 Gorman et al.
2003/0167141 A1 9/2003 Staszewski
2005/0061076 A1 3/2005 Kim
2005/0075846 A1 4/2005 Kim
2005/0109110 A1 5/2005 Staszewski
2006/0179949 A1 8/2006 Kim
2006/0201252 A1 9/2006 Georgeson et al.
2006/0268263 A1 11/2006 Kim

(56) References Cited

U.S. PATENT DOCUMENTS

2007/0006653 A1 1/2007 Kim
2007/0012112 A1 1/2007 Kim
2007/0225930 A1 9/2007 Kwun et al.
2007/0260425 A1 11/2007 Kim
2007/0260427 A1 11/2007 Kim
2007/0265806 A1 11/2007 Kim
2007/0265808 A1 11/2007 Kim
2008/0011086 A1 1/2008 Kim
2008/0289423 A1 11/2008 Gordon et al.
2009/0049916 A1 2/2009 Sargent
2009/0157358 A1 6/2009 Kim
2009/0192729 A1 7/2009 Pado et al.
2009/0297017 A1 12/2009 Hudgings et al.
2009/0301198 A1 12/2009 Sohn et al.
2010/0132469 A1 6/2010 Giurgiutiu et al.
2011/0231112 A1* 9/2011 Soejima ................. G01N 29/07 702/35
2013/0047731 A1 2/2013 Ume et al.
2014/0172399 A1 6/2014 Ume et al.
2014/0216158 A1 8/2014 Sanabria Martin et al.
2015/0160169 A1 6/2015 Hall et al.
2015/0300995 A1 10/2015 Flynn et al.
2016/0299106 A1 10/2016 Khajeh et al.
2017/0294013 A1 10/2017 Sundaresan et al.
2018/0122060 A1 5/2018 Shirkhodaie et al.
2018/0202612 A1 7/2018 Simpson et al.
2018/0356046 A1 12/2018 Gong et al.
2019/0033263 A1 1/2019 Giurgiutiu et al.
2019/0145241 A1 5/2019 Yao et al.
2019/0271665 A1 9/2019 Ducousso et al.
2019/0291897 A1 9/2019 Minnella
2019/0293458 A1 9/2019 Digonnet et al.
2019/0316903 A1 10/2019 Sato et al.
2019/0353554 A1 11/2019 Mahavadi
2020/0047425 A1 2/2020 Jahanbin et al.
2020/0064128 A1 2/2020 Muggenburg
2020/0141910 A1 5/2020 Kessler et al.
2020/0149878 A1 5/2020 Zadok et al.
2020/0149881 A1 5/2020 Ducousso et al.
2020/0175352 A1 6/2020 Cha et al.
2020/0191754 A1 6/2020 Findikoglu et al.
2020/0198800 A1 6/2020 Linde et al.
2020/0200696 A1 6/2020 Linde et al.
2020/0209103 A1 7/2020 Barmaimon et al.
2020/0215744 A1 7/2020 Dardona et al.
2020/0239162 A1 7/2020 Saito et al.
2020/0247562 A1 8/2020 Stein
2020/0249075 A1 8/2020 Ma et al.
2020/0278463 A1 9/2020 Maeki et al.
2020/0284647 A1 9/2020 Hveding et al.
2020/0292727 A1 9/2020 Hveding et al.
2020/0355575 A1 11/2020 Chapuis et al.
2020/0363304 A1 11/2020 Anderson
2020/0408720 A1 12/2020 Giurgiutiu et al.
2021/0096100 A1 4/2021 Borigo et al.
2021/0096107 A1 4/2021 Borigo et al.
2021/0099196 A1 4/2021 Tang et al.
2021/0148861 A1 5/2021 Giurgiutiu et al.
2021/0156759 A1 5/2021 Donskoy et al.
2021/0172880 A1 6/2021 Bouhrara et al.
2021/0192753 A1 6/2021 Chung et al.
2021/0199621 A1 7/2021 Palladino et al.
2021/0247752 A1 8/2021 Wilhelm et al.
2021/0299997 A1 9/2021 Gurvich et al.
2021/0302372 A1 9/2021 Soejima et al.
2021/0302373 A1 9/2021 Jack et al.
2021/0302375 A1 9/2021 Jack et al.
2021/0302376 A1 9/2021 Jack et al.
2021/0302377 A1 9/2021 Jack et al.
2021/0302378 A1 9/2021 Jack et al.
2021/0302385 A1 9/2021 Jack et al.
2021/0310994 A1 10/2021 Jack et al.
2021/0318191 A1 10/2021 Okulov
2021/0341426 A1 11/2021 Kondoh et al.
2021/0341912 A1 11/2021 Wilhelm et al.
2021/0349058 A1 11/2021 Jack
2021/0354847 A1 11/2021 Zweig
2021/0372969 A1 12/2021 Giurgiutiu et al.
2021/0399658 A1 12/2021 Farhangdoust et al.
2022/0018811 A1 1/2022 Al-Hashmy et al.
2022/0019190 A1 1/2022 Mohamed et al.
2023/0162349 A1* 5/2023 Kempner .................. G06T 7/62 382/128

FOREIGN PATENT DOCUMENTS

CN 108709934 A 10/2018
CN 105527345 B 12/2018
CN 106290566 B 3/2019
CN 107144643 B 11/2019
CN 109406084 B 11/2020
CN 111551630 B 7/2021
CN 111175379 B 8/2022
CN 115201334 A 10/2022
CN 112326786 B 11/2022
DE 2629089 8/2013
DE 102020123975 3/2022
GB 2545044 B 6/2017

OTHER PUBLICATIONS

G. Baumeier et al., "Passive and Active Modal Acoustic Emission (MAE) Technology Demonstrations," pp. 1-50 Part 1, Sep. 29, 2021.

G. Baumeier et al., "Passive and Active Modal Acoustic Emission (MAE) Technology Demonstrations," pp. 51-100 Part 2, Sep. 29, 2021.

G. Baumeier et al., "Passive and Active Modal Acoustic Emission (MAE) Technology Demonstrations," pp. 101-147 Part 3, Sep. 29, 2021.

Antech Systems, Inc., "Autonomous Real Time Crack Imaging for Navy Ship Hull Structures," Navy SBIR 20.4, pp. 1-5, May 22, 2020.

Antech Systems, Inc., White Paper, "Automated Imaging Analysis of Cracks Propagating in Navy Ship Hull Structures," pp. 1-5, Jul. 20, 2020.

Antech Systems, Inc., vol. 2: Technical Volume, "Inspection of Navy Ship Composite Components with Broad Spectrum Active Guided Wave Ultrasound," Navy SBIR 21-1, pp. 1-10, Feb. 16, 2021.

Antech Systems, Inc., "Improved Passive Phased Array Sensor System for Enhanced Health Monitoring of Large Complex Structures," S. Ziola, p. 1, Feb. 26, 2021.

S. Ziola, Antech Systems, Inc., "Enhanced Passive Structural Health Monitoring (SHM) System," SBIR Phase II, p. 1, Feb. 26, 2021.

G. Baumeier et al., Antech Systems, Inc., "Demonstration of Passive MAE System for MSC Structural Health Monitoring," pp. 1-33, Jun. 10, 2021.

G. Baumeier et al., Antech Systems, Inc., "Demonstration of Passive MAE System for NNSY Structural Health Monitoring," pp. 1-37, Jun. 15, 2021.

G. Baumeier et al., "Demonstruction of Passive MAE System for MSC Structural Health Monitoring," pp. 1-18, Aug. 10, 2021.

Antech Systems, Inc., White Paper, "Inspection of Navy Ship Structures with Broad Spectrum Active Guided Wave Ultrasound," pp. 1-5, Aug. 17, 2021.

G. Baumeier et al., "Active Guided Wave Ultrasound Inspection (GWUI) Technology—Conquering Navy Ship Inspection Challenges," pp. 1-16, Sep. 23, 2021.

G. Baumeier et al., "Conquering Navy Ship Corrosion Inspection Challenges with Active Guided Wave Ultrasound Inspection (GWUI) Technology," pp. 1-7, Sep. 23, 2021.

S. Ziola, "Acoustic Monitoring of Aboveground Storage Tanks (ASTs) for Leaks and Bottom Plate Corrosion," 2021 API Storage Tank Conference & Expo, pp. 1-33, Oct. 13, 2021.

G. Baumeier et al., "MSC Pilot Program Using Modal Acoustic Emission (MAE)," ABS Presentation of Preliminary Results, pp. 1-42, Dec. 1, 2021.

(56) References Cited

OTHER PUBLICATIONS

G. Baumeier et al., "Expanding The Advantage of Modal Acoustic Emission (MAE) Technology—Passive and Active MAE Demonstrations," pp. 1-38, Mar. 3, 2022.
Barroso-Romero, Maria, et al., "Wave Mode Identification of Acoustic Emission Signals Using Phase Analysis," Acoustics1, 450-472 (2019).
Gao, Fei, et al., "Damage assessment in composite laminates via broadband Lamb wave," Ultrasonics, vol. 86, May 2018, pp. 49-58.(2018): 49-58.
Hassani, Sahar et al., "Structural Health Monitoring in Composite Structures: A Comprehensive Review," Sensors 22.1, 153 (Dec. 27, 2021), pp. 1-45.
Peng, Ge, et al., "Damage location of two-dimensional structure based on wavelet transform and active monitoring technology of Lamb wave", Nondestructive Evaluation and Health Monitoring of Aerospace Materials and Composites III. vol. 5393. SPIE, 2004, pp. 1-10.
Su, Chenhui, et al. "Damage identification in composites based on Hilbert energy spectrum and Lamb wave tomography algorithm"; IEEE Sensors Journal 19.23 (2019): 11562-11572.
Su, Chenhui, et al., Damage Localization of Composites Based on Difference Signal and Lamb Wave Tomography, Materials 13, 218 (2020), pp. 1-13.
Sun, Hu, et al., "Baseline-free damage imaging for metal and composite plate-type structures based on similar paths," International Journal of Distributed Sensor Networks, vol. 15(4) (2019), pp. 1-14.
Waltisberg, Daniel, et al. "Group velocity estimation of Lamb waves based on the wavelet transform," Ultragarsas (Ultrasound), vol. 63, No. 4, (2008), pp. 35-40.
Wikipedia, Lamb waves.
Zhang, Yuncheng, et al., "An Ultrasonic Reverse Time Migration Imaging Method Based on Higher-Order Singular Value Decomposition." Sensors 22.7 (2022): 2534, pp. 1-17.

* cited by examiner

Waveforms 210W
212W
214W
216W
218W
220W
222W
224W

FIG. 2C

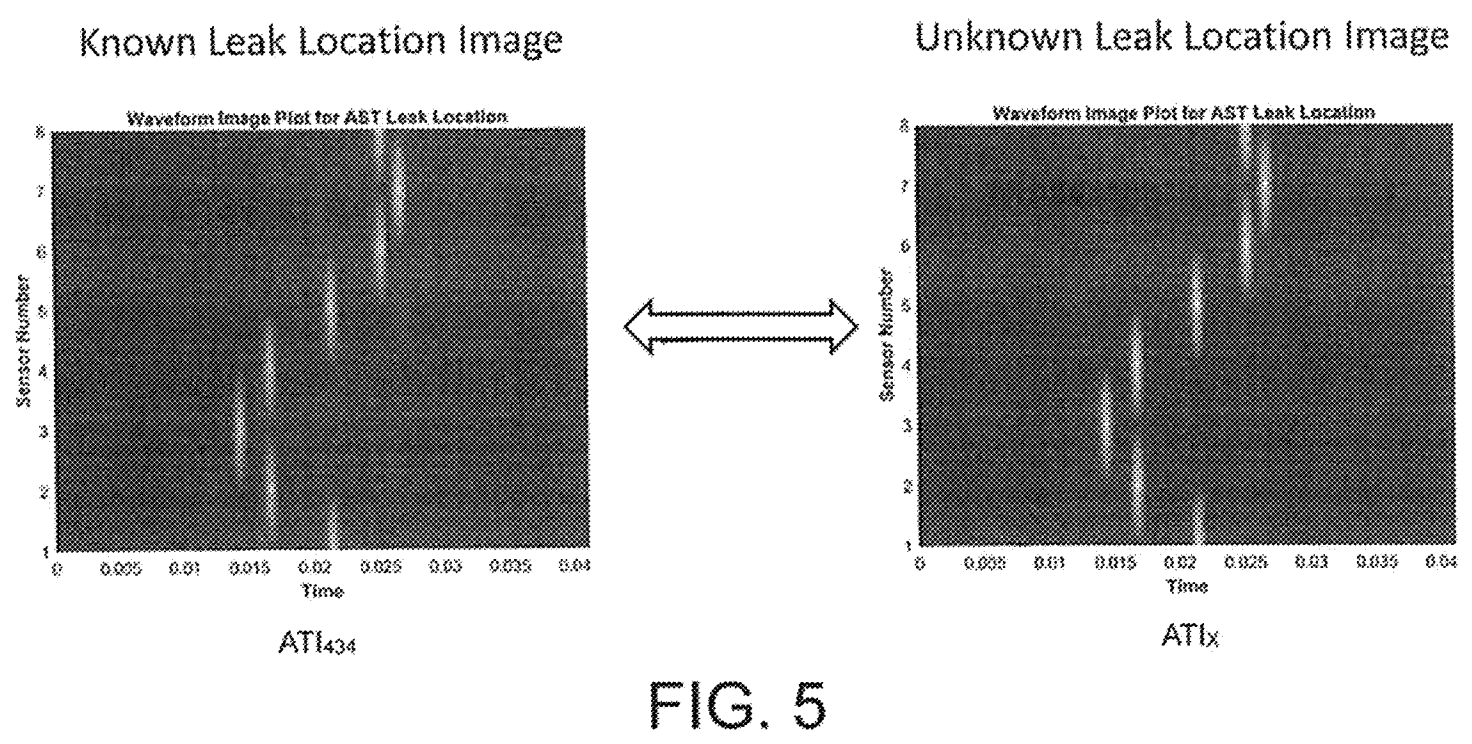

Unknown Leak Location Image

Waveform Image Plot for AST Leak Location

Sensor Number

Time $ATI_x$

Known Leak Location Image

Waveform Image Plot for AST Leak Location

Sensor Number

Time $ATI_{434}$

FIG. 5

SYSTEM AND METHOD FOR MODE IDENTIFICATION AND EXTRACTION IN GUIDED WAVE SIGNALS AND NONDESTRUCTIVE METHODS FOR AUTOMATICALLY SENSING, LOCATING, AND/OR CHARACTERIZING PROBLEMS IN STRUCTURES

CROSS-REFERENCE TO RELATED APPLICATIONS AND CLAIMS OF PRIORITY

This application claims the benefit of priority of U.S. Provisional Application No. 63/331,178 filed Apr. 14, 2022 entitled "Nondestructive Fluid Container Testing and Defect (e.g., Leak or Corrosion) Detection and Evaluation system and Method," and U.S. Provisional Application No. 63/388,535 filed Jul. 12, 2022 entitled "Structural Health Monitoring System and Method for Analyzing Propagating Waves in Structures with Ultrasonic Mode Imaging (UMI)," the complete disclosures of which are incorporated herein by reference and priorities of which are claimed. This invention was made with Government support under contract 80NSSC21C0514 awarded by NASA. The Government has certain rights in this invention.

FIELD

Embodiments disclosed herein relate to systems and methods for automatically sensing, locating, and/or characterizing problems in structures. Certain embodiments disclosed herein relate to non-invasive systems and methods for automatically sensing and locating problems (e.g., leaks, corrosion, etc.) in vessels, containers, pipes, and other structures and structural members, including plates and more specifically to automated sensing of propagating waves to detect structural features by extracting selected wave modes using image cross-correlation.

BACKGROUND

Fluid containers (such as vessels or tanks) and fluid-conveying structures (such as pipes) are widely used in fluid processing facilities and in complex mechanical systems, including but not limited to vehicles such as ships, aircraft, and spacecraft. Early accurate detection of a leak from a flaw in a fluid-containing boundary structural member (e.g., a tank wall, tank bottom, etc.) can prevent environmental troubles, provide positive financial effects, and promote safety.

For example, fuel and other liquids and gases are often stored in large terminal facilities, more specifically in relatively large cylindrical, above-ground storage tanks, which may be made of metal alloys such as steel and other materials. Fuel is often stored in facilities with large metal alloy (e.g., steel) cylindrical storage tanks having substantially circular planar tank bottoms and frustoconical or dome-shaped tops which collectively provide a sealable enclosed volume for storing fuel. The tanks provide protective receptacles which maintain the purity and quality of the contents by protecting the contents from environmental contamination while also protecting the ambient environment from contamination from spilled fuel and other contents. Fuel storage facility operators have an ongoing challenge to prevent fuel (and/or other contents) leaks. Accordingly, early detection and location of fuel (and/or other content) leaks is a priority. A leak can occur anywhere in the tank structure. Often, the bottom of a tank is below grade, meaning that the tank bottom is covered with fuel or sludge (or other contents) in the tank interior and the exterior of the tank bottom is ordinarily below ground and may be substantially inaccessible for human inspection.

A number of systems have been designed to detect problems in fluid filled containers, such as those disclosed in U.S. Pat. Nos. 6,367,328 and 10,598,635. Those systems have found some acceptance in the marketplace, but do not meet all of the automatic sensing needs of current users hoping to automatically locate and characterize flaws in container walls such as tank walls or bottoms.

Commercially available Finite Element Analysis ("FEA") software tools, such as ABAQUS™, ANSYS™, COMSOL™, and POGO, and several NASA-developed software tools, such as the 3D Elastodynamic Finite Integration Technique (EFIT) code, the 3D Lebedev finite difference (LFD) scheme, and the 3D Rotated Staggered Grid (RSG) finite difference method, have been used for modeling propagation of guided waves ("GWs") in structures. For analysis of measured signals, generally practitioners rely on evaluation of 2D waveform plots to identify lower order wave modes and amplitudes.

Efforts to automatically analyze propagating waves captured from flaw growth in structures for source location and severity have been attempted for decades. The results have been unspectacular. The shortcomings of known propagating wave analysis is attributable to the nature of wave propagation of GWs in a structure. The wave propagation of GWs is complex due to reflections and interactions with structural features such as boundaries, notches, stiffeners, and thickness changes. Further, known propagating wave analysis methods cannot adequately handle the extra variables that are not encountered when relying upon bulk mode/non-dispersive (phase velocity) media, i.e., 2D time/amplitude analysis methods.

Applicant has identified a need for a more accurate, reliable, and economical, non-destructive, non-invasive system and method for automatically locating and characterizing defects in structures, such as fluid container structural members and fluid processing structures, as well as structural members such as plates.

SUMMARY

This Summary is provided to introduce a selection of representative concepts in a simplified form, which representative concepts are further described below in the Detailed Description of Exemplary Embodiments. This Summary is not intended to identify key features or essential features of the claimed subject matter, nor is it intended to be used to limit the scope of the claimed subject matter.

According to a first aspect, a method for determining a characteristic (e.g., mode, first arrival, etc.) of a guided wave traveling in a structure. The method includes comparing theoretical dispersion curves for the structure and a wavelet transform image of the guided wave to identify a match, which in an embodiment is a correlation.

A second aspect, a system is provided for determining a characteristic of a guided wave traveling in a structure. The system includes a processor operatively connected with program code embodied on a non-transitory, computer-readable medium to compare theoretical dispersion curves for the structure and a wavelet transform image of the guided wave to identify a match, which in an embodiment is a correlation.

In accordance with a third aspect, a method is provided for detecting a signal propagating in a structure using a sensor positioned on the structure, the signal emanating from and/or interacting with a defect in the structure. A waveform of the signal is converted to a wavelet transform image. The wavelet transform image is compared to a plurality of theoretical dispersion curve images associated with the structure to find a match, which in an embodiment is a correlation.

A fourth aspect, a system is provided for detecting a signal propagating in a structure using a sensor positioned on the structure, the signal emanating from and/or interacting with a defect in the structure. The system includes a processor operatively connected to program code embodied on a non-transitory, computer-readable medium to convert a waveform of the signal to a wavelet transform image, and compare the wavelet transform image to a plurality of theoretical dispersion curve images associated with the structure to find a match, which in an embodiment is a correlation.

Through the use of an image cross-correlation process, identification of the wave modes in a guided wave signal can now be automated without the use of assumptions—that has never been done to a high degree of robustness because of the complexity of the guided wave in 2D space. The Lamb mode dispersion curves, when calculated using either Lamb mode theory for simple plates, or FEA for complex plates, contain all of the propagation characteristics of the wave in that structure in the image—so an entirely new process for waveform analysis is provided. When cross-correlated with the wavelet transform of an unknown signal, the correlation automatically identifies the wave propagation characteristics in the Lamb mode dispersion curves contained in the sensed or detected (unknown) signal, and to what degree. This is done without assumptions and in a deterministic fashion, i.e., causally determined and not subject to random chance or choice. It also overcomes reflections that can cause erroneous results in the analysis of an unknown signal. By doing so, we can now identify the criticality of sources to a much higher degree from the information contained in the modes of the waveform. This application describes exemplary uses for image enhancement to guided wave wavelet transform images, and the use of the cross-correlation of individual wave modes to identify the first arrival of a signal that contains reflections.

Other aspects of the invention, including apparatus, devices, systems, sub-systems, assemblies, sub-assemblies, kits, processes, methods, and the like, which constitute part of the invention, will become more apparent upon reading the following detailed description of the exemplary embodiments.

BRIEF DESCRIPTION OF THE SEVERAL VIEWS OF THE DRAWINGS

The accompanying drawings are incorporated in and constitute a part of the specification. Features shown in the drawings are meant as illustrative of only some embodiments, and not of all embodiments, unless otherwise explicitly indicated.

FIG. 2C is a compilation of graphs of acoustic signals detected by the sensors of the sensor array of FIGS. 2A and 2B according to an embodiment.

FIG. 5 shows a comparison of a 3D image representation of acoustic signals of a known leak location (left image) and a 3D image representation of acoustic signals of an unknown leak location (right image), in which time is plotted on the horizontal axis and sensor number is plotted on the vertical axis.

DETAILED DESCRIPTION OF EXEMPLARY EMBODIMENTS

It will be readily understood that the components, structures, and features of the present embodiments, as generally described and illustrated in the Figures incorporated herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "an embodiment," "an exemplary embodiment," "one embodiment," or "at least one embodiment" means that a particular feature, structure, or characteristic described in connection with the embodiment is included in at least an embodiment. Thus, appearances of the phrases "a select embodiment," "an embodiment," "an exemplary embodiment," "in one embodiment," "in at least one embodiment" and the like in various places throughout this specification are not necessarily referring to the same embodiment or different embodiments. The various embodiments may be combined with one another in various combinations, and features of one embodiment may be applied as modifications to other embodiments, as would be understood to those skilled in the art having reference to this disclosure.

The features and advantages described herein will become apparent upon consideration of the following detailed description of exemplary embodiments, particularly when taken in conjunction with the accompanying drawings. The illustrated embodiments will be best understood by reference to the drawings, wherein like parts are designated by like numerals throughout. The following description is intended only by way of example, and illustrates certain selected embodiments of systems, processes, and apparatuses that are consistent with the certain selected embodiments.

As discussed above in the Background, storage tanks provide protective receptacles which maintain the purity and quality of the contents by protecting the contents from environmental contamination while also protecting the ambient environment from spills. For example, fuel storage facility operators have an ongoing challenge to prevent fuel leaks.

Figure 1:
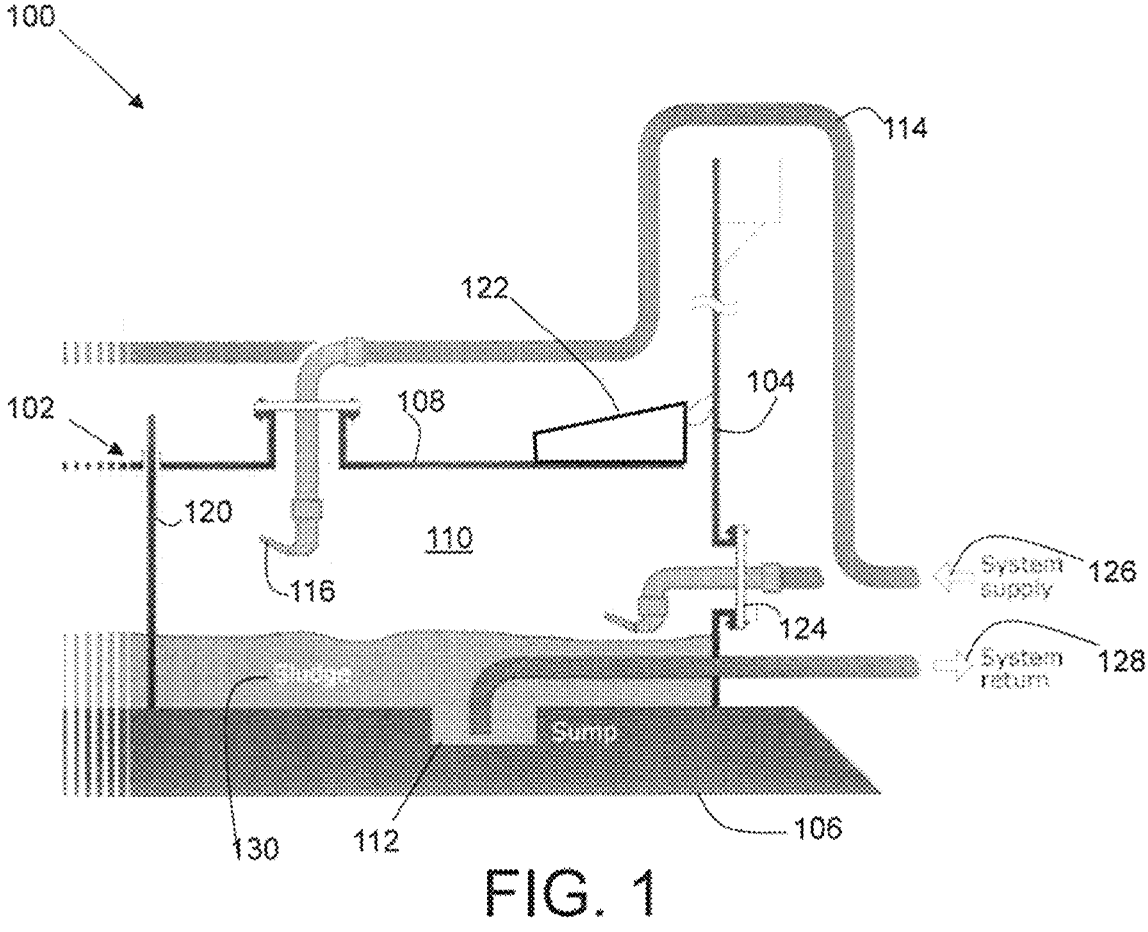
FIG. 1 is sectional, fragmented side view of a fluid processing facility including a storage tank according to an exemplary embodiment.

An example of a fluid processing facility according to an exemplary embodiment is generally designated by reference numeral 100 in FIG. 1. The fluid processing facility 100 includes a storage tank generally designated by reference numeral 102. The storage tank 102 includes a cylindrical tank side wall 104, a substantially circular planar tank bottom (also referred to herein as a bottom wall) 106, and a fixed or removable top 108 which collectively establish a sealed or sealable enclosed volume 110. The tank bottom 106 includes a sump 112. Other components shown in FIG. 1 include a hairpin pipe 114, a nozzle 116, additional nozzles (not shown), a support leg 120, a pontoon 122, a manhole 124, a system supply 126, and a system return 128. Reference numeral 130 represents a solid and/or semi-solid (e.g., fuel deposits or sludge) collected on an upper surface of the tank bottom 106 and against an inner surface of the cylindrical tank wall 104. Although the tank 102 is characterized as a storage tank, it should be understood that the tank 102 may serve purposes other than storage or in addition to storage.

Exemplary embodiments described herein provide accurate, reliable, and economic systems and methods for locating (e.g., automatically locating) and/or characterizing defects (e.g., leaks, breaches, corrosion, etc.) in a fluid container, such as tank 102, including structural members thereof, such as the tank bottom 106 and other plate members.

Passive Acoustic Leak Detection and Location

According to certain exemplary embodiments, systems and methods are provided that permit passive acoustic detection (e.g., automated detection) and location of a leak in a tank non-invasively and non-destructively, thereby providing an economical system which reduces or eliminates reflection and noise problems.

Early detection and location of the source of fuel leaks in the tank 102 is a priority, at least for Applicant. A leak can occur anywhere in the structure of the storage tank 102. Often, the source of the leak is in a relatively inaccessible locations, such as the bottom wall 106 or interior bottom surface covered with fluid and/or solid (e.g., fuel or sludge) 130, or a portion of the tank bottom 106 or side wall 104 that is buried or otherwise substantially inaccessible, e.g., a below-grade tank area.

The undesired flow of leaking fluids (e.g., fuel or other liquids) passing through a breach, crack, hole, or the like in a tank wall (e.g., 104) or bottom (e.g., 106) generate mechanical energy in the form of sound waves which propagate into the fluid stored and within and through and the tank wall (e.g., 104) or bottom (e.g., 106). A number of technical challenges prevented prior efforts from using sound waves in the fluid to locate the exact position of the leak, including problems with sensed internal sound wave reflections, which, along with external noise, frustrated prior efforts to accurately estimate the location of the leak. In exemplary embodiments, sensors are positioned and monitored in a manner which allows each sensor's signal (amplitude as a function of time) to be stored, plotted and compared so that leak locations are pinpointed with a new form of image analysis.

In accordance one or more exemplary embodiments, a system and method for passive acoustic leak detection includes placement of a plurality of acoustic energy sensors arrayed on at least the cylindrical outer or external surface of the tank wall (with no sensors needing to be placed within the tank, although placement of such sensors within the tank not necessarily being precluded by the scope of embodiments described herein). In the embodiment(s), the structure of the tank 102 is employed as a very sensitive hydrophone for leak detection. For example, in the event a leak is present in the bottom 106 of the tank 102, the fluid flow from the leak through the tank defect creates sound waves which propagate into the fluid and through the fluid to arrayed sensors on the exterior surface of the tank wall 104.

Figure 2A:
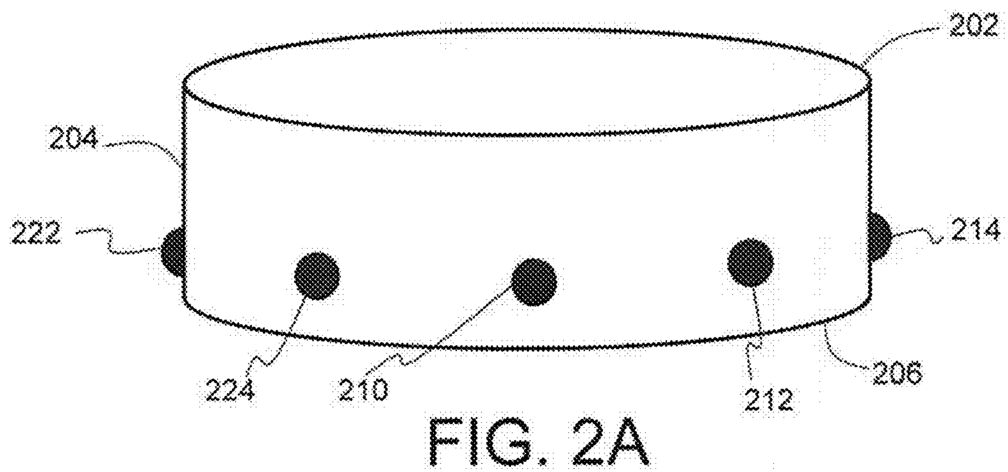
FIG. 2A is a front perspective view of a storage tank including a plurality of sensors (or a sensor array) according to an exemplary embodiment.
Figure 2B:
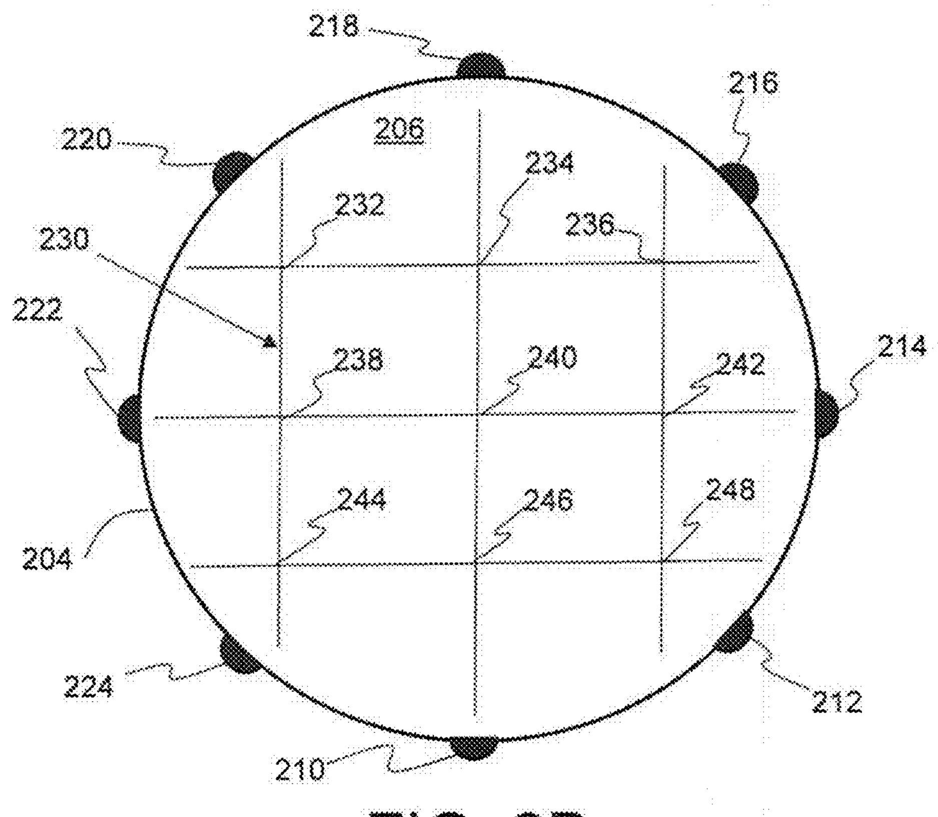
FIG. 2B is a schematic overhead view of the storage tank of FIG. 2A showing the positioning of the sensors of the exemplary embodiment.

A side perspective view and an overhead view of an example of an array of sensors is shown in FIGS. 2A and 2B, respectively. Referring to FIGS. 2A and 2B, a tank 202 is provided having a cylindrical configuration. The tank 202 includes a cylindrical side wall 204 and a circular bottom wall 206. It should be understood that the tank 202 of this and other exemplary embodiments described herein may have shapes other than those of a cylinder.

The tank 202 includes an array (or a plurality) of sensors 210, 212, 214, 216, 218, 220, 222, and 224, which are numbered progressively from the bottom of FIG. 2B in a counterclockwise direction. Although the tank 202 is shown with eight sensors, it should be understood that the tank 202 may be equipped with other quantities of sensors. In an exemplary embodiment, adjacent sensors 210, 212, 214, 216, 218, 220, 222, and 224 are circumferentially equal distantly spaced from one another. In an embodiment, the sensors 210, 212, 214, 216, 218, 220, 222, and 224 are positioned at the same height as one another along the tank wall 204. The liquid level in the tank 202 is preferably equal to or greater than the height of the sensors 210, 212, 214, 216, 218, 220, 222, and 224. The quantity of sensors, materials used for the sensors, array size and geometry, and analysis routines can be adjusted by those skilled in the art having reference to this specification to adjust to tanks of different dimensions (e.g., length, width, thickness) and different materials (e.g., steel, aluminum, composite, etc.).

Figure 2C:
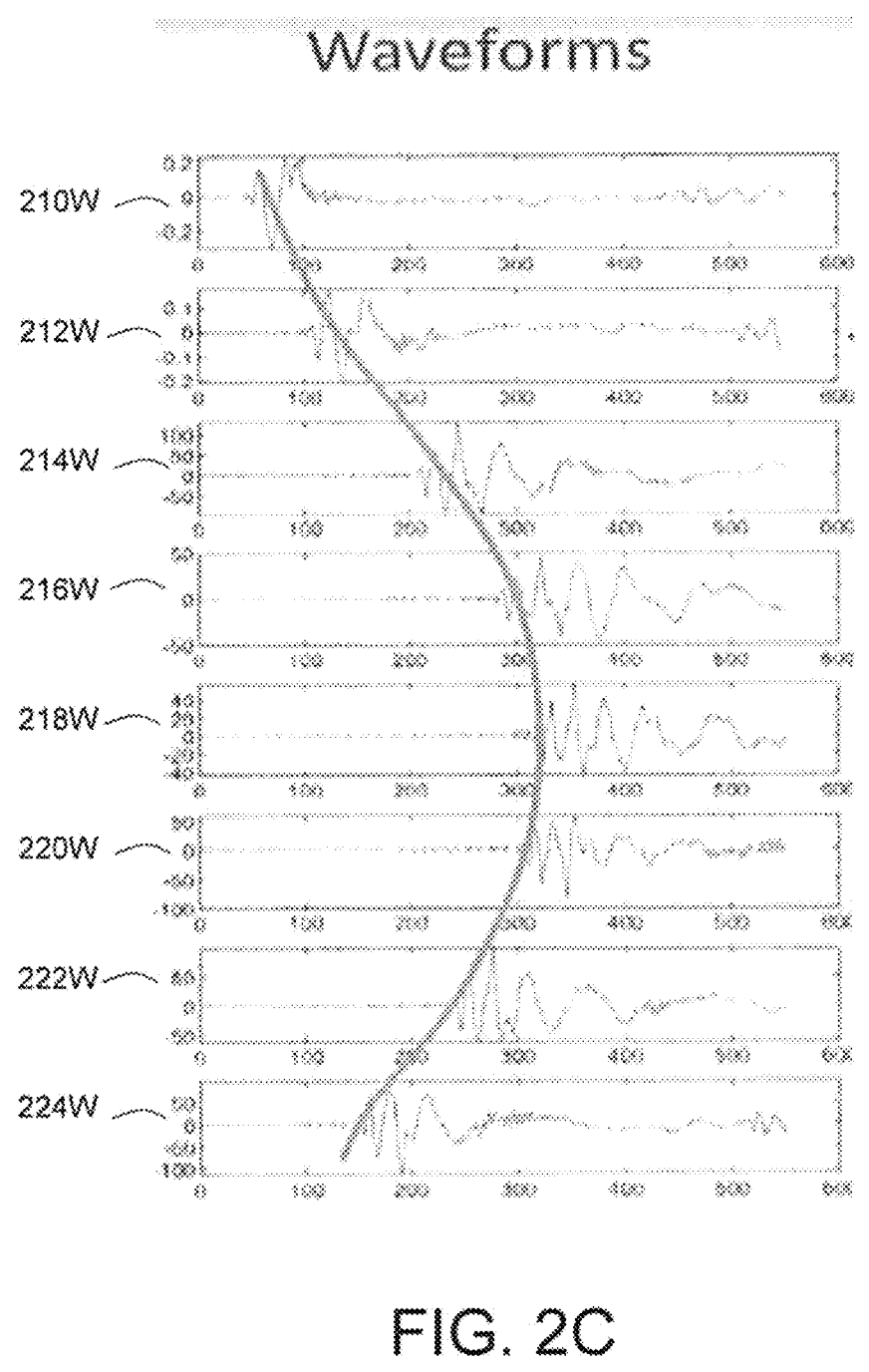
Figure 2D:
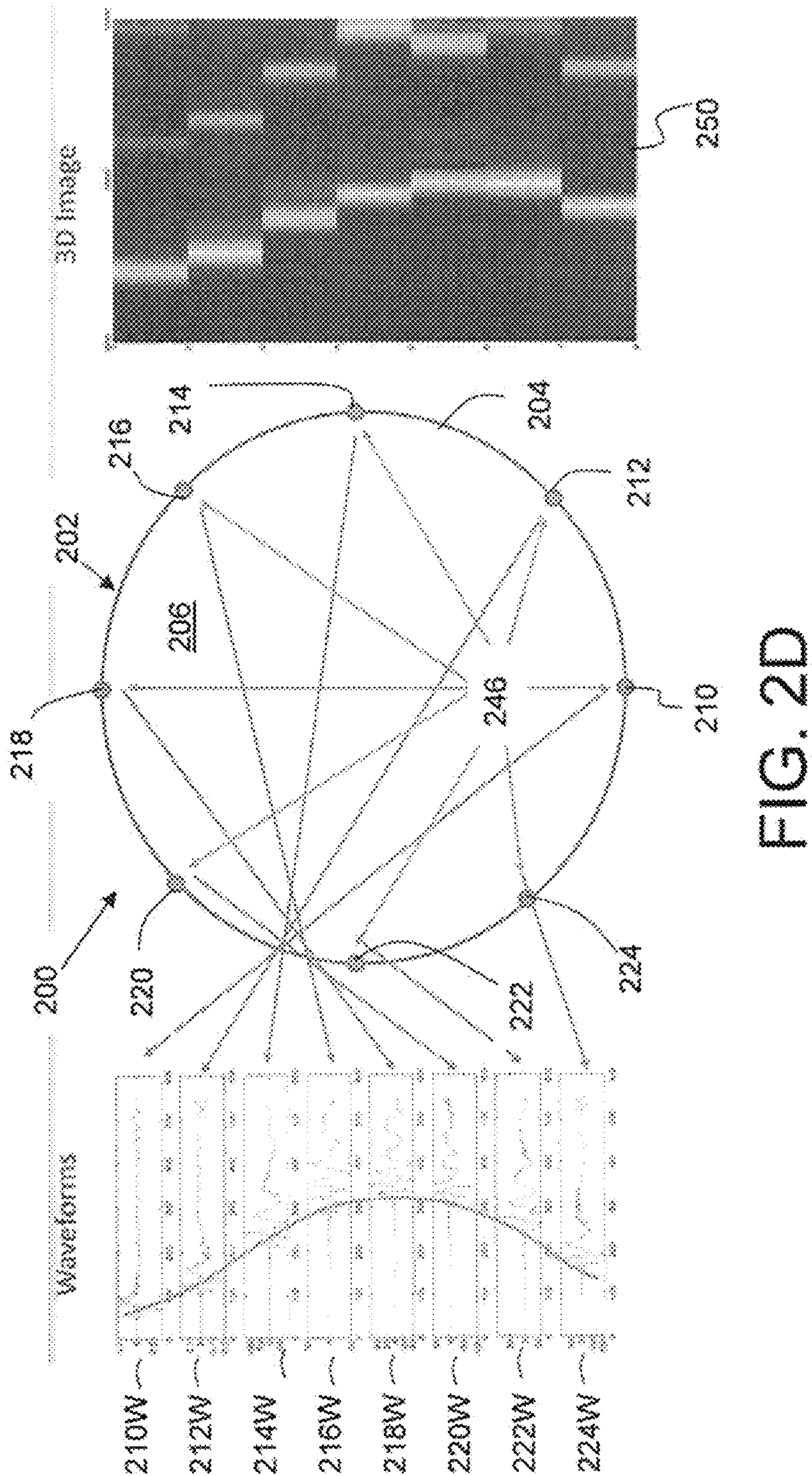
FIG. 2D is a schematic diagram showing relationships between sensors, graphs of acoustic signals, and a 3D representation of the signals.
Figure 2E:
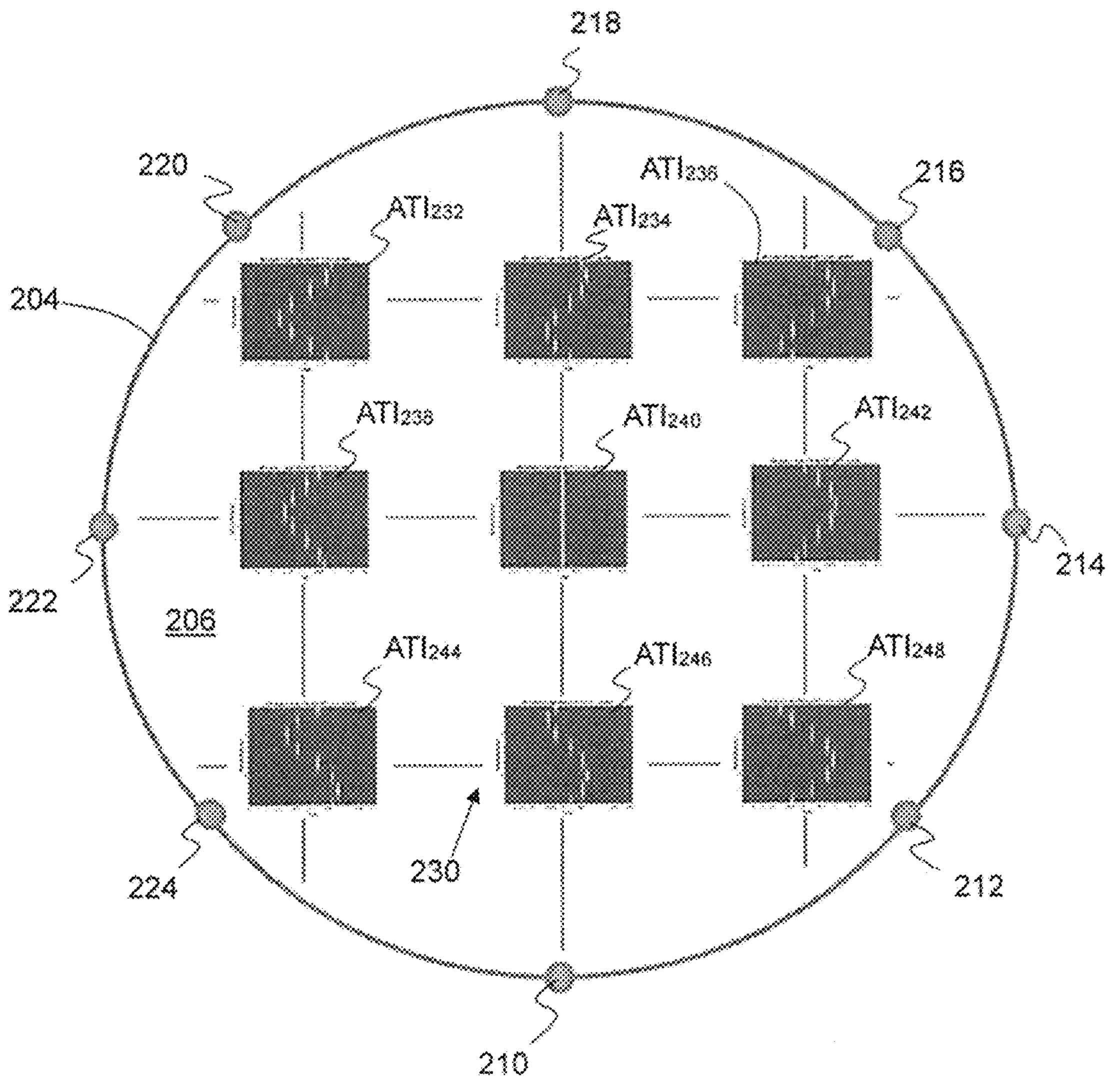
FIG. 2E is a schematic sectional view of the storage tank with a plurality of 3D representations of signals corresponding in position to grid crossings of a grid superimposed on the tank bottom.

The bottom wall 206 of the tank 202 includes a grid, which is generally designated by reference numeral 230 in FIGS. 2B and 2D. The grid 230 may be physically formed in or on the bottom wall 206 or may be an "imaginary" grid superimposed over the bottom wall 206. For simplicity purposes, the grid 230 in FIGS. 2B and 2E are a 3×3 grid of three (imaginary) vertical lines and three (imaginary) horizontal lines that cross one another. The grid 230 establishes nine crossing (or gridline intersecting) areas 232, 234, 236, 238, 240, 242, 244, 246, and 248. It should be understood that the grid 230 may be formed of alternative quantities of horizontal and vertical lines and crossing areas, and that the quantity of horizontal grid lines does not necessarily equal the quantity of vertical grid lines. Adjacent crossing areas 232, 234, 236, 238, 240, 242, 244, 246, and 248 may be equidistantly spaced from one another or not equidistantly spaced from one another. In an exemplary embodiment, the grid 230 has sufficient quantities of vertical and horizontal grid lines to establish crossing areas over substantially the entirety of the surface of the bottom wall 206.

A method of mapping the bottom wall 206 of the tank 202 and ascertaining the location of a leak or the like according to an exemplary embodiment will now be described in connection with a flowchart generally designated by reference numeral 300 in FIG. 3.

Figure 3:
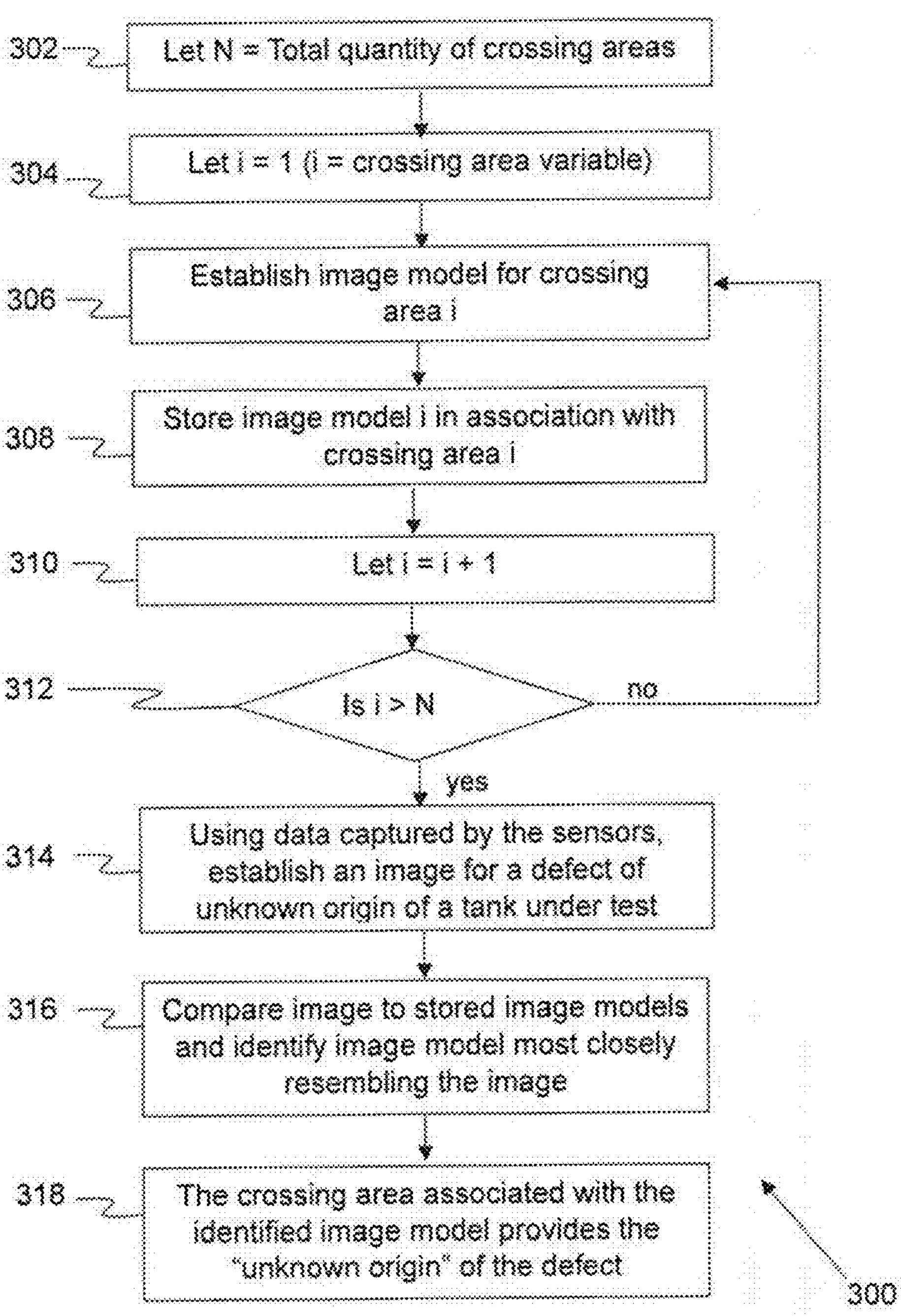
FIG. 3 is a flow diagram showing a method of compiling image models and identifying a location of a defect of unknown origin or location.

In an exemplary embodiment illustrated in FIG. 3, in step 302 the set value of "N" is assigned for the total quantity of crossing areas. (For example, for the grid 230 of FIG. 2B, N equals nine.) In step 304, the variable "i" is initialized, i.e., set to i=1. In step 306, a theoretical image model is calculated for a first crossing area, i.e., CrossingArea(i) (e.g., crossing area 232). According to an embodiment, theoretical waves are calculated for propagation distances from the first crossing area 232 to each of the sensors 210, 212, 214, 216, 218, 202, 222, and 224 based on the different propagating distances between the cross area 232 and the respective sensor. An example of a theoretical image model is shown on the left side of FIG. 4.

In step 308, the theoretical image model associated with the CrossingArea(i) is stored, e.g., in computer memory. The variable "i" is incremented in step 310, and in step 312 a determination is made whether the incremented variable "i" is greater than the total quantity of crossing areas "N". If the decision of the determination step 312 is in the negative, the process returns to step 306. A new leak is simulated at the next crossing area, e.g., crossing area 234. An image model is created and stored for the next crossing area, e.g., 234, 236, 238, 240, 242, 244, 246, or 248. This technique is repeated consecutively for each of the remaining crossing areas 236, 238, 240, 242, 244, 246, and 248, at which point the decision of the determination step 312 will be positive, meaning image models have been generated for all of the crossing areas.

Image models are completed for all crossing areas to complete the portfolio (or library) of image models. A representation of the image models assigned to their respective crossing areas is discussed below in connection with FIG. 2E. The image models may be stored in a database, such as in computer memory.

As discussed above in connection with FIG. 2B, according to an exemplary method, the bottom 206 of the tank 202 is gridded. For each of the crossing (or gridline intersecting) areas 232, 234, 236, 238, 240, 242, 244, 246, and 248, a "known leak location image" model or "arrival time image" model with an arrival time image (ATI) is created. $ATI_{232}$ represents a compiled image model of waveforms corresponding to the tank 202, also referred to as the tank under test (TUT), with an actual or simulated leak at the grid crossing area 232. Likewise, $ATI_{234}$ represents a compiled image model of waveforms corresponding to the tank 202 with an actual or simulated leak at the grid crossing area 234, and so on. The ATIs are mapped to their respective crossing areas as shown in FIG. 2E, and designated $ATI_{232}$, $ATI_{234}$, $ATI_{236}$, $ATI_{238}$, $ATI_{240}$, $ATI_{242}$, $ATI_{244}$, $ATI_{246}$, and $ATI_{248}$, with each ATI corresponding to an arrival time image model for a TUT 202 having a simulated leak according as the associated grid crossing. Note that the waveform at $ATI_{240}$ in FIG. 2E appears as a straight line because the propagating distances from crossing area 240 to each of the sensors 210, 212, 214, 216, 218, 220, 222, and 224 are identical to one another.

Continuing with the exemplary embodiment illustrated in FIG. 3, a leak or other defect of unknown origin (or location) in a tank under test ("TUT") may be identified and located as follows. In step 314 of FIG. 3, using data captured by the sensors detecting a defect of unknown origin in a TUT, an image is established for the defect of unknown origin. An example of the capturing of the data using sensors is shown in FIGS. 2C and 2D.

FIG. 2C illustrates a theoretical image model for an undesired simulated flow of a leaking fluid (e.g., fuel or other liquids) passing through the leak at crossing area 246. The flow of fluid through the leak at the crossing area 246 generates mechanical energy in the form of acoustic (also referred to as sound) waves, which propagate into the fluid stored and within and through the tank wall 204 or bottom 206. The signal waveforms 210W, 212W, 214W, 216W, 218W, 220W, 222W, and 224W for each of the sensors 210, 212, 214, 216, 218, 220, 222, and 224, respectively, are shown to the left of the tank 202 in FIG. 2D, with arrows connecting the sensors and their respective waveforms. An enlarged view of the signal waveforms 210W, 212W, 214W, 216W, 218W, 220W, 222W, and 224W of FIG. 2D is illustrated FIG. 2C. From top to bottom, the waveforms 210W, 212W, 214W, 216W, 218W, 220W, 222W, and 224W of FIGS. 2C and 2D correspond to sensors 210, 212, 214, 216, 218, 220, 222, and 224, respectively. In FIGS. 2C and 2D, the curved line, which is hand-drawn but may be computed, is presented for illustrative purposes, and intersects the first peak of each graph indicating the first arrival time for each graph.

The right side of FIG. 2D illustrates a three-dimensional (3D) image comprising a compilation of the eight waveforms, wherein the "third dimension" of amplitude is represented in gray scale. The 3D image is generated by application of a wavelet transform to the 2D theoretical waveforms on the left side of FIG. 2D.

In an exemplary embodiment, the sensors 210, 212, 214, 216, 218, 220, 222, and 224 positioned on an exterior surface of the tank wall 204 monitor in a manner which allows each sensor's signal (e.g., amplitude as a function of time) to be stored, plotted (e.g., waveforms 210W, 212W, 214W, 216W, 218W, 220W, 222W, and 224W) and compared so that leak location(s) are pinpointed via image analysis.

In step 316, the image of the tank under test (TUT) 202 (established at step 314) is compared against the stored image models. The image model most closely corresponding to or resembling the image is identified 316. The identified image model will be associated with a crossing area. The crossing area associated with the identified image model most closely corresponding (or correlating) to or resembling the image of the TUT 202 is determined to be the "unknown origin or location" of the leak or other defect of the tank under test (TUT) in step 318.

Figure 4:
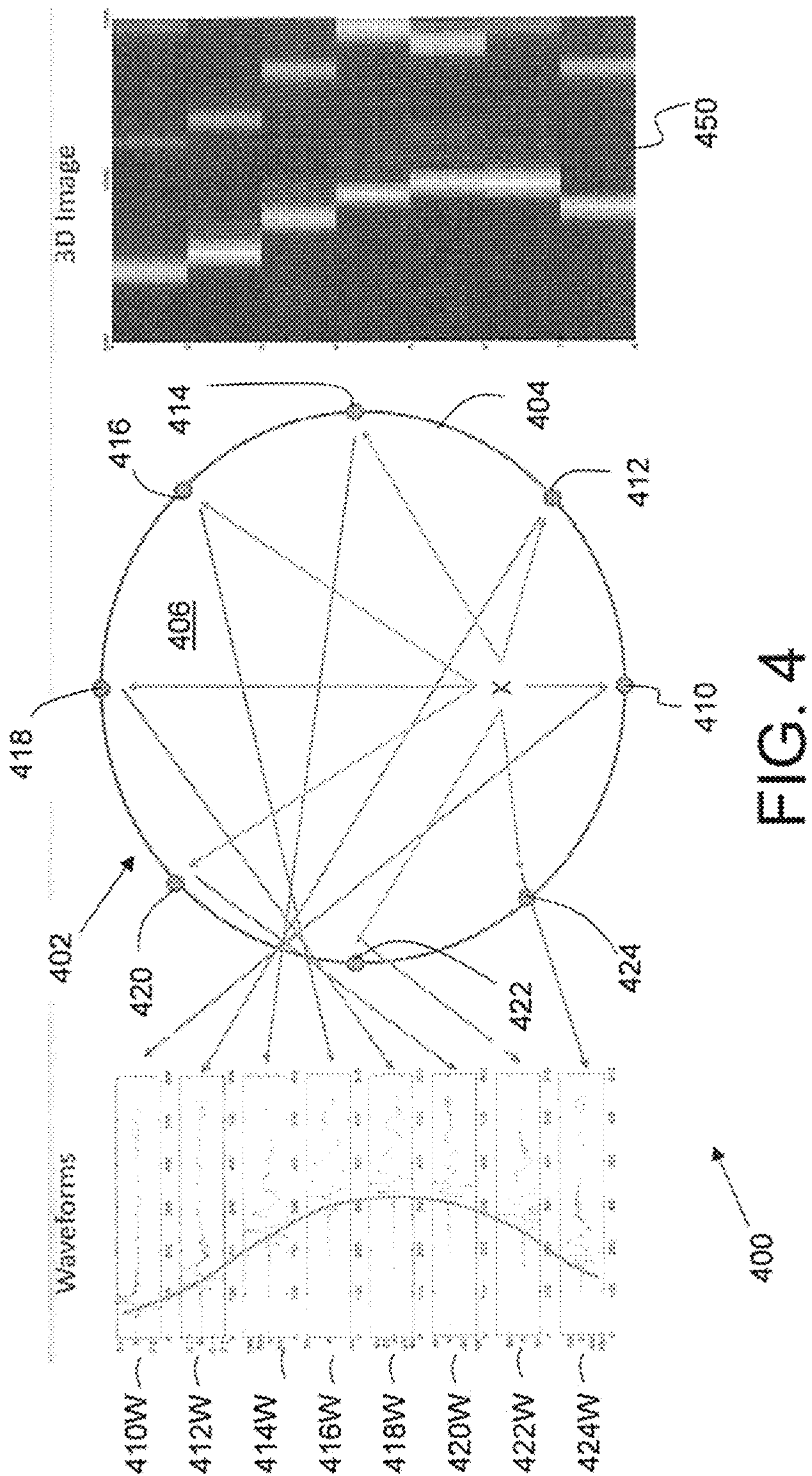
FIG. 4 is a schematic diagram showing relationships between sensors detecting acoustic signals from a defect of unknown location, graphs of the detected acoustic signals, and a 3D representation of the acoustic signals.

Referring now to FIG. 4, a nondestructive fluid container testing and defect (e.g., leak) detection and evaluation system 400 is shown. The system 400 is particularly useful in sensor data analysis methods for use with a fluid storage container 402. In this application, illustrative examples of the system and method with illustrated fluid containing structural boundary structures (e.g., tank walls or bottoms) show a particular application and are not limiting.

The middle of FIG. 4 illustrates a simplified overhead view of a tank 402 having a cylindrical tank wall (shown in cross section with a circular shape) equipped with eight sensors 410, 412, 414, 416, 418, 420, 422, and 424. The reference numerals in FIG. 4 correspond to those of FIGS. 2A and 2B. For example, FIG. 4 illustrates the tank 402 having a tank wall 404 and a tank bottom 406, with the tank wall 404 having an outer surface equipped on its outer surface with the sensors 410, 412, 414, 416, 418, 420, 422, and 424 corresponding to the sensors 210, 212, 214, 216, 218, 220, 222, and 224, respectively, of FIGS. 2A and 2B. (Although the schematic view of FIG. 4 shows the sensors 410, 412, 414, 416, 418, 420, 422, and 424 intersecting the side wall 404 for the sake of simplicity, the sensors 410, 412, 414, 416, 418, 420, 422, and 424 are positioned on an exterior surface of the tank wall 404 in an exemplary embodiment.) Reference character "X" positioned on the tank bottom 406 within the tank wall 404 represents a yet-to-be-determined unknown location of a leak or the like (e.g., breach) in the tank bottom 406.

The undesired flow of leaking fluids (e.g., fuel or other liquids) passing through the leak "X" of unknown origin (FIG. 4) generates mechanical energy in the form of acoustic (also referred to as sound) waves which propagate into the fluid stored and within and through the tank wall 404 or bottom 406. The acoustic waves are detected by the sensors 410, 412, 414, 416, 418, 420, 422, and 424, which each generate a signal or waveform, plotted in FIG. 4 as amplitude as a function of time. The signal waveforms 410W, 412W, 414W, 416W, 418W, 420W, 422W, and 424W for each of the sensors 410, 412, 414, 416, 418, 420, 422, and 424, respectively, are shown to the left of the tank 402 in FIG. 4, with arrows pointing from the sensors to their respective waveforms. From top to bottom, the waveforms 410W, 412W, 414W, 416W, 418W, 420W, 422W, and 424W of FIG. 4 correspond to the sensors 410, 412, 414, 416, 418, 420, 422, and 424, respectively. The right side of FIG. 4 illustrates an "arrival time image" (or "ATI" in the interest of brevity) 450 for a leak at point "X" of FIG. 4. The right side of FIG. 4 is generated using a wavelet transform for each sensor, then plotting all the sensors in a compilation image 450. In an exemplary embodiment, the ATI 450 is a three-dimensional (3D) image, wherein a third dimension of amplitude is represented in gray scale, but alternatively may be represented using multiple colors, for example.

The ATI image for the leak of unknown origin "X" is compared to $ATI_{232}$, $ATI_{234}$, $ATI_{236}$, $ATI_{238}$, $ATI_{248}$, $ATI_{242}$, $ATI_{244}$, $ATI_{248}$, and $ATI_{248}$ of FIG. 2E. A determination is made of which of the ATI images $ATI_{232}$, $ATI_{234}$, $ATI_{236}$, $ATI_{238}$, $ATI_{240}$, $ATI_{242}$, $ATI_{244}$, $ATI_{246}$, and $ATI_{246}$ most closely correlates to the $ATI_X$ image for the leak of unknown origin. FIG. 5 illustrates an exemplary comparison of an Arrival Time Image ($ATI_{434}$) (left waveform image plot) with a "best correlation" sensed unknown leak location (X) image $ATI_X$ (right waveform image plot).

The greater the quantity of crossing areas, the greater the quantity of image models. Hence, the designer may select the quantity of crossing areas based on a balancing of the improved results implicitly realized by higher quantities of crossing areas versus the greater amount of work (or effort or labor) in establishing an image model for each of the crossing areas. The image models may be stored (in step 308) in, for example, computer memory, as described in greater detail below, with each of the image models being associated with a corresponding one of the crossing areas, such as the crossing areas 232, 234, 236, 238, 240, 242, 244, 246, and 248 illustrated in FIG. 2B.

In the above-described embodiment, the reference images are established for simulated leaks or other defects at the crossing areas. According to another embodiment, reference images for the crossing areas are based on real or actual leaks.

In the above-described exemplary embodiments, the embodied systems and methods can be automated to permit automated detection and location of a leak or other defect in a tank non-invasively and non-destructively, thereby providing an economical system which eliminates the reflection problem and the noise problem. The automated systems and methods also reduce expenses and labor.

As noted above, the undesired flow of leaking fluids (e.g., fuel or other fluids) passing through a defect, breach, crack, void, dis-bonds, etc. in a tank wall or bottom (e.g., 204 and 206, respectively) generate mechanical energy in the form of acoustic (also referred to as sound) waves which propagate into the fluid stored and within and through the tank wall 204 or bottom 206. In accordance an exemplary embodiment of the present invention, a system and method for passive acoustic leak detection includes placement of a plurality of acoustic energy sensors (e.g., 210, 212, 214, 216, 218, 220, 222, and 224 of FIGS. 2A and 2B) arrayed on at least the cylindrical (or other shape) outer or external surface of the tank wall 204. The sensors detect the wave when the wave impinges on the tank wall to produce a digitized signal (or signal which is subsequently digitized) and stored for analysis. No sensors need to be placed within the tank 202, although the use of one or more sensors inside the tank is not prohibited or outside the scope of embodiments described herein. In certain exemplary embodiments, the structure of the tank 202 is employed as a relatively sensitive hydrophone for leak detection. In the event a leak is detected in the bottom 206 of the tank 202, the fluid flow of the leak through the bottom 206 generates sound waves which propagate into the fluid and through the fluid to the arrayed sensors (e.g., 210, 212, 214, 216, 218, 220, 222, and 224).

In exemplary embodiments, including but not limited to the exemplary embodiments described in connection with FIGS. 2A-5, the acoustic sensors or sensor elements (e.g., 210, 212, 214, 216, 218, 220, 222 and 224) may be piezoelectric structures. In an embodiment, the piezoelectric structure comprises one or more ceramic discs or one or more piezoelectric film layers. By dicing the element, the radial resonance of the ceramic disc is moved to a much higher frequency, out of the desired monitoring frequency range. Without wishing to be bound by theory, it is believed that smaller elements allow larger sensor diameters (thus providing higher sensitivity) without loss of signal due to phase cancellation. Examples of acoustic-emission sensors are disclosed in, for example, U.S. Pat. No. 5,191,796 (now expired).

According to an embodiment, the correlation determination is carried out in a manner analogous to that used in facial recognition software system, which compare an unknown facial image (e.g., from a surveillance camera) with a plurality of known images to identify the most closely matched known facial image to the unknown facial image. Real or theoretical images for a given tank bottom are developed, with each image corresponding to a defect or other flaw at a given location, such as a grid crossing.

Figure 6:
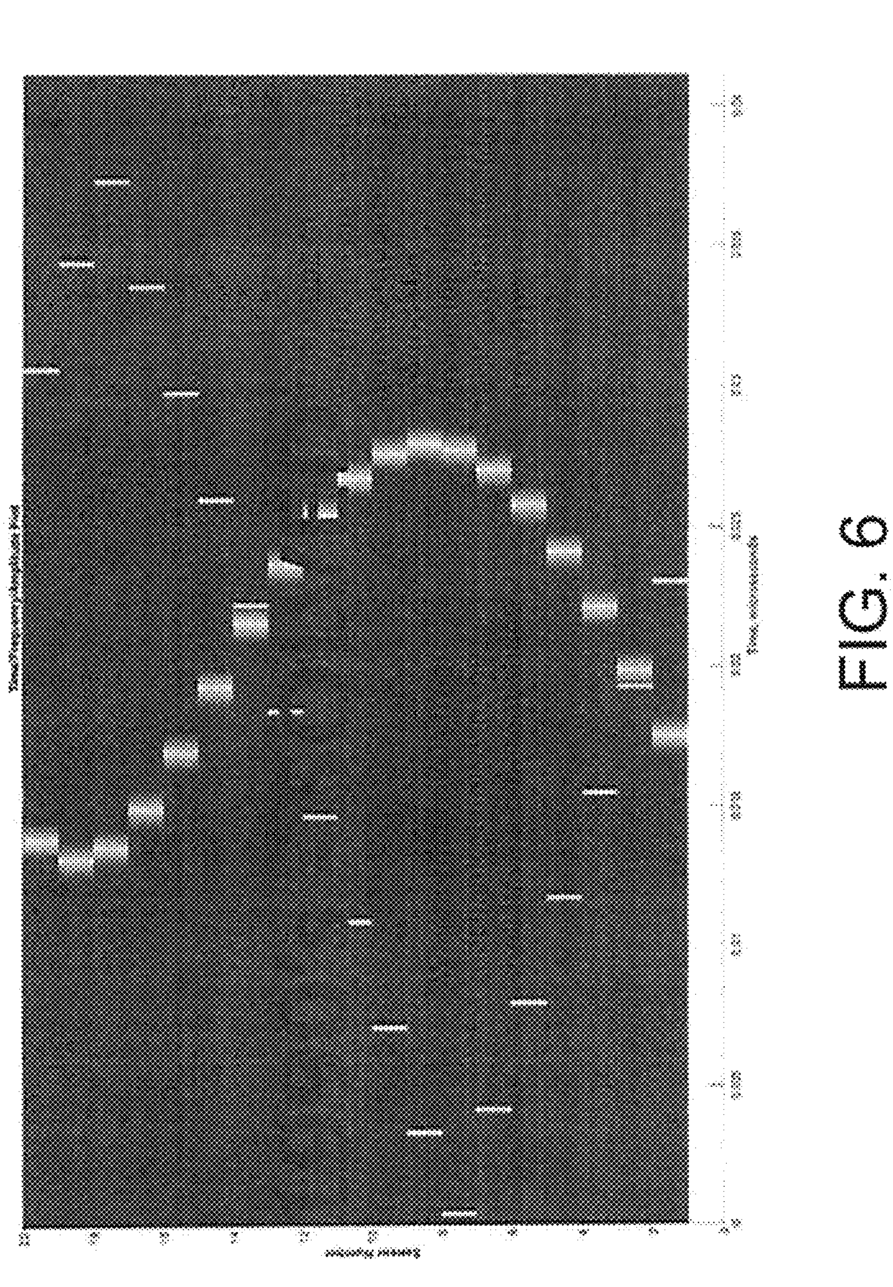
FIG. 6 is a time/frequency/amplitude plot of time (microseconds) (horizontal axis) versus sensor number (vertical axis). The thicker data lines represent the arrival of the signal at the sensors arrayed on the outside of the tank from a source on the bottom of the tank, while the thinner data lines represent a source from the shell of the tank.

FIG. 6 provides a plot of time (microseconds) on the horizontal axis and sensor number on the vertical axis. The plot demonstrates that sensed signals from noise differ for noise sources on the bottom of a tank versus noise sources on the tank sidewall or shell. Without wishing to be bound by theory, it is understood that plots are different from one another because the acoustic signal travels at a different propagation velocity through the contents (e.g., fluid) of the tank than through the tank wall or bottom itself. Hence, the arrival times for sources from the bottom of the tank are unique to the bottom of the tank. The image correlation (e.g., as shown in FIG. 6) may be tuned to only tank bottom sound sources, so it is immune to shell noise and internal tank reflections.

Exemplary embodiments of the systems and methods described herein permit automated detection and location of a leak in a tank non-invasively and non-destructively, thereby providing an economical system which eliminates reflection problems and noise problems. Embodiments of the systems and methods may be automated to reduce payroll expenses by reducing the labor costs associated with operating and maintaining above-ground tank storage terminal facilities.

Another advantage of exemplary embodiments of the system and method is that an inspection can be performed while the tank is in service because the noise issue is largely eliminated and because leaks are found without requiring emptying of the tank.

Corrosion (and Other Defect) Detection and Location

As described above, undesired flow of leaking fluids (e.g., fuel or other liquids) passing through a leak generate mechanical energy in the form of acoustic (also referred to as sound) waves which propagate into the fluid stored and within and through the tank wall and bottom. However, corrosion and other defects that are not characterized by leaks (except in the case of, for example, severe corrosion that erodes through the tank wall) do not generate acoustic waves in the manner described above with respect to FIGS. 2A-5. In exemplary embodiments described herein, acoustic waves are created by using an artificial source, such as a mechanical actuator or acoustic actuator. It should be understood that although the following embodiments are described in connection with corrosion and similar defects, the embodiments may be practiced with respect to defects that produce passive acoustic leak signals, such as described above with respect to leaks and the like.

According to exemplary embodiments, corrosion and other defects possessed by tank structural members, such as a tank bottom made from one or more plates, are detected, located and evaluated with a wavelet transform generation method which plots frequency, time and amplitude information. The wavelet transform image is compared, e.g., cross-correlated, to a model based in part on the Lamb mode theory dispersion curves or another techniques, such as finite element analysis. In an exemplary embodiment, the theoretical dispersion curves are provided or generated a priori.

Figure 7:
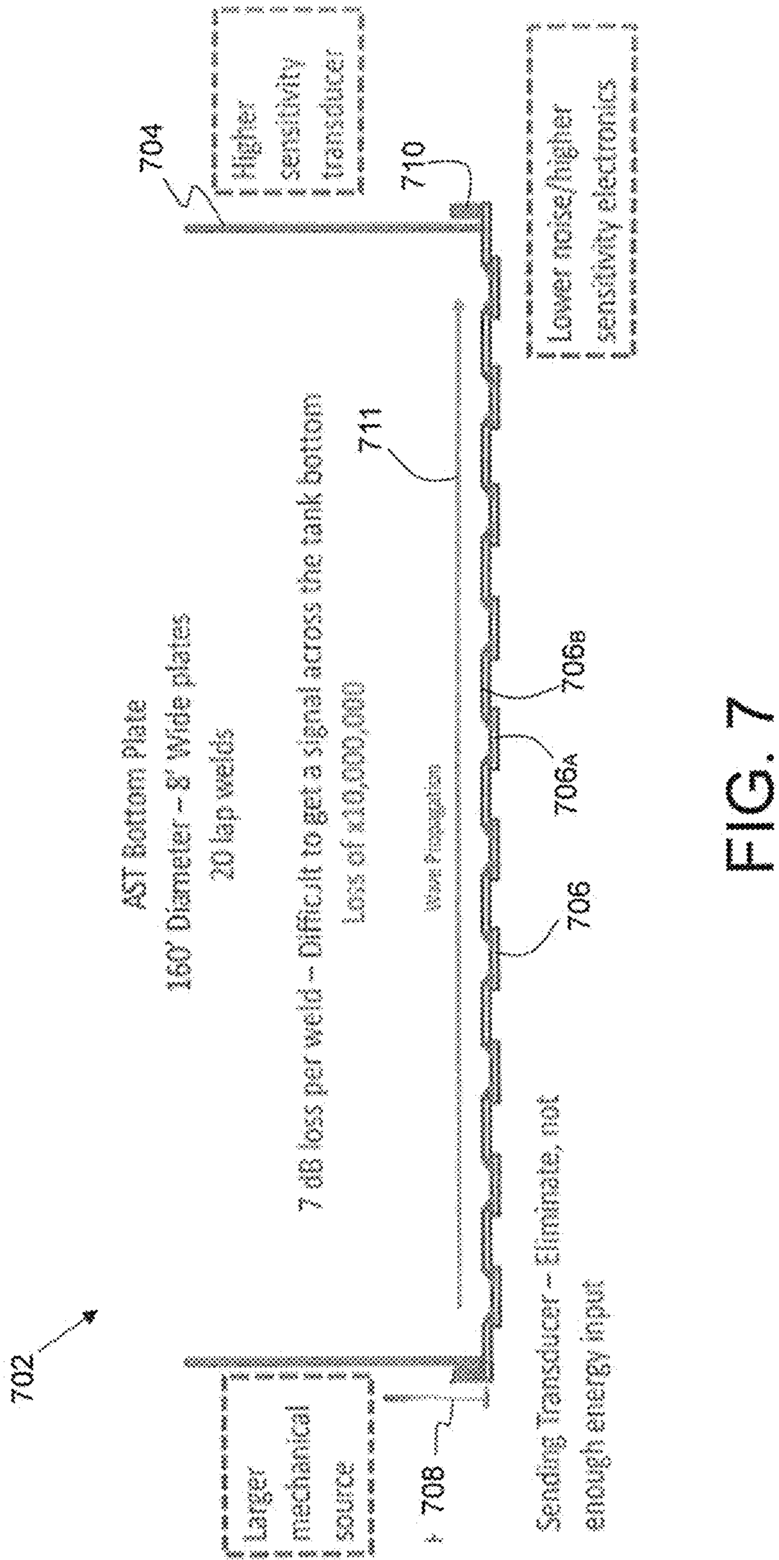
FIG. 7 is a sectional view of a tank associated with a system for generating and detecting acoustic signals according to an exemplary embodiment.

Tank bottoms are often made from a plurality of joined or welded plates. An example is illustrated in FIG. 7, in which a tank is generally designated by reference numeral 702. The tank 702 includes a cylindrical side wall 704 jointed to a bottom wall 706. The bottom wall 706 comprises welded plates, e.g., adjacent plates 706A and 706B welded to one another.

Natural wave propagation in plates, e.g., 706A and 706B, are plate waves. An example of a plate wave is represented in FIG. 7 by arrow 711. The wave propagation may be induced by a mechanical, acoustic or sound energy input, such as a hammer or a mechanical input actuator 708 impacted (e.g., tapped) against the tank bottom 706 from an edge of the tank 702. The wave traverses the tank bottom 706 and interacts with any corrosion or other flaws or defects which may have developed in the tank bottom 706. A receiving sensor (or receiver) 710, such as an acoustic or sound energy transducer, senses the wave having traversed the bottom 706 to create a composite image. In FIG. 7, the receiving sensor 710 is diametrically opposed to the mechanical input actuator 708.

A non-limiting example of tank 702 of FIG. 7 may include an above-ground storage tank (AST) bottom plate with one hundred sixty (160) foot diameter with eight (8) foot wide plates, totaling twenty (20) lap welds. At seven (7) dB loss per weld, it can be difficult to get a signal across the bottom. Accordingly, in an embodiment the receiving sensor 710 has low noise/high sensitivity electronics.

Figure 8:
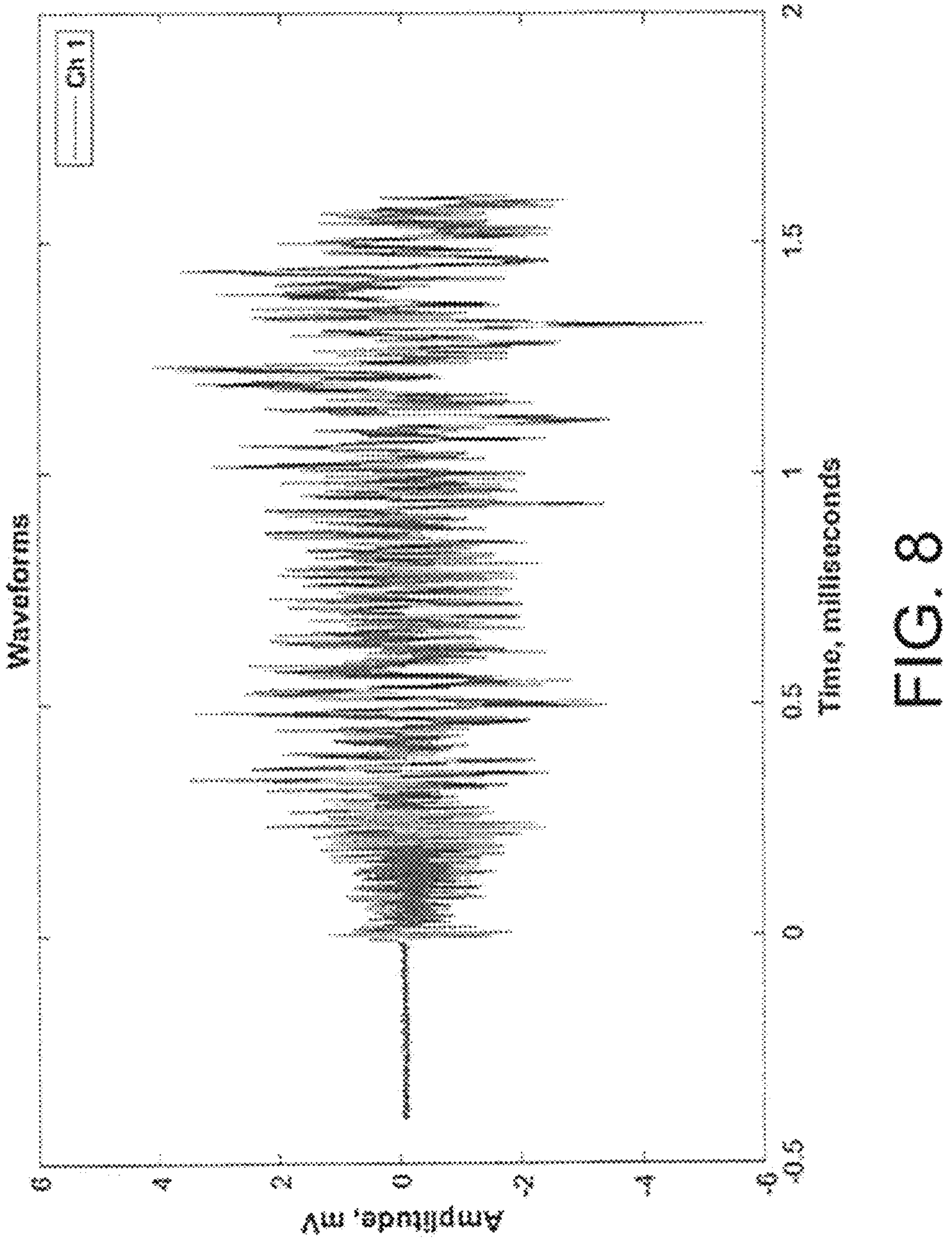
FIG. 8 is a waveform graph, in which the horizontal axis represents time (milliseconds) and the vertical axis represents amplitude (mV) for a typical guided wave.

An example of the composite image based on signals detected by a receiving sensor 710 from a plate wave initiated by a mechanical input actuator 708 is shown in the waveform graph of FIG. 8. In the waveform graph, amplitude (mV) is plotted on the vertical axis as a function of time (milliseconds) on the horizontal axis for a typical plate wave. Important information concerning the plate wave is "hidden" within the complex waveform of FIG. 8.

Figure 9:
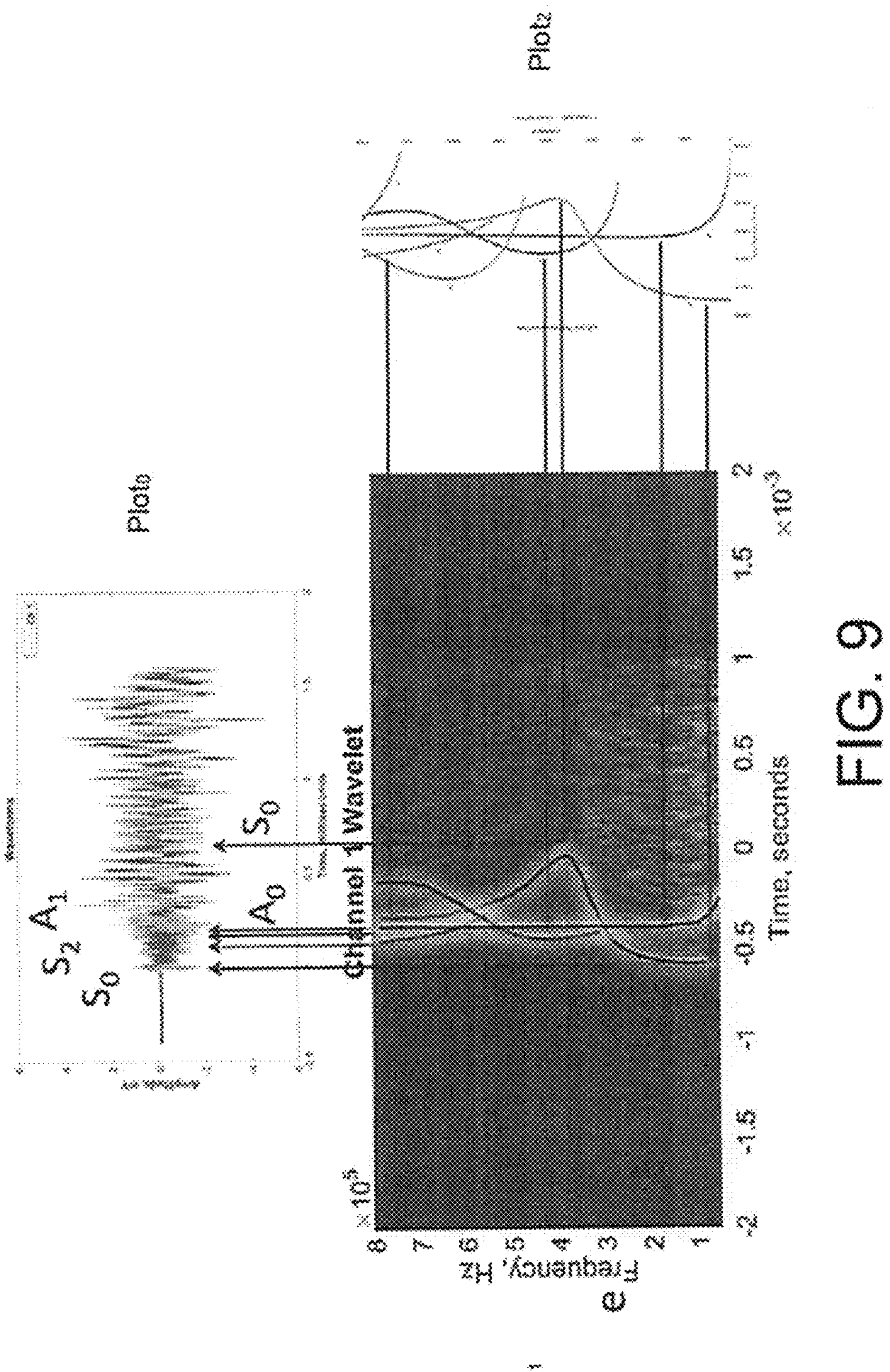
FIG. 9 is a diagram showing a wavelet transform image of the signal in FIG. 8 and the comparison to Lamb mode theory dispersion curves according to an exemplary embodiment.

In an exemplary embodiment, a wavelet transform generation method and image cross-correlation method are used, optionally with a computer, to automate the process of detecting and locating flaws. In an exemplary embodiment, the sensor data images created and then analyzed are wavelet transforms of 2D sensor data, which use time/amplitude data (like that illustrated in FIG. 8 and the upper plot $Plot_0$ of FIG. 9, discussed below). The time/amplitude data are used to create wavelet transform time/frequency/amplitude plots (e.g., $Plot_1$ of FIG. 9, shown with an overlay of a Lamb mode theory dispersion curve). The wavelet transform plots are also referred to herein as wavelet transform images. In $Plot_1$ of FIG. 9, the horizontal axis is time (seconds), the vertical axis is frequency (Hz), and the amplitude is represented in gray scale, although a color scale may be used instead. The wavelet transform is cross-correlated to Lamb mode theory dispersion curves (e.g., $Plot_2$ of FIG. 9), calculated using Equations (1) and (2) herein. The Lamb mode theory dispersion curves (also referred to herein as Lamb wave theory dispersion curves) are examples of theoretical dispersion curves described herein.

A 3D image of an experimental waveform transform can be created using a wavelet transform. Lamb wave modes for a given propagation distance can be calculated, and the 2D experimental waveform turned into a 3D image. In an embodiment, a Gaussian approach is used for wavelet transform. In another embodiment, a Lorentzian approach was used for wavelet transform.

Figure 10:
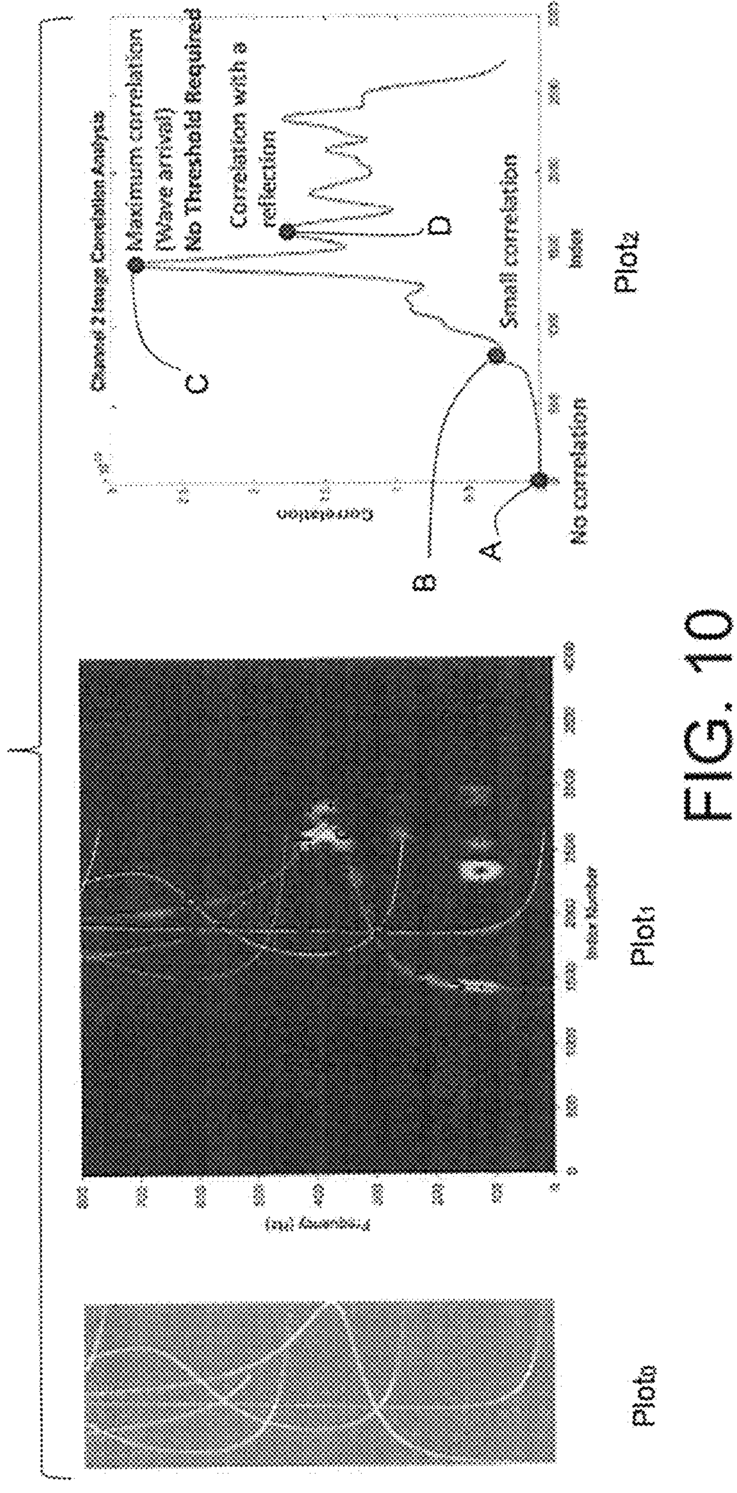
FIG. 10 is a diagram showing 3D image analysis and cross-correlation of an image created from Lamb mode theory dispersion curves, the wavelet transform of a signal from an unknown source, and the resulting correlation plot. according to an exemplary embodiment.

As illustrated in FIGS. 9 and 10, a wavelet transform image is cross-correlated with theoretical dispersion curves to automate the process of characterizing (e.g., locating) flaws. An embodiment of the cross-correlation is described in greater detail below.

By way of background, Lamb mode theory refers to dispersion waves which propagate in solid plates and spheres. Lamb waves are elastic waves whose particle motion lies in the plane that contains the direction of wave propagation and the plane normal (i.e., the direction perpendicular) to the plate. In 1917, the English mathematician Horace Lamb published his classic analysis and description of acoustic waves of this type. The acoustic waves have complex properties. An infinite medium supports just two wave modes traveling at unique velocities, but Lamb theory supports two infinite sets of Lamb wave modes, whose velocities depend on the relationship between wavelength and plate thickness. In accordance with an exemplary embodiment, sensor data from the sensors of system is cross-correlated to the Lamb mode theory dispersion curves (e.g., $Plot_2$ of FIG. 10) for image analysis.

Figure 11:
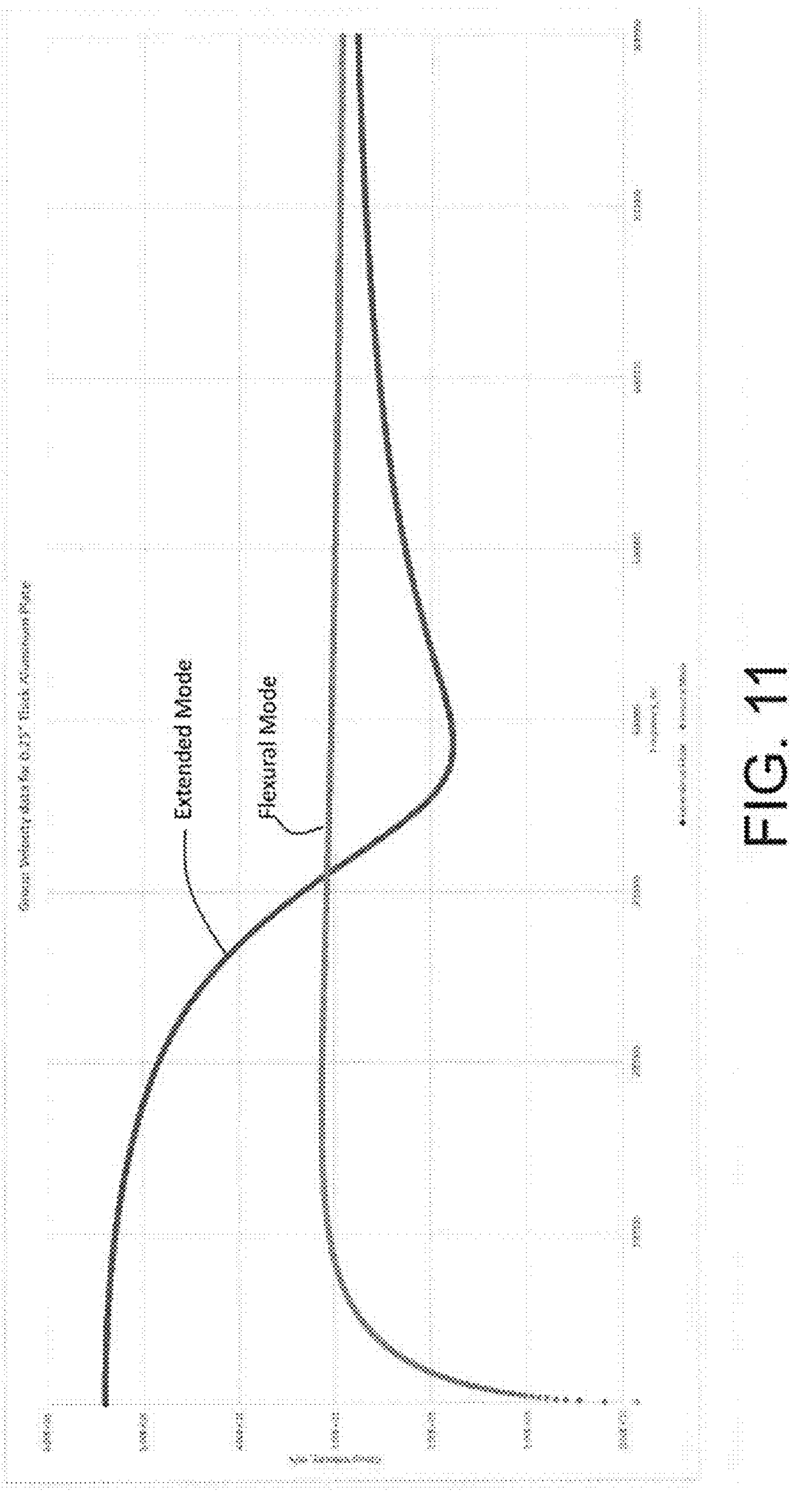
FIG. 11 is a graph illustrating plate Lamb wave theory dispersion curves for a 0.25-inch thick aluminum plate, in which frequency (Hz) is plotted on the horizontal axis and group velocity (m/s) is plotted on the vertical axis.

There are two modes of propagation in plates, i.e., symmetric (extensional) and asymmetric (flexural). An example of these modes is illustrated in FIG. 11. The symmetric mode and asymmetric modes are expressed mathematically as Equations (1) and (2), respectively:

$$(\tan\beta h/\tan\alpha h) = -(4\alpha\beta k^2/(k^2-\beta^2)^2) \quad (1)$$

$$(\tan\beta h/\tan\alpha h) = -((k^2-\beta^2)/4\alpha\beta k^2) \quad (2)$$

wherein:

$$\alpha^2 = \omega^2/c_1^2 - k^2; \quad (3)$$

$$\beta^2 = \omega^2/c_2^2 - k^2. \quad (4)$$

In the above Equations (1)-(4): k is wave number; w is angular velocity; $c_1$, $c_2$ are longitudinal and shear velocities; and h is the half-thickness of the plate. The equations are solved numerically to theoretically predict the propagation velocity as a function of frequency. The resultant curves for group velocity data for a 0.25 inch aluminum plate are shown in FIG. 11, in which frequency (Hz) (from 0 Hz to 800,000 Hz) is plotted on the x-axis and group velocity (m/s) (from 0 m/s to $6.00\times10^3$ m/s) is plotted on the y-axis.

Figure 12:
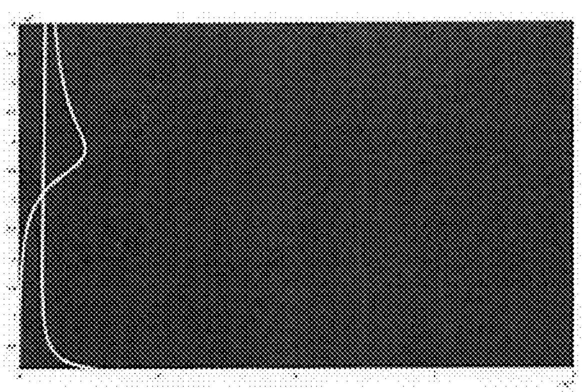
FIGS. 12-14 are time-based theoretical dispersion curve plots that have been propagation distance corrected by dividing the propagation distance by the velocity, wherein the plots respectively show the dispersion curve shifts for a 5-inch propagation distance, a 10-inch propagation distance, and a 20-inch propagation distance, respectively, and wherein the x-axis is in units of time and the y-axis is in units of frequency.
Figure 13:
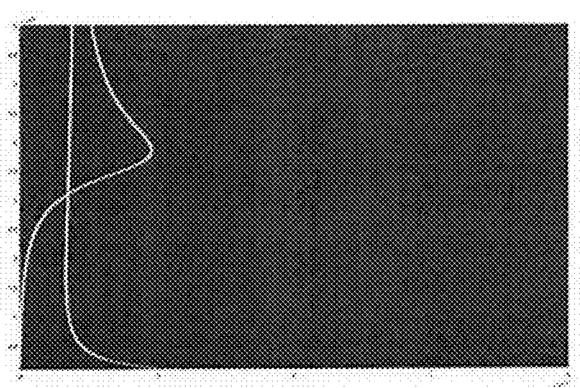
Figure 14:
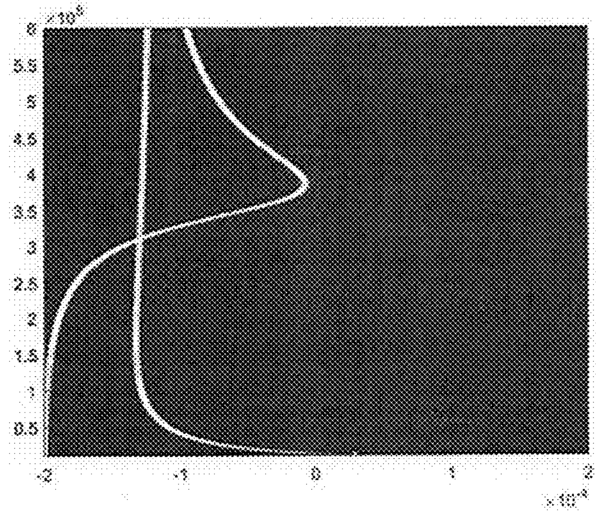

In an exemplary embodiment, the theoretical (e.g., Lamb mode) dispersion curves are calculated (using Equations (1)-(4)), and transformed from frequency/velocity to time/frequency/amplitude plots by picking a propagation distance and then calculating the time of propagation for each frequency. FIGS. 12-14, for example, illustrate time-based dispersion plots tuned to propagation distances of 5 inches, 10 inches, and 20 inches, respectively. Dark areas in the dispersion curve plots represent zeros, and white lines represent ones. Each corresponding point in each plot (theory and experiment) is multiplied, and the resultant multiplications added to provide a sum. The sum is then plotted against time. The dispersion curves are then shifted one time step and the process repeated for the entire time sequence. Peaks in the plot correspond to matches in the wave modes.

Figure 15:
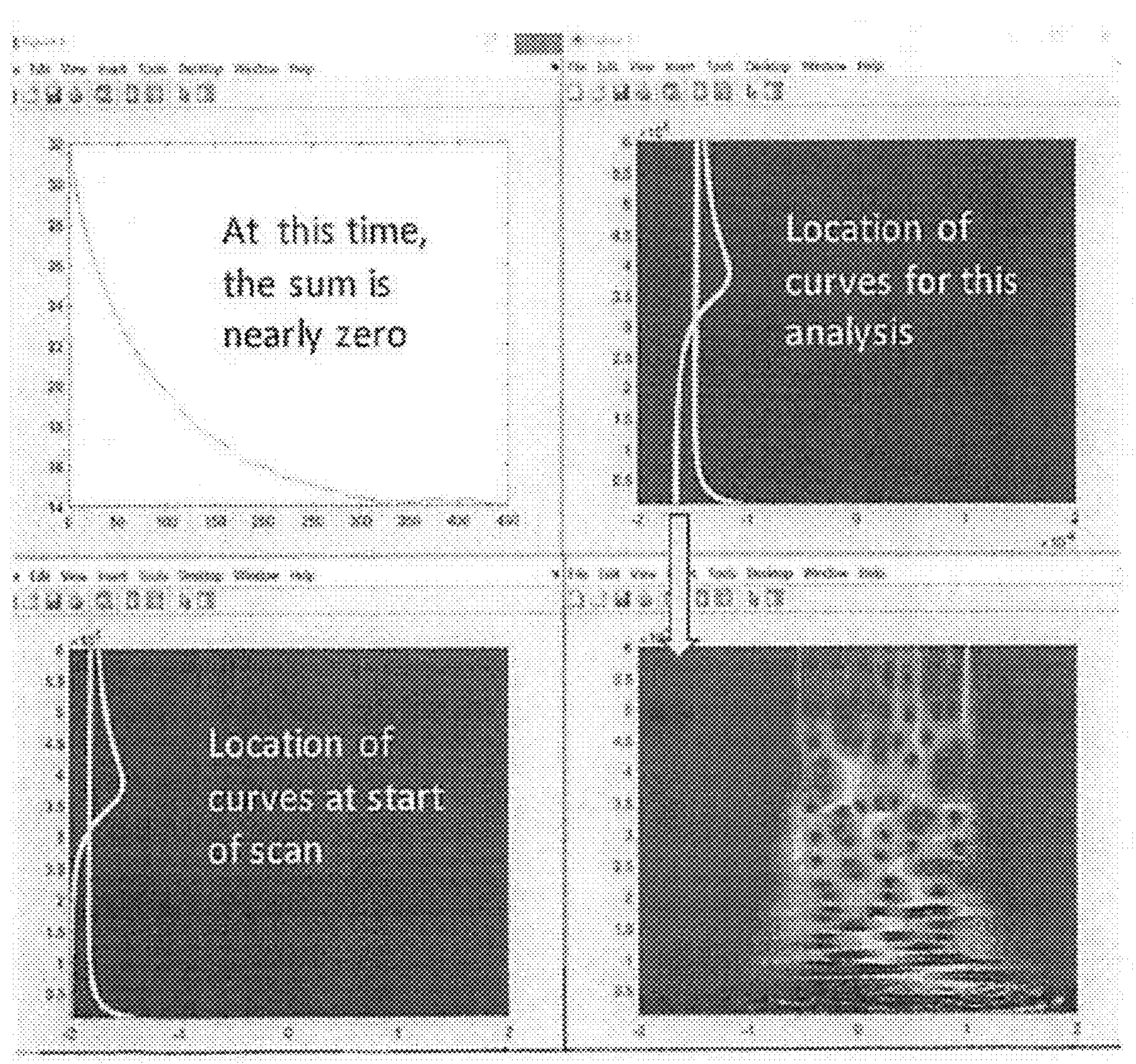
FIGS. 15-18 show image comparisons for a five-inch propagation distance, in which theoretical dispersion curves are shifted in time in each successive figure.
Figure 16:
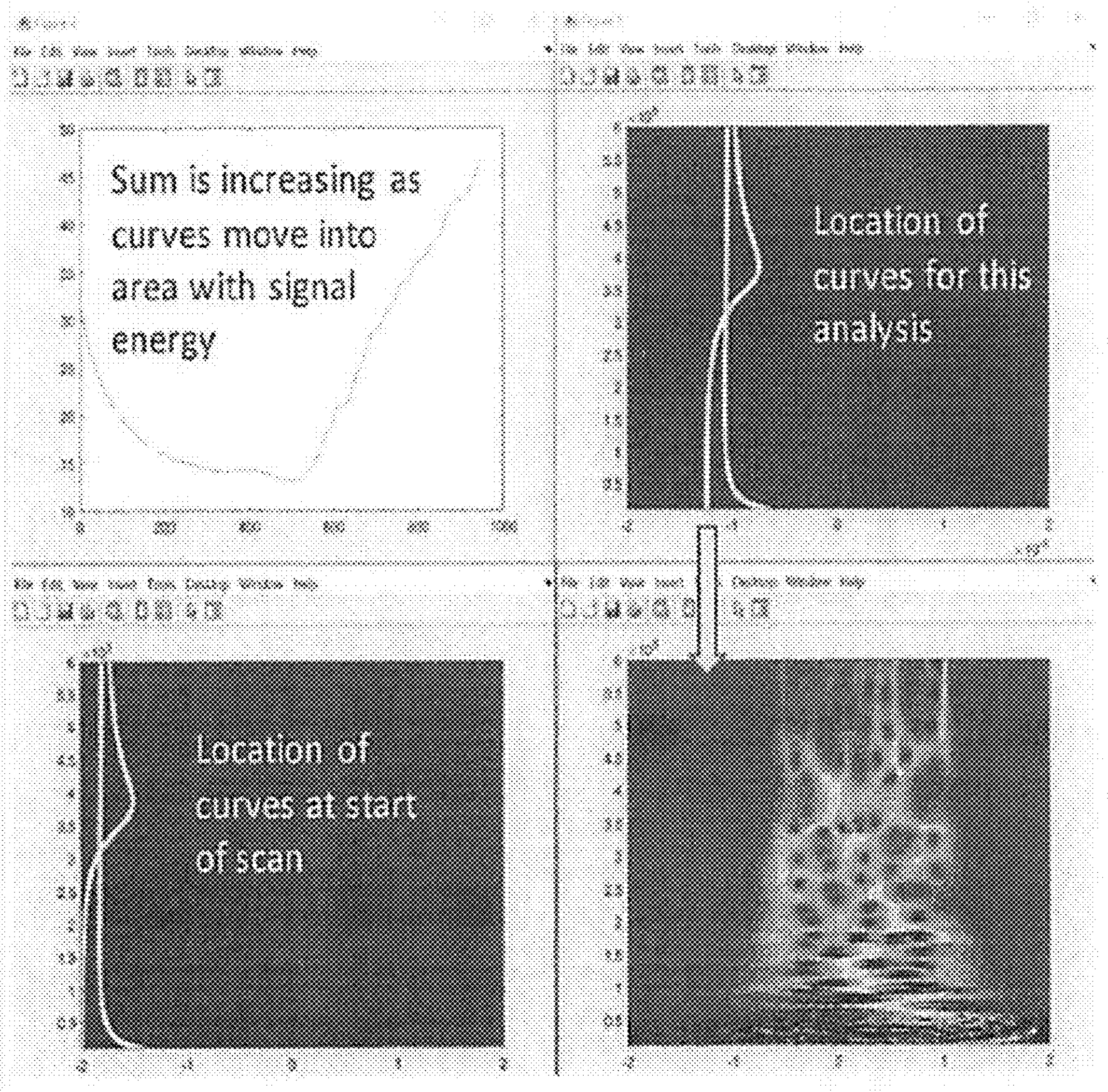
Figure 17:
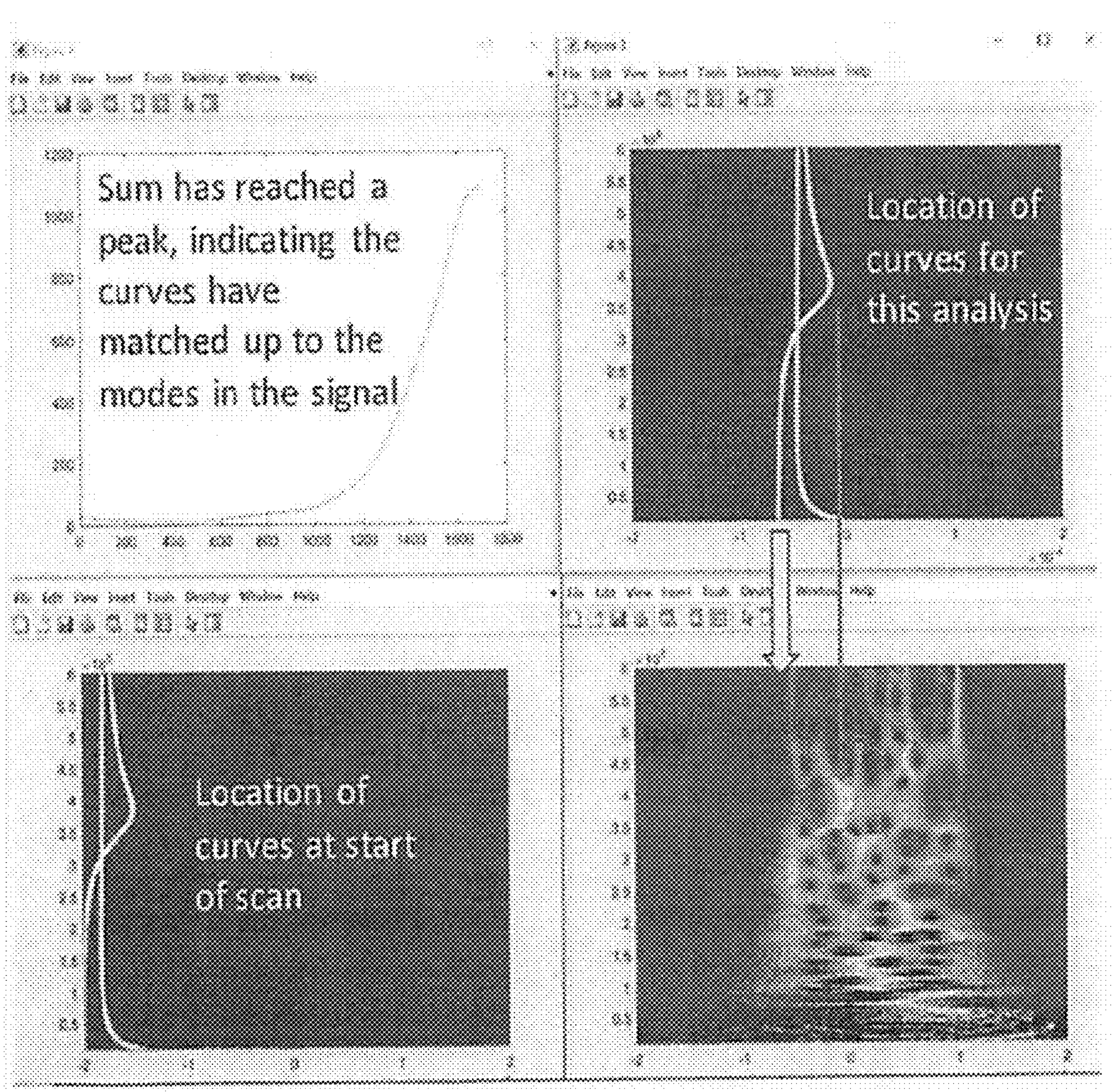
Figure 18:
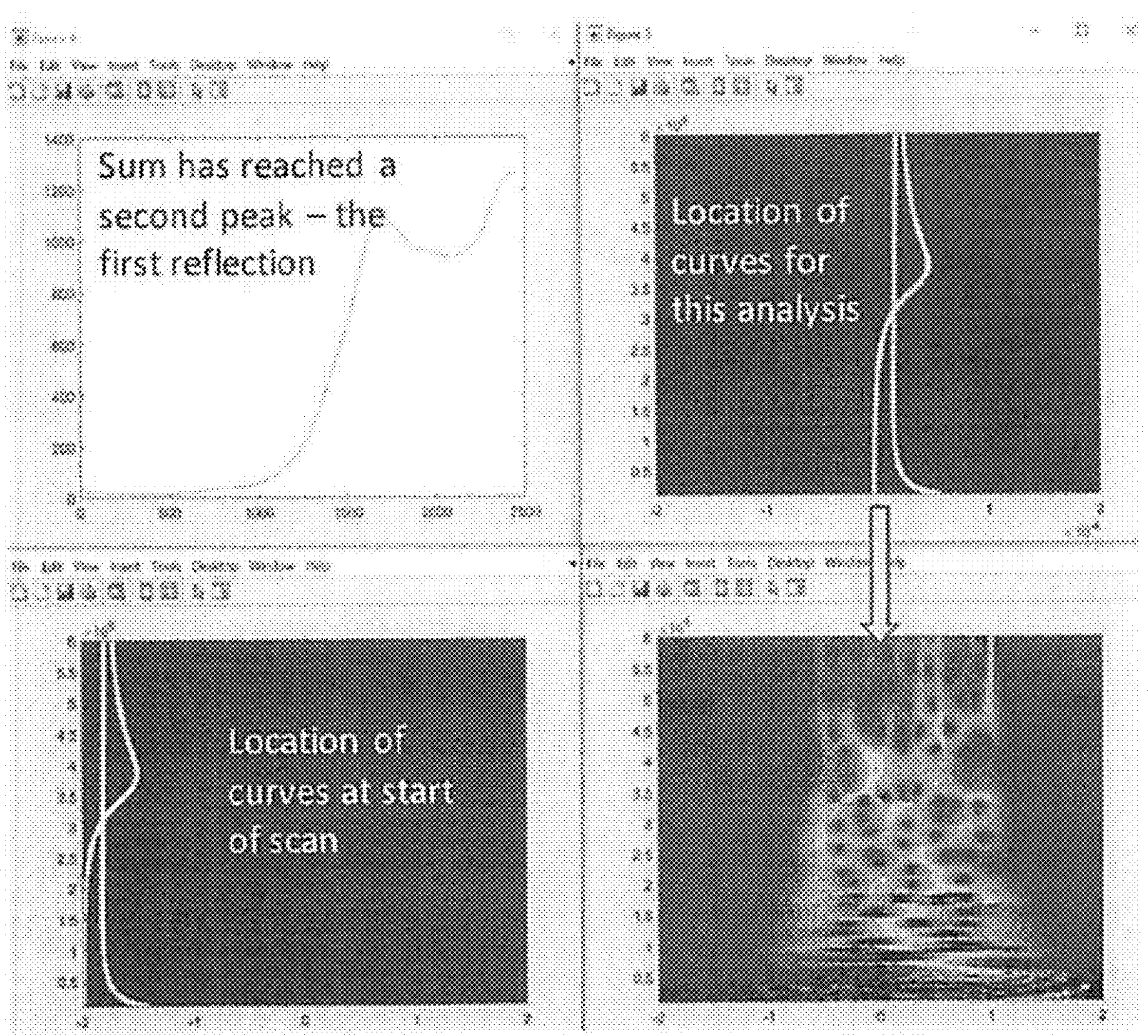

FIGS. 15-18 demonstrate the shifting of dispersion curves to find a best fit or match with a three-dimensional wavelet transform. In FIG. 15, the lower left graph illustrates the location of dispersion curves at the start of a scan, and the upper right graph illustrates the dispersion curves shifted to the right by an increment for a set propagation distance. The correlation between the incremented dispersion curves and the 3D wavelet transform image is nearly zero, as shown in the upper left graph of FIG. 15. In FIG. 16, the dispersion curves are shifted another increment relative to FIG. 15 for the next incremented propagation distance. The upper left graph shows that the correlation sum increases as the dispersion curves move into an area with signal energy. In FIG. 17, the dispersion curves are shifted another increment relative to FIG. 16 for the next incremented propagation distance. The correlation graph in the upper left quadrant shows that the dispersion curves have matched with the modes in the signal, as the calculated sum reaches a peak. In FIG. 18, the dispersion curves are shifted another increment relative to FIG. 17 for yet another incremented propagation distance. The sum reaches its second peak, as shown in the upper left graph of FIG. 18, indicating that the sum has reached its second peak, which represents a first reflection.

In an exemplary embodiment, a corrosion detection image correlation method is analogous to image comparison methods used in facial recognition software systems, which compare an unknown facial image with a plurality of known facial image models. Applying those methods to an exemplary embodiment, theoretical image models for a given tank bottom are developed. Each of the theoretical image models corresponds to a given (or predetermined) flaw in a given (or predetermined) location. "Given locations" may correlate to grid crossings, the assignment and positioning of which are described above in connection with at least FIG. 2B. The theoretical images may be analogized to known face images of facial image models. In the next step, a test wave (e.g., test wave 711 of FIG. 7) is input (e.g., from a hammer tap, for example, as described above) and directed or guided from the input actuator 708 across the tank bottom 706 from the edge or chime. The hammer tap wave 711 interacts with any corrosion or other flaws which may have developed in the tank bottom 706 to create a composite image of sensed signals detected by the receiving sensor 710 for a tank 702 having corrosion (or other defect) at a given location, e.g., grid crossing. This process may be repeated for the other sensors (not shown in FIG. 7) of the tank 702 to develop and associate a composite image that may be compared to composite image models of various grid crossings.

The composite image of sensed signals from the hammer tap wave (like an unknown face in a facial recognition system) is adapted for comparison with the "known face" Lamb theory dispersion curve models to characterize the tested tank bottom's corrosion (e.g., average wall loss over propagation length).

In an exemplary embodiment, cross-correlation of the wavelet transform image of the experimental wave and theoretical (e.g., Lamb mode) dispersion curves in frequency/time space. The curves are adjusted for propagation distance by dividing the propagation distance by the velocity for each frequency to provide the frequency/time plot. The wavelet transform image and the theoretical dispersion curves are used to determine, in an exemplary embodiment automatically determine, the wave modes contained in a signal. This exemplary embodiment can involve multiple modes at once (simultaneously) or individual modes, one-at-a-time. The wave modes are correctly time registered to account for the velocity differences between the modes.

Examples of this comparison is illustrated in FIGS. 9 and 10. In FIG. 9, $Plot_0$ represents a signal waveform, and $Plot_1$ represents a wavelet transform image of the signal waveform. A comparison of the wavelet transform image $Plot_0$ and theoretical dispersion curves for a tank bottom having a known defect in $Plot_2$ of FIG. 9 shows a relatively poor match.

$Plot_0$ to the left in FIG. 10 represents Lamb mode theory dispersion curves for a tank bottom having a known defect (different from $Plot_2$ in FIG. 9). The image ($Plot_1$) in the center of FIG. 10 is a wavelet transform image of a tank bottom having an unknown defect. $Plot_1$ further illustrates the wavelet transform image with a Lamb mode theory dispersion curve overlay, i.e., the Lamb mode theory dispersion curves of $Plot_0$ of FIG. 10 overlaid (or superimposed) on the wavelet transform image. $Plot_2$ to the right in FIG. 10 is a graph illustrating a cross-correlation analysis of the overlay. Maximum cross-correlation in $Plot_2$ between the Lamb mode theory dispersion curves and the wavelet transform image occurs a point "C," which corresponds to an index number of slightly less than 400. Maximum peak correlation indicates first wave arrival at the sensor, such as an acoustic or sound energy transducer. Point "A" represents no correlation, and point "B" represents a small correlation. Correlations other than the maximum correlation are attributed to noise and reflections in the signal that lead to incorrect peaks in correlation, such as represented by point "D" in $Plot_2$ of FIG. 10.

Figure 19:
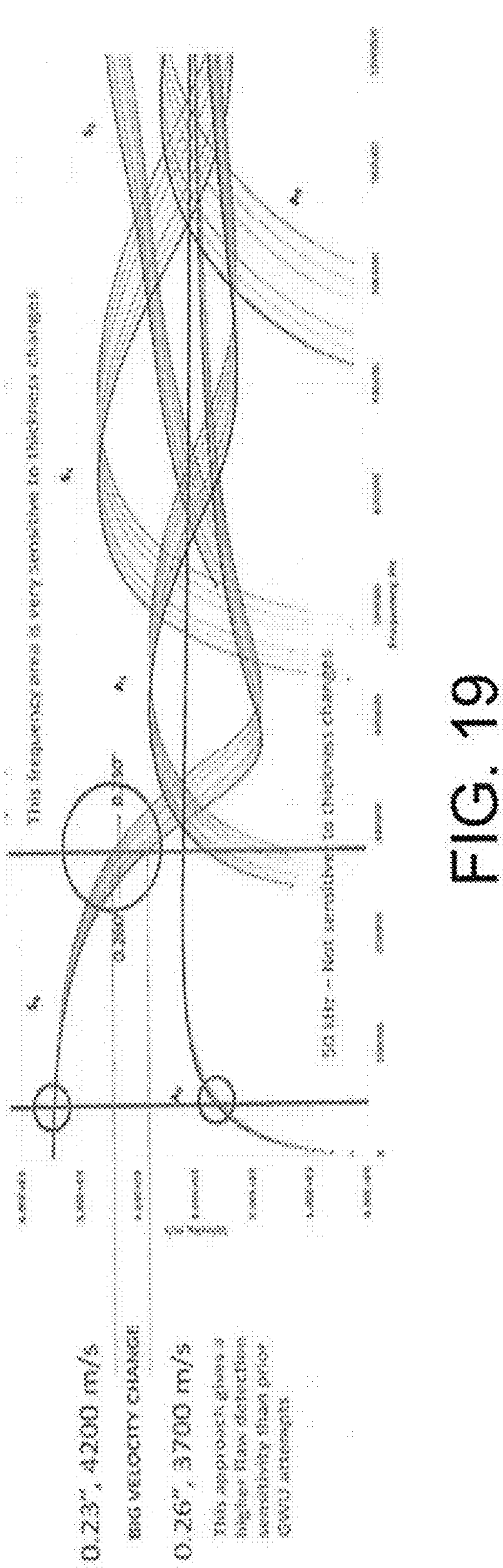
FIG. 19 is a graph illustrating theoretical dispersion curves as a function of thickness for aluminum plates of 0.23 inch to 0.26 inch thickness in 0.005 increments, in which the x-axis represents frequency and the y-axis represents velocity.

FIG. 19 illustrates Lamb mode theoretical dispersion curves for aluminum plates of different thicknesses, specifically from 0.23 inch to 0.26 inch in 0.005-inch increments, thereby providing seven theoretical dispersion curves for each of the six illustrated modes. In FIG. 19, the horizontal axis of the plot represents frequency (Hz) and the vertical axis of the plot represents velocity (m/s). This approach of considering multiple different thicknesses provides higher flaw detection sensitivity, e.g., in instances in which the defect creates a different (typically smaller) thickness at the defect location than surrounding areas. An acoustic wave propagating through a flaw of a reduced thickness (e.g., 0.247 inch) will differ from the acoustic wave propagating through the surrounding thickness (e.g., 0.250 inch).

Figures 20A, 20B, 20C:
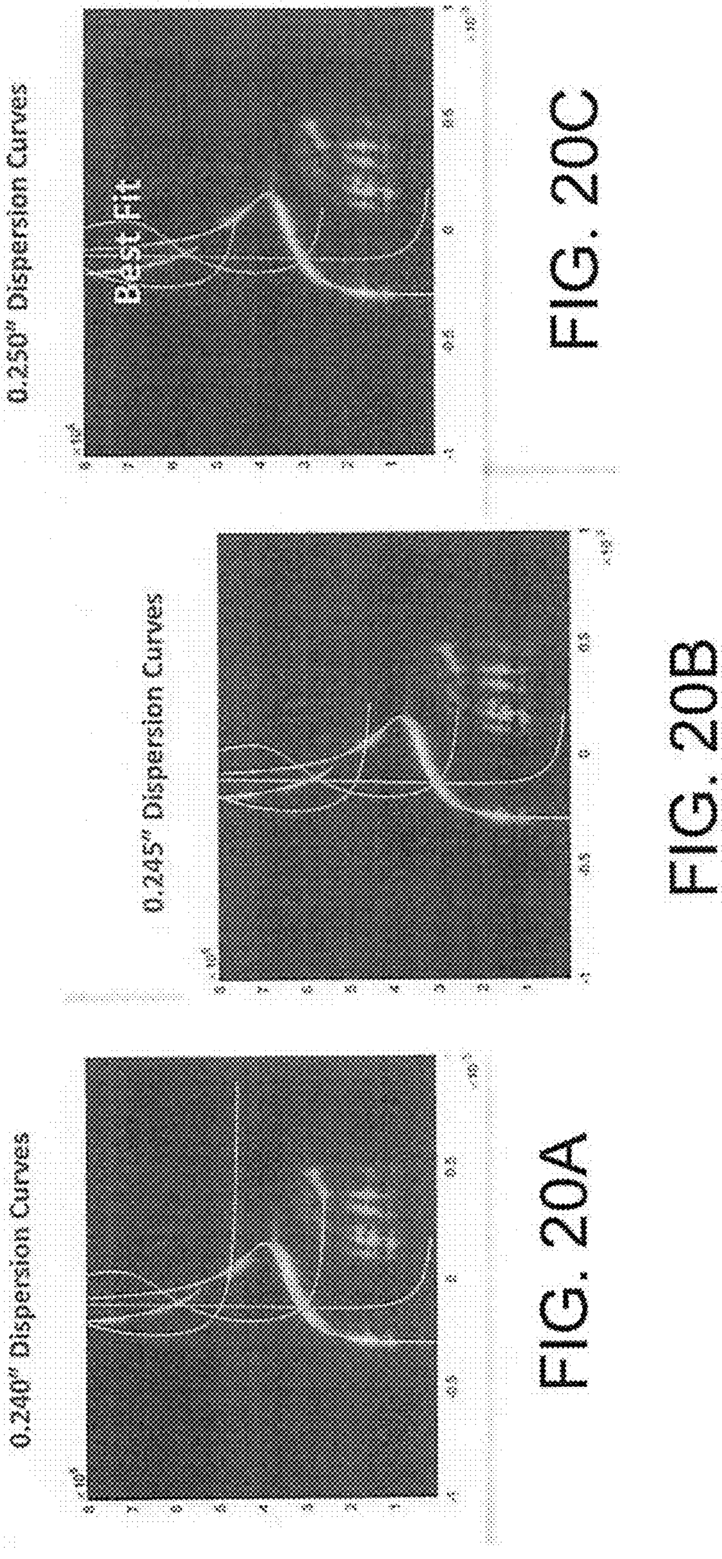
FIGS. 20A, 20B, and 20C illustrate 0.240 inch Lamb wave dispersion curves, 0.245 inch Lamb wave dispersion curves, and 0.250 inch Lamb wave dispersion curves overlaid on a wavelet transform image, wherein the locations of the Lamb wave dispersion curves are based on the best goodness-of-fit of the cross-correlation of the Lamb wave dispersion curves with the wavelet transform image.

FIGS. 20A, 20B, and 20C illustrate dispersion curves for 0.240-inch, 0.245-inch, and 0.250-inch plates, respectively, overlaid (or superimposed) on a wavelet transform image.

Figures 21A, 21B:
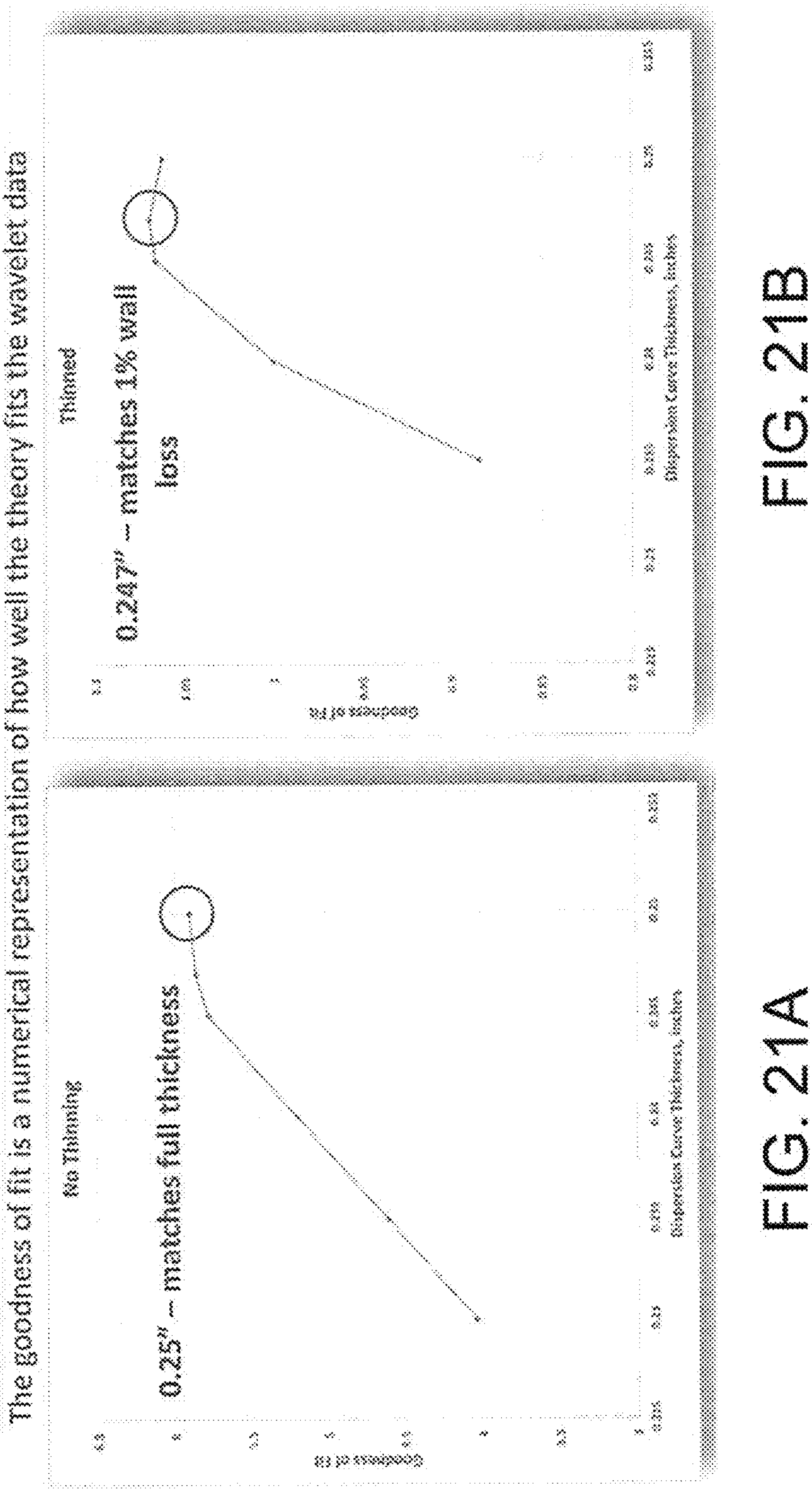
FIGS. 21A and 21B illustrate goodness of fit for a plate with no thinning and a plate with thinning, respectively, in which dispersion curve thickness (inches) is plotted on the horizontal axis and "goodness of fit" is plotted on the vertical axis.
Figure 22:
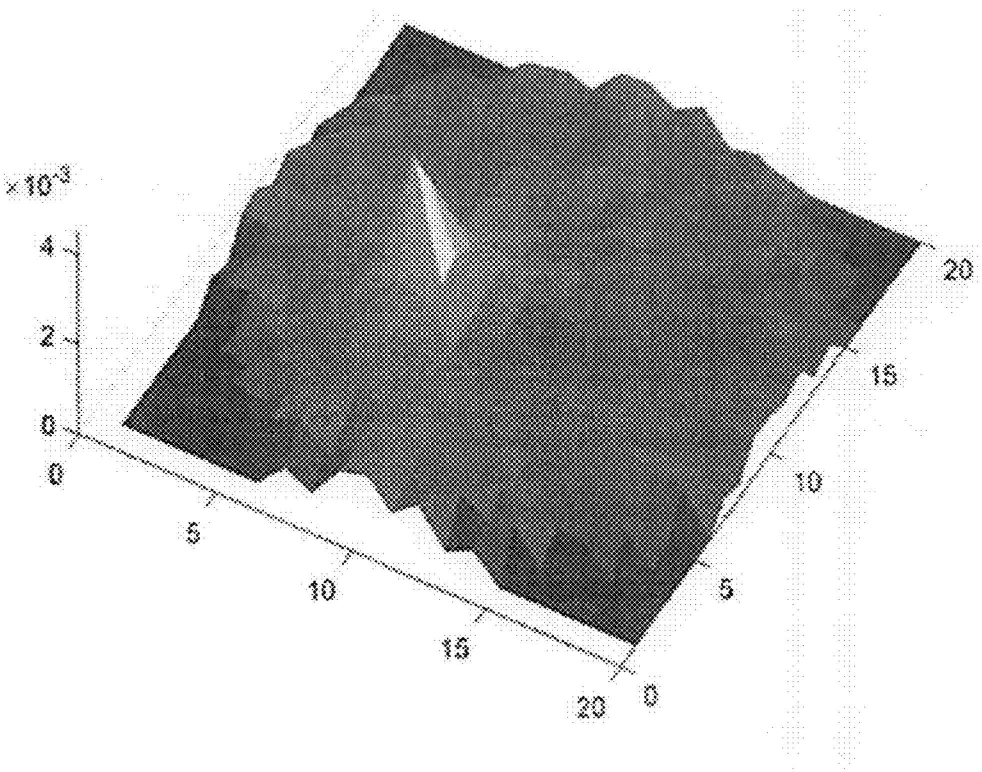
FIG. 22 is a tomographic reconstruction of the bottom of a tank according to an exemplary embodiment.

FIGS. 21A and 21B illustrate goodness of fit for a plate with no thinning and a plate with thinning, respectively. In FIG. 21A, a best match or best goodness of fit is found at 0.25 inch, which represents the full thickness of the plate. In FIG. 21B, for the same plate, a best match or goodness of fit is found at 0.247 inch, which matches a 1 percent wall loss such as caused by a defect or damage to the plate (and hence plate thinning in an embodiment). Goodness of fit is a numerical representation of how well the theory fits the wavelet data. In an embodiment, when the goodness of fit is maximized, the wavelet transform image of the captured signal has been matched to the dispersion curve (or curves) that is/are calculated using the average thickness of the plate that the wave propagated in.

Accordingly, in an exemplary embodiment, a wavelet transform image is cross-correlated with Lamb mode theory dispersion curves of different propagation distances to automatically determine characteristics of the signal. In an embodiment, the distance of the defect from the sensor or receiver (e.g., 710) is determined. This approach is threshold and noise independent. The cross-correlation peak arrival times in the individual mode cross-correlations are compared to determine the first arrival of the wave in the signal. The first arrival will have the first set of peak arrival times for each mode that are the same, or very close. In an exemplary embodiment, this technique overcomes the problem of incorrect arrival times due to reflections in the signal that lead to incorrect maximum peaks in the correlation(s).

Additional exemplary embodiments disclosed herein comprise adaptations which mitigate (or eliminate) reflection problems and/or noise from another source or other sources.

The system and method of exemplary embodiments thus overcome problems with sensed internal sound wave reflections, which, along with external noise, frustrated prior efforts to accurately estimate the location of the leak.

Sludge and Other Material Imaging

Additional exemplary embodiments disclosed herein comprise adaptations which mitigate noise from another source (or sources) and which allow a facilities operator to detect and measure sludge levels.

In the context of certain imaging, such as medical resonance imaging (or MRI), the different densities of organs in the (human) body respond differently to different magnetic resonance stimuli. Applicant has applied this observation to the analysis, including sensing and measuring, of sludge accumulation in a storage tank or other tank. Fuel or oil storage tank sludge typically comprises paraffins and sediment that settle out of the fuel or other product. The product (e.g., fuel) and the sludge have different densities and thus, propagate sound energy at different velocities. According to an embodiment, sound waves are propagated across a tank to generate an image of the sludge/product interface profile within the tank. The embodiment is non-invasive and cheaper to implement than paying for excess sludge removal.

Sludge detection in above-ground storage tanks—using sound waves the sludge in the bottom of tanks can be imaged using tomography. Placing sensors (e.g., 210, 212, 214, 216, 218, 220, 222 or 224) on the outside of the tank, and then sending acoustic or ultrasonic pulses across the tank (from mechanical source or hammer tap active transducers (e.g., 708) to those receiving sensors or transducers (e.g., 710) allows measuring the velocity differences between sensor pairs and permits generation of a model or image of the sludge level and profile. In an embodiment, the sensors are placed at various heights. In an embodiment, multiple sensor arrays are used, with a first sensor array positioned at a first height and a second sensor array positioned at a second height that differs from the first height.

Persons of skill in the art will appreciate that this application discloses several concepts which are more broadly applicable than the exemplary embodiments described and illustrated here. In broad terms, exemplary embodiments of the systems and methods described herein comprise one or more of the following significant advantages:

1. Cross-correlation of the wavelet transform image of a wave and an image of the Lamb mode theory curves in frequency/time space (curves are adjusted for propagation distance by dividing the propagation distance by the velocity for each frequency and mode in the dispersion curve) to determine, preferably automatically determine using software, the wave modes contained in a signal (see, e.g., FIGS. 9 and 10). This can be multiple modes at once (simultaneously) or individual modes, one-at-a-time. The wave modes are correctly time registered to account for the velocity differences between the modes. In this context, time registry is the time relationship of each mode to the other curves in the dispersion curve plots. This means that the relative time relationships between the modes over the frequency of interest found by dividing the propagation distance by the velocities of the modes using equations (1) and (2) are maintained when the individual correlations are performed. The (time, frequency) points are plotted.
2. Cross-correlating the wavelet transform with Lamb mode theory dispersion curves of different propagation distances to determine, preferably automatically determine using software, the distance of the source from the sensor or receiver (e.g., 710). This approach is threshold and noise independent.
3. Comparing the correlation peak arrival times in the individual mode cross-correlations to determine the first arrival of the wave in the signal. The first arrival will have the first set of peak arrival times for each mode that are the same, or very close. This overcomes incorrect arrival times due to reflections in the signal that lead to incorrect maximum peaks in the cross-correlation(s).
4. Cross-correlating the wavelet transform image with (Lamb mode) theoretical dispersion curves calculated with different plate thicknesses to measure, preferably automatically measure, the plate thickness via the theoretical dispersion curve that best correlates with the wavelet transform image from the acquired signal.

5. Using a Lorentzian pulse correlation with the signal to improve the wavelet transform resolution in time and frequency.
6. Enhancement of the wavelet transform image by amplitude leveling to provide better amplitude distribution in the wavelet transforms to improve the correlation results. The wavelet transform can also have other digital image processing applied, such as filtering, edge detection, smoothing, etc. to further enhance the image to improve the cross-correlation results. An embodiment of amplitude leveling is to calculate the average image pixel amplitude of the entire image by summing all the pixel amplitudes over the entire image, and then dividing by the total number of pixels. The average amplitude of each frequency slice, as shown for example in FIG. 29, in the image is calculated by summing the amplitudes of a frequency slice, and then dividing by the number of samples in the slice. The average amplitude of the entire image is then divided by each amplitude average of each slice to calculate a multiplier for each frequency slice. All the points in each frequency slice are multiplied by that frequency's multiplier to increase or decrease the pixel amplitudes to 'flatten' the image pixel values. If a frequency slice has an average amplitude that is much greater than the image average, the multiplier calculated will be less than one, and when multiplied by the pixel amplitudes in the slice, will decrease them. The opposite is true if the amplitude average of the frequency slice is less than the amplitude average of the frequency slice. The multiplier calculated will be greater than one, and the subsequent multiplication will increase the amplitude of the pixels in that frequency slice.
7. Wavelet transform enhancement to account for sensor effects (e.g., resonances). In image space the sensor response can be accounted for with amplitude modulation within the image. In waveform space the sensor response is deconvolved in frequency space. This involves taking the Fourier transform of the acquired signal and dividing it by the Fourier transform of the response of the sensor, and then inverse Fourier transforming the result to get the non-sensor colored response. If a frequency component of the transform of the sensor response is zero, it means that all the response information of the sensor at that frequency is lost. The division at that frequency results in an infinite result, causing the deconvolution to fail. See Press, W. et al., "Numerical Recipes in C," Cambridge University Press, 1992, p. 542.
8. Group velocity image space—analysis is no longer affected by phase shifts due to dispersion.
9. Theoretically calculating the amplitude distribution in a signal using numerical methods for different source orientations and depths and using this to develop theoretical Lamb mode dispersion curves containing the amplitude of each mode by frequency. These curves are then cross-correlated against the wavelet transform of the acquired signal to automatically determine the source criticality (orientation and depth) in the acquired signal.
10. Hardware—elimination of separate sensor signal preamplifiers to reduce electronic noise. Composite ceramic sensor elements (e.g., 210, 212, 214, 216, 218, 220, 222 or 224) to improve response.
11. The sensors or sensor elements (e.g., 210, 212, 214, 216, 218, 220, 222 or 710) may be piezo-electric structures comprising one or more ceramic discs, and by dicing the element, the radial resonance of the ceramic disc is moved to a much higher frequency, out of the desired monitoring frequency range. Also, it is believed, the smaller elements allow larger sensor diameters (thus providing higher sensitivity) without loss of signal due to phase cancellation. See, e.g., U.S. Pat. No. 5,191,796 (now expired).
12. The low noise electronics preferably no longer include separate preamplifiers, thereby reducing signal noise by eliminating added cabling and introduction of EMI via the added cables.
13. Sludge detection in above-ground storage tanks (ASTs)—using sound waves the sludge in the bottom of tanks can be imaged using tomography. Placing sensors (e.g., 210, 212, 214, 216, 218, 220, 222, and 224) on the outside of the tank, at various heights and then sending acoustic or ultrasonic pulses across the tank (from mechanical source or hammer tap active transducers (e.g., 708)) to those receiving sensors or transducers (e.g., 710) will allow measuring the velocity differences between sensor pairs and permit generation of a model or image of the sludge level and profile.

Certain exemplary embodiments described herein provide a novel approach for handling complex dispersive guided waves (GWs) that quantitatively analyzes the entire frequency band of the signal and correlates all the wave modes to physics-based theoretical dispersion curves in a robust and automated manner. The certain exemplary embodiments use image correlation techniques (analogous to facial recognition but applied to waveforms), based on group velocity Lamb mode theory to access the source information contained in the waves and accurately characterize defects in a structure, such as a plate. The group velocity space is the natural analysis space for dispersive waveforms and eliminates phasing issues that have plagued guided wave analysis. in an exemplary embodiment, wavelet transform image analysis identifies wave mode features that are typically lost in conventional signal analysis and advances the technology commercially.

In guided wave propagation, dispersion and multiple modes have been considered waveform analysis impediments. Incorporation of Lamb wave theory into the image analysis in accordance with exemplary embodiments described herein has improved analysis greatly. A 3D image of an experimental waveform can be created by using wavelet transform. Lamb wave modes for a given propagation distance can be calculated and plotted, and that 2D plot can be turned into an image. The wavelet transform image and the theoretical dispersion curves (e.g., the image derived from the Lamb wave theory) can be cross-correlated, analogous to facial recognition software, but applied to waveforms, to determine if the theoretical propagation distance matches the experimental data propagation distance. This results in a non-threshold-based analysis using the entire frequency spectrum contained in the signal. Using this approach, a library of theoretical dispersion curves based on propagation distances can be image correlated to find the correct propagation distance for a given waveform.

FIG. 9 discussed above illustrates how the traditional 2D waveforms (amplitude vs time) are transformed into three-dimensional images of frequency vs time vs amplitude and compared to Lamb mode theoretical dispersion curves to identify the wave modes in accordance with an exemplary embodiment. In the wavelet transform image, the signal is devolved into its separate frequency waveforms, and the waveforms are plotted to create a 3D plot. The wave modes that were unobservable in the raw waveform can now be identified in the wavelet transform image using Lamb theory as a guide.

FIG. 10 discussed above illustrates an embodiment of image cross-correlation. The theoretical dispersion curves are cross-correlated for a given propagation distance with the wavelet transform image of the measured signal. Maximum cross-correlation is determined. The determined maximum cross-correlation corresponds to the first arrival of the wave at the sensors. The cross-correlation is repeated for different propagation distances until an overall goodness of fit determines the overall best correlation with the theory. This cross-correlation analysis may be continued at finer increments of propagation distances until the desired level of accuracy is achieved. The result is an accurate determination of propagation distance in an automated manner.

According to an embodiment, the wavelet transform signal image is cross-correlated with theoretical mode images in a mode-by-mode fashion. By time registering the modes with each other via theory, and plotting the individual mode cross-correlations, there will only be one first arrival where all the mode correlations match in time. Reflections, due to their longer propagation distances, will not match.

Figure 25A:
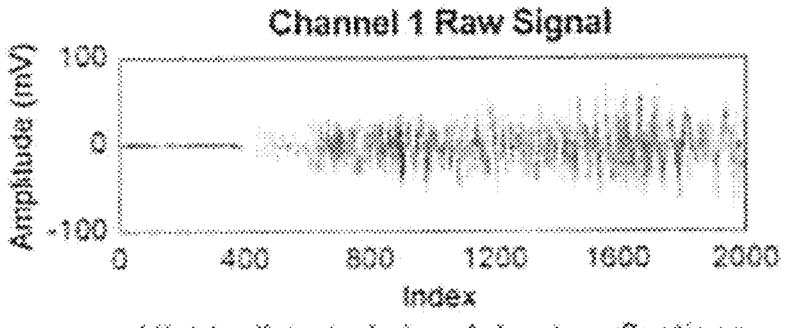
FIG. 25A is a graph of a raw signal with high distortion due to reflections, in which the horizontal axis represents time index and the vertical axis represents amplitude (mV).
Figure 25B:
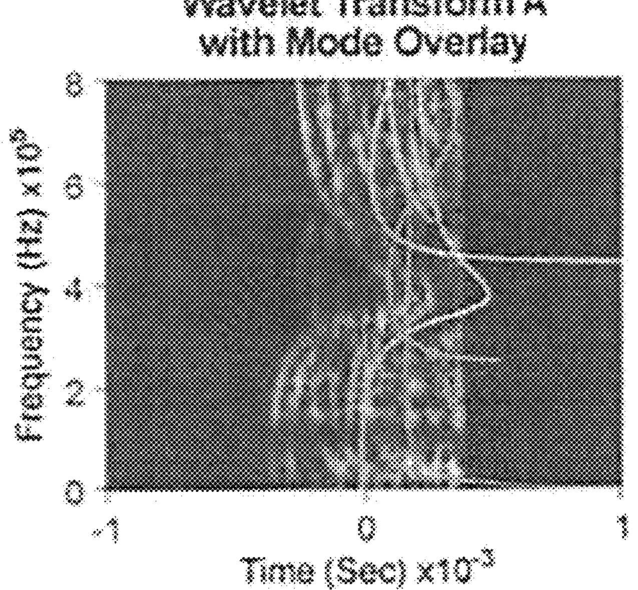
FIG. 25B is a wavelet transform image of the signal of FIG. 20A with mode overlay, in which the horizontal axis represents time (seconds) and the vertical axis represents frequency (Hz).
Figure 26:
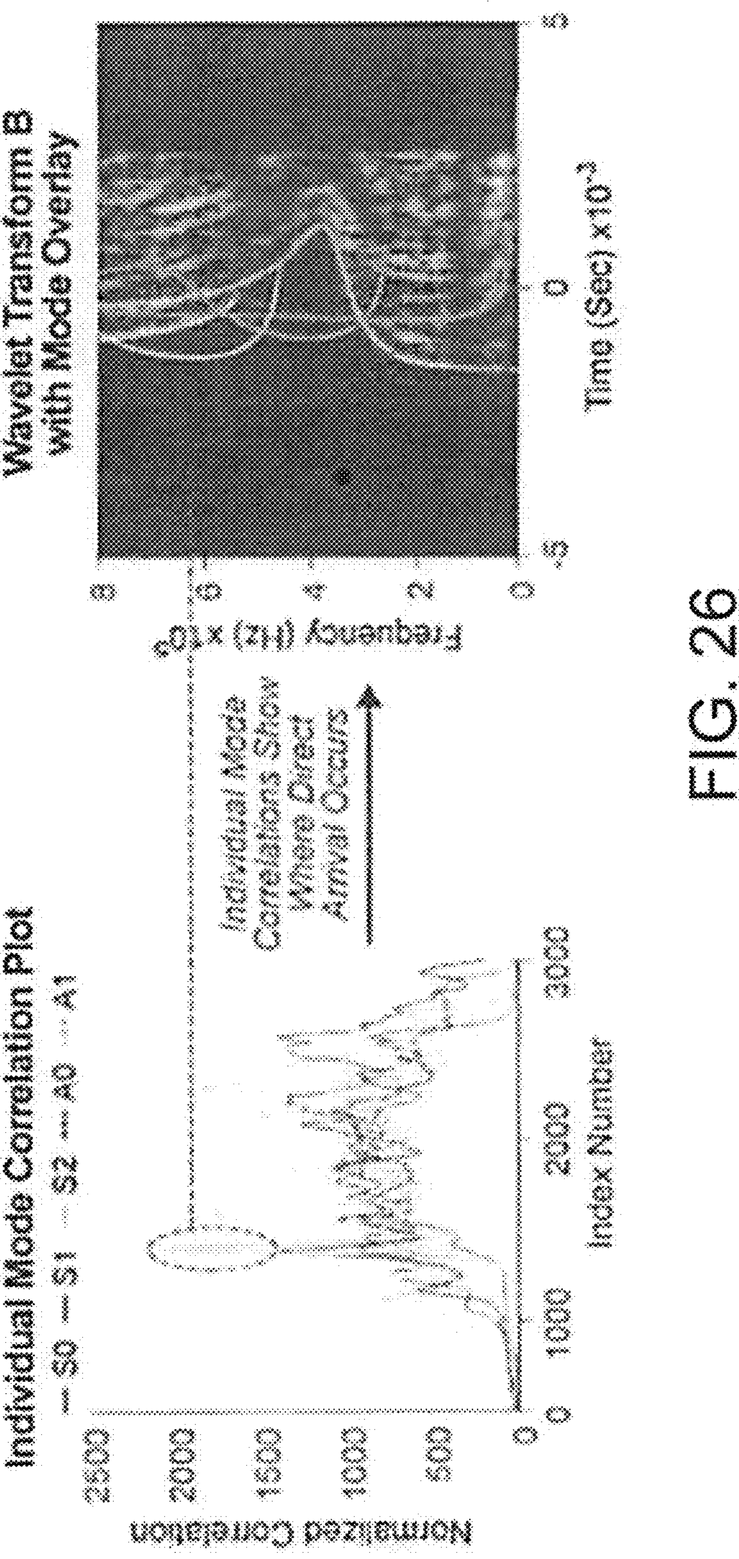
FIG. 26 illustrates individual Lamb wave dispersion curve mode cross-correlation plot and wavelet transform with mode overlay.

FIGS. 25A, 25B, and 26 show a raw signal (FIG. 19A) and a correlation plot for five modes for a 0.24-inch thick aluminum plate. The shaded area in the mode correlation plot shows where the first arrival occurs by ensuring the modes arrive at nearly the same point in time. Direct correlation of all six modes at once results in a peak in the image correlation plot (not shown) that coincides with a reflection. This is seen in the Wavelet Transform of the Sensor 1. Raw signal shown in FIG. 25B, where the theoretical dispersion curves are not located at the start of the signal. In the individual mode correlation plot, the location is found where each mode occurs at nearly the same point, and this index location leads to the direct arrival time in wavelet transform image B (FIG. 26) by ignoring later peaks in the correlation caused by reflections.

Figure 27:
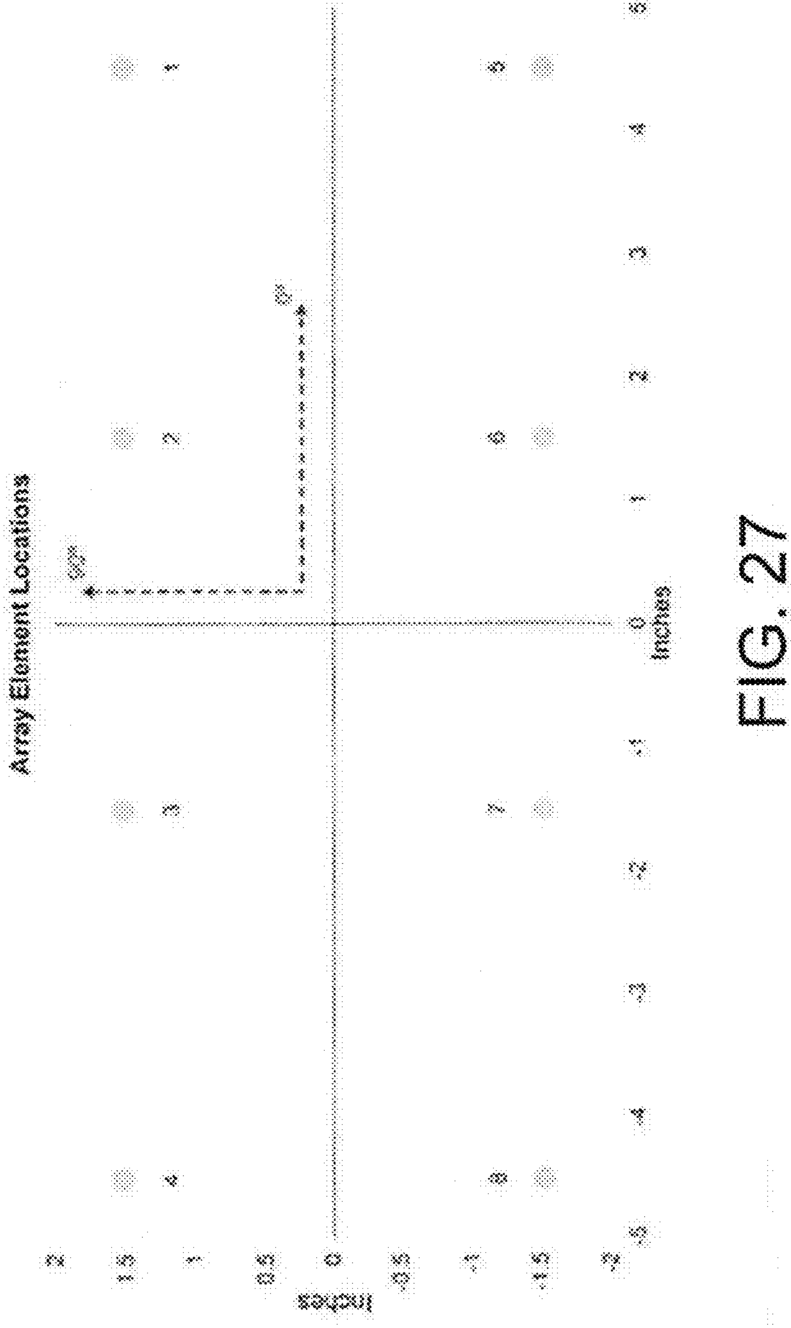
FIG. 27 illustrates a diagram of an array of sensors by locations superimposed on a Cartesian plot.

Turning now to FIG. 27, an angle of incidence calculation according to an embodiment is now described. FIG. 27 illustrates array sensor locations, specifically eight sensors designated with reference numerals one (1) through eight (8), respectively. The horizontal axis ranges from −5 inches to +5 inches, and the vertical axis ranges from −2 inches to +2 inches. The array dimensions shown are for three-inch element spacing. 0-degree and 90-degree directions are also shown in FIG. 27. For reference, sensor pair 1-2 is in the 0-degree direction, sensor pair 1-5 is in the 90-degree direction, and sensor pair 1-6 is in the 45-degree direction. The illustrated sensor array is in a 2×4 configuration with 3-inch spacing between sensors.

For the arrival time differences, the wavelet transform of each of the waveforms from the eight sensors (or channels) is performed. A sensor central to the sensors in the array is chosen to perform the digital image correlation with Lamb wave theory. A sensor central to the array is chosen because the arrival time at the centrally located sensor will be used to search for arrival time peaks in the other sensors. Starting with a sensor central to the other sensors minimizes propagation distance effects and simplifies the search. In FIG. 27, Sensor 2 in the array is chosen for performing the wavelet transform digital image analysis correction, and the results are used as the basis for finding the arrival times for the other sensors.

A single frequency, such as 120 kHz, is selected to perform the location analysis. For greatest location accuracy, the peak of the wavelet slice for Sensor 2 is then found that corresponds to the direct first arrival of the wave as determined by the image correlation analysis mode-by-mode approach. The first wave is normally the $S_0$ mode because it has the highest velocity. See FIG. 9 discussed above. Once this point is found, and because the sensor locations within the array are known, a time range within the eight plots for the $S_0$ can be searched that incorporates all the sensor locations within the array. The arrival time peaks for the $S_0$ mode (or other modes of interest) for all eight sensors can be located and used to calculate the incidence angles for each pair. By allowing the theory to guide the analysis as to where the signal mode arrivals are at, peaks due to reflections can be ignored and arrival times can be associated with modes.

This approach can be used for any frequency slice across the wavelet transform, and arrival time peaks determined for any mode or combination of modes within that slice. Accordingly, multiple arrival times can be measured and used as checks to ensure that measurements within the waveform are consistent. An embodiment of this approach is to use the mode location found via the image cross-correlation process, and then a representative total energy in the mode can be calculated by summing the amplitudes in the mode. If the mode contains sufficient energy, then a frequency slice through the mode can be chosen, and a determination of the energy at the chosen frequency made. If the mode/frequency energy is great enough to allow an arrival time measurement to made, then a source location can be calculated. This approach can be performed for multiple mode and frequency points in the wavelet transform to calculate multiple source locations. If the source locations calculated by the mode/frequency arrival time determinations within the array closely agree, then the calculated source location has a high confident factor. If the source locations are widely spaced, then the analysis has a low confidence factor.

To calculate source locations, arrival times for each element are determined using the image analysis approach discussed herein. Then, angles of incidence are calculated for each of the 0-degree pairs (e.g., 1-2, 2-3, 3-4, . . . ) using $\theta=\sin^{-1}(c\Delta t/d)$, where θ is the angle of incidence from the normal between two elements, c is the propagation velocity, Δt is the time difference of arrival between the sensor pair, and d is the distance between the element pair in the array.

Figure 28:
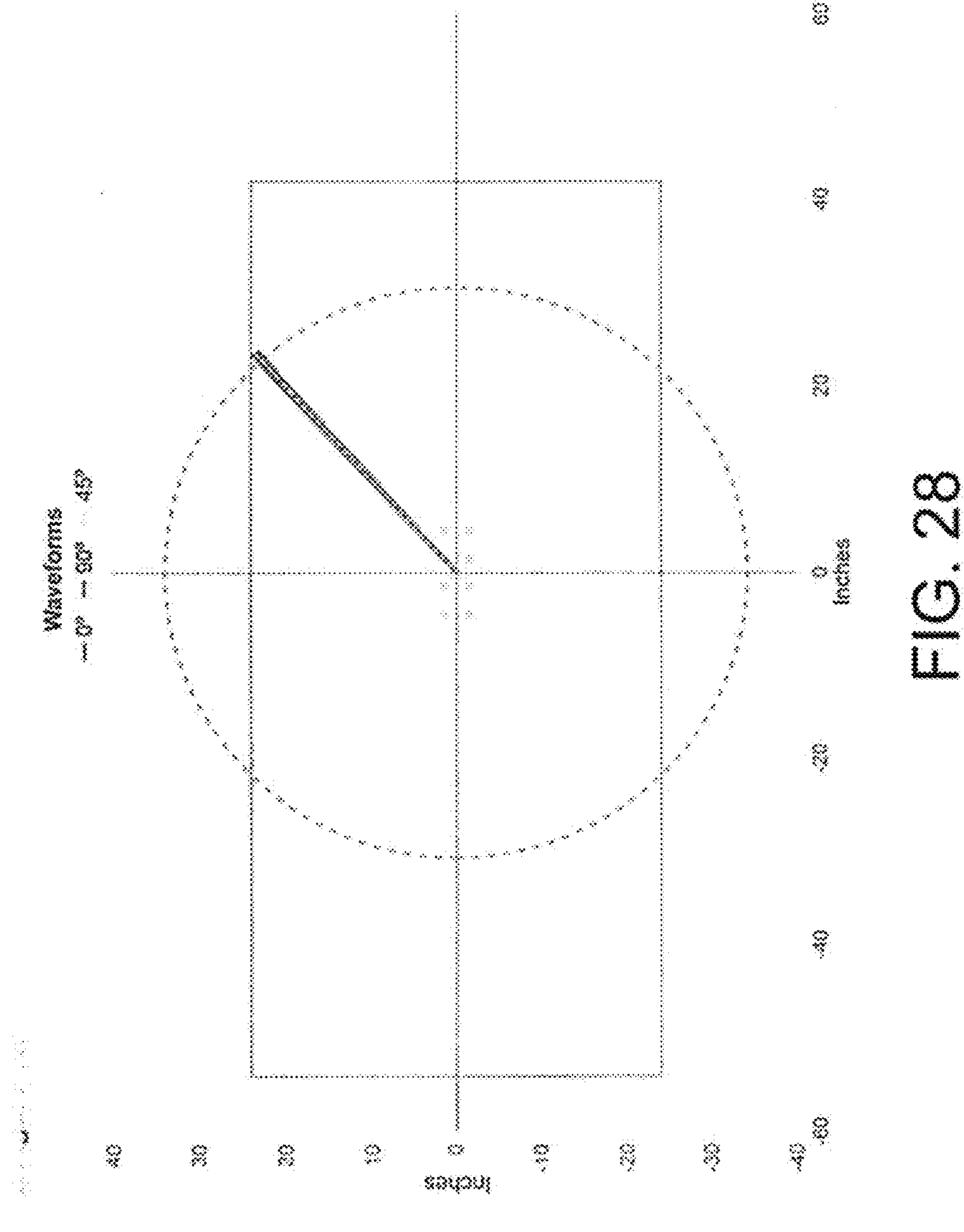
FIG. 28 illustrates a location plot for an edge lead break showing ranging distance and the angle of incidence results for 0-, 45-, and 90-degree pairs of sensors.

Then, the average of all the incidence angles from the 0-degree pairs is used to arrive at the final incidence angle calculation. If the angle calculated was in the +45-degree quadrant, for example, then the 45-degree sensor pairs "normal" to the wave propagation in that quadrant would be used for incidence angle calculations, e.g., in this example, sensor pairs 2-5, 3-6, and 4-7 would be used. The selection of the 45-degree pairs (plus or minus) is determined by the quadrant calculated for the 0-degree pairs. If the average angle calculated by the 0-degree sensors is less than 45 degrees (keeping with the +45-degree quadrant in the example), then the arrival time differences from the 90-degree sensor pairs (1-5, 2-6, 3-7, 4-8) would be used to calculate the incidence angle. Because wave arrivals that are perpendicular or nearly perpendicular to a sensor pair have the least amount of error in them, these are preferentially chosen for the incidence angle calculation. Averaging also helps smooth out variations in incidence angle calculations so as to provide an accurate source location. A typical source location that shows the measured propagation distance and angle of incidence is shown in FIG. 28.

As described above, U.S. Pat. No. 5,191,796 discloses piezoelectric sensors. According to an exemplary embodiment, one or more of the sensors used in the systems and methods described herein include one or more of the following characteristics: 0.375-inch diameter; element thickness defined by its resonance frequency of approximately 1 MHz to achieve the highest level of sensitivity over an expected frequency range of approximately 100 kHz to 1.0 MHz; PZT-5A ceramic element material; 1 MHz resonant frequency; aluminum oxide wear face; 0.015 inch wear face thickness by 0.450-inch diameter; no backing; no matching network; medium viscoelastic epoxy; and/or stainless steel housing of 0.485-inch diameter and 0.510-inch height. The sensor element fit within a single sensor housing is made of stainless steel to prevent corrosion and provide EMI shielding. The ceramic elements are held in place with fixtures and the void space is filled with a potting epoxy or silicon putty or firm but pliable equivalent material. The wires attach to a connector mounted on the sensor housing. The front wear face protrudes slightly above the top of the sensor housing and attaches directly to the structure being mounted. Piezoelectric materials include large $g_{33}$—voltage constant (voltage generated from a given displacement); small $g_{31}$—radial response due to a thickness displacement; low Q—response of the ceramic at resonance; and relatively high $T_C$—Curie temperature or the temperature at which the crystal de-poles. The PZT-5A ceramic element material may be assembled into 1-3 composite. PZT-5A 1-3 composite combines 70% volume fraction of piezoelectric material and 30% volume fraction passive hardset epoxy filler.

Figure 29:
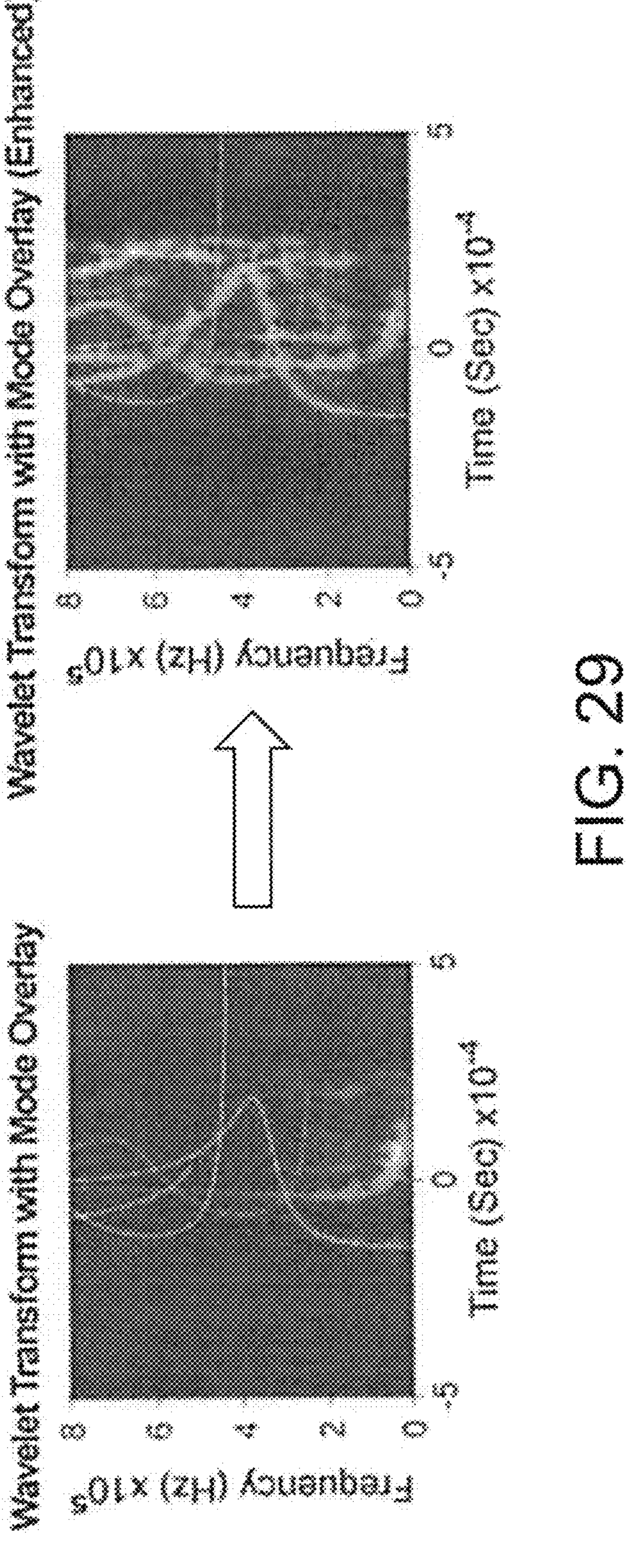
FIG. 29 illustrates an example of image enhancement of a wavelet transform image.

FIG. 29 shows the wavelet transform image of a signal from experimental data overlayed (or superimposed) with theoretical dispersion curves (solid lines). The left image is not enhanced, whereas the right image is the same data enhanced using simple pixel stretching. A simple pixel stretching technique is described in, for example, Umbaugh, S., "Digital Image Processing and Analysis," 3d Ed., CRC Press, 2018, pp. 395-397. The use of pixel stretching is not necessarily limited to the technique described in Umbaugh. The higher order modes are much more visible and when performing the image cross-correlation, give better results. This means that higher order modes can be used to perform group velocity arrival time measurements for incidence angle calculations, leading to verification of the source location using multiple modes and frequencies, which leads to higher confidence levels in the analysis results.

According to an exemplary embodiment, wavelet transform images are enhanced by frequency slice. In a first step, the wavelet transform amplitudes are leveled. Image analysis stays in group velocity space. Phase shifts that occur in guided wave propagation are no longer an issue. According to an exemplary embodiment, a median and mean are calculated for an entire image. For each frequency slice, the mean value is calculated. The image mean is divided by the slice mean to calculate a weighting value for the slice. A slice with a mean less than the image mean weighs greater than one (1). A slice with a mean greater than the image mean weighs less than one (1). All pixels below the image median are zeroed to clean up the image for correlation analysis. This technique may be applied multiple times to level the image more and more.

The novel system and method of certain exemplary embodiments include a new technology and method for analyzing propagating waves in plate-like structures to identify, locate, and characterize sources of defects, such as cracks and impacts in the presence of background noise and dispersion which would normally confound the analysis and lead users to focus on single or very narrow frequencies and at most the two lowest order wave modes ($S_0$ and $A_0$). The method of certain exemplary embodiments is called Ultrasonic Mode Imaging (UMI). UMI represents a major step forward in signal processing and analysis in both passive and active applications because UMI is physics-based and leverages higher-level wave modes in Guided Waves ("GWs") to provide rich information about the source.

The UMI system and method of certain exemplary embodiments represent a breakthrough advancement that goes way beyond the prior state of the art in analysis of GWs and defect characterization in structures. UMI systems and methods of exemplary embodiments described herein involve a novel approach for handling complex dispersive GWs that quantitatively analyze the entire frequency band of the signal and cross-correlate all the wave modes to physics-based theoretical dispersion curves in a robust and automated manner. UMI systems and methods of exemplary embodiments described herein use image cross-correlation techniques (e.g., analogous to facial recognition for waveforms), based on group velocity Lamb mode theory to access the source information contained in the waves and accurately characterize defects. The group velocity space is the natural analysis space for dispersive waveforms and eliminates phasing issues that have plagued guided wave analysis. The wavelet transform image analysis software automatically identifies wave mode features that are typically lost in conventional signal analysis and automating the analysis moves the technology down a commercially viable path. Fundamentally, UMI makes the higher-level wave modes in GWs signals visible through 3D imaging analysis, automatically locates and characterizes defects in structures, and is the key enabler to make structural health monitoring systems affordable and effective.

The UMI system and method of exemplary embodiments allow automated analysis of guided waves (GWs) in plates and other structural members for the identification of flaw growth with automated monitoring of changes in flaw growth and flaw growth severity so that repairs can be made to structures long before failure occurs.

Potential space program applications include, for example, automated monitoring of composite pressure vessels, composite materials, and other large metallic and composite structures as well as reusable vehicles (e.g., lunar landers while in transit to launchpad and final destination).

Terrestrial applications include: Navy, Coast Guard, and commercial shipping, including, for example, ship hulls and structures (e.g., aluminum, metal, and composite) (e.g., manned and unmanned): Navy submarine pressure vessels; composite high pressure air tanks; petrochemical applications (e.g., leak detection in above-ground storage tanks and pipeline leak detection); civil engineering applications, including structural integrity monitoring and evaluation of civil structures such as bridges, tunnels, high tension power poles, main building girders; and in systems in which pressure vessel requalification is desired or suitable for enhancement, such as DOT regulated pressurized tanks and cylinders.

As noted above, known techniques have substantial disadvantages or limitations which prevent effective implementation of an automated system for detecting and observing changes in cracks or other defects structures. The traditional FEA modeling tools for GW analysis require a great deal of computational overhead and are thus expensive and require a long time to perform. Plus, analysis of defects using known techniques is limited to interpretation of two-dimensional (2D) data which is very difficult. None of the known techniques provides automated analysis of measured results. Instead, known techniques require manual analysis of reams of data by trained experts and thus are not very practical for most organizations.

The UMI system and method of exemplary embodiments provide a practical and effective mechanism for automating analysis of extremely complex guided waves in structures used in noisy, severe environments. Advantages provided by the UMI system and method that may be implicit to one or more exemplary embodiments disclosed herein include:

- Ability to identify fault signals in data with signal to noise ratios less than one.
- Ability to monitor large structures with only a few sensor arrays.
- Automated analysis of sensor signals provides immediate feedback to operators in real time instead of relying on experts to interpret reams of data.
- Locate source of defect with high degree of accuracy, and differentiate between different types of defects and characterize the severity of the defect.
- Monitor structures for cracks directly instead of having to infer potential for crack growth based on strain measurements and fatigue life calculations.

The UMI system and method of exemplary embodiments provide a new technology and approach for analyzing propagating waves in plate-like structures to identify, locate, and characterize sources of defects, such as cracks and impacts, in the presence of background noise and dispersion which normally confound the analysis. Known approaches focus on single or very narrow frequencies and at most the two lowest order wave modes ($S_0$ and $A_0$). Ultrasonic Mode Imaging (UMI) represents a major step forward in signal processing and analysis in both passive and active applications because UMI leverages higher-level wave modes to provide rich information about the source.

Key elements of UMI in exemplary embodiments include one or more of the following:

- Guided waves (GWs) are generated in a structure under load from a defect such as a crack (passive application) or introduced into the structure with a mechanical device (e.g., a pulsing transducer) to interact with defects such as cracks, corrosion, voids, and dis-bonds (active application).
- Sensitive, broadband sensors that are optimized to record higher-level wave modes are used to measure the wave signals, and the signals are then digitized and recorded as waveforms (e.g., as 2D plots of amplitude versus time).
- The waveforms are converted into 3D wavelet transform images of frequency, time, and amplitude which make the higher-level wave modes visible and easy to differentiate from background noise, dispersion effects, and reflections.
- The wavelet transform images are correlated (e.g., cross-correlated) with Lamb wave theoretical dispersion curves, preferably in an automated manner using image correlation techniques with software, to identify signal arrival, propagation distance, and/or individual mode energy in the inspection data even in the presences of noise, reflections, and distortion caused by dispersion.
- Individual wave modes are analyzed to identify specific defects in the structure and characterized as to type, extent, and severity.
- The wavelet transform images are optionally enhanced using pixel stretching techniques so that the higher order wave modes are much more visible, and when performing the image correlation, give better results.

A potential use of the UMI system and method of exemplary embodiments is to break through the barriers that have inhibited analysis of dispersive GWs in the past and implement a highly effective analysis capability that correlates measured ultrasonic higher-level wave modes with Lamb wave theory to identify, locate, and characterize defects in structures with greater accuracy and precision. UMI is the foundation for developing an affordable and effective structural health monitoring capability and system, and automating the analysis makes it practical for real world applications by delivering real-time results.

Figure 23:
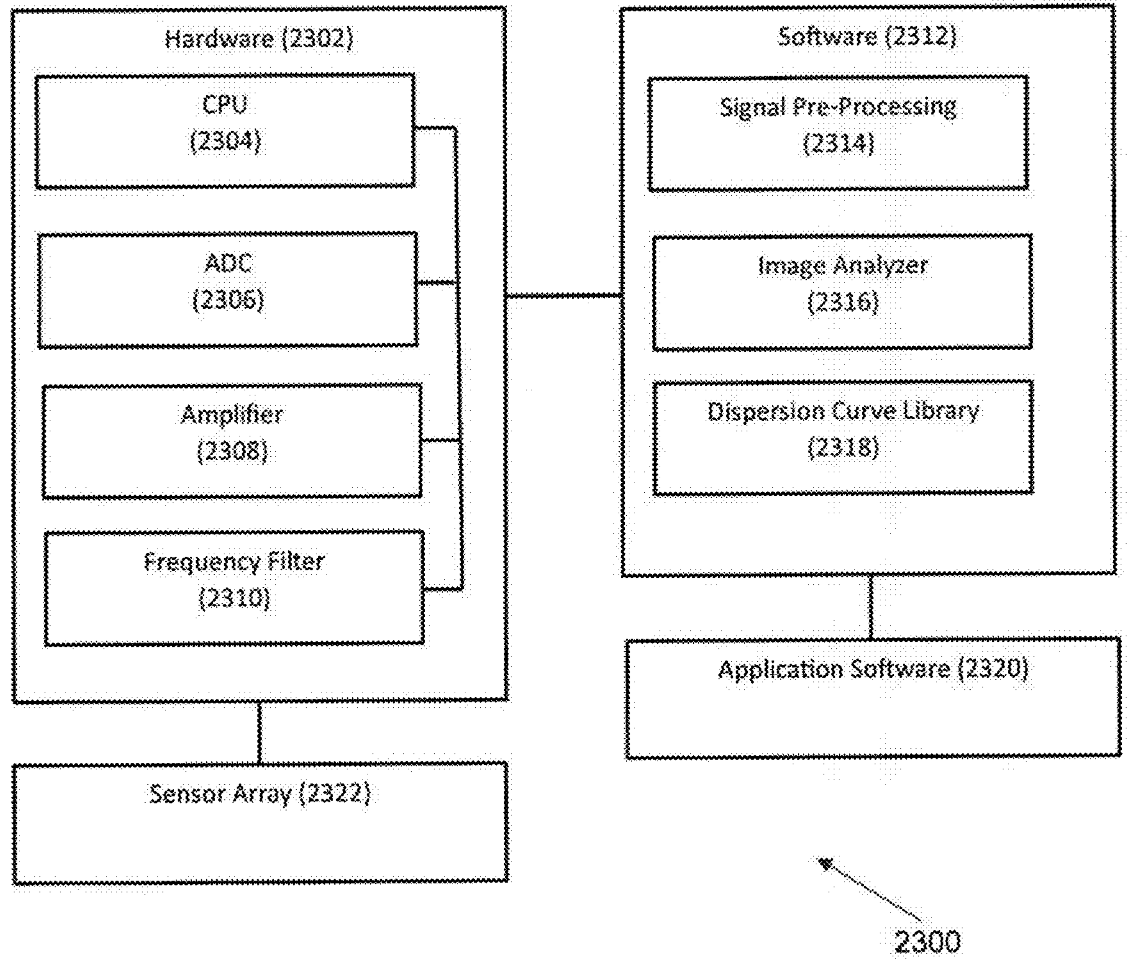
FIG. 23 is a diagram illustrating components (including both hardware and software) of a system according to exemplary embodiments.

FIG. 23 illustrates an exemplary embodiment of a system for carrying out methods described herein. The system 2300 of FIG. 23 includes hardware 2302, software 2312, application software 2320, and sensor array 2322. The hardware 2302 includes a central processing unit ("CPU") 2304, an ADC 2306, an amplifier 2308, and a frequency filter 2310. The software 2312 includes signal pre-processing 2314, an image analyzer 2316, and a dispersion curve library 2318.

Figure 24:
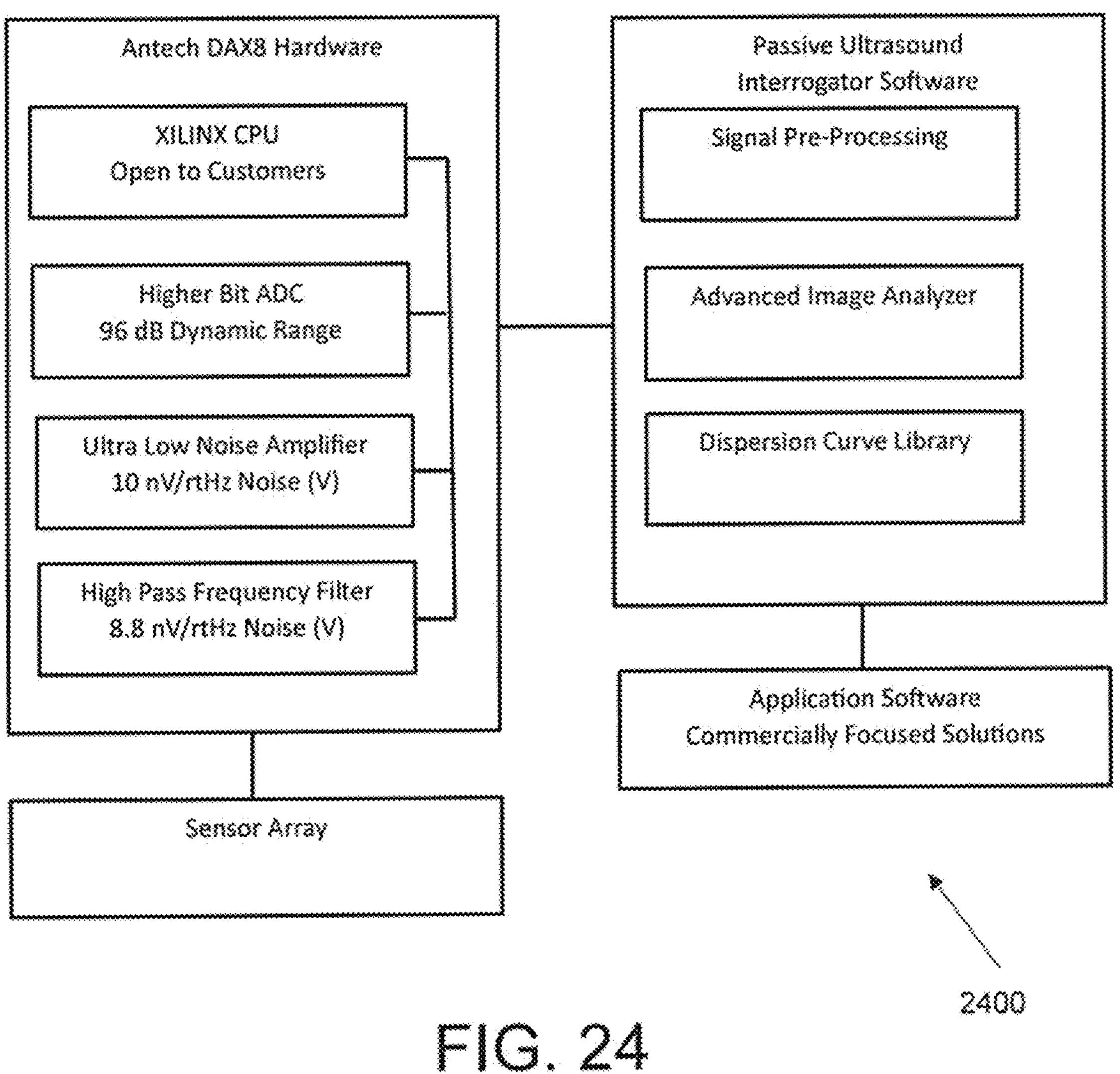
FIG. 24 is a diagram illustrating components (including both hardware and software) of a system according to an exemplary embodiment.

Turning now to FIG. 24, an embodiment of an enhanced Structural Health Monitoring ("SHM") system is illustrated. FIG. 24 depicts the UMI system components, data flow, and signal analysis software developed to significantly improve monitoring performance by increasing the dynamic range and sensitivity levels of the instrumentation and produce a highly effective passive monitoring system for users with rigorous requirements (e.g., in spacecraft, aircraft or on board ships).

The component parts of a system of an exemplary embodiment providing UMI analysis capability include one or more of the following:

- Sensors in an optimal array pattern with a specially designed sensor configuration to optimize higher-level wave modes and achieve at least a 12-16 dB gain in sensitivity over commercially available AE sensors.
- Antech Systems DAX8 low noise electronics hardware to filter, amplify, and digitize sensor signals with a dynamic range of at least 80-96 dB.
- A Field Programmable Gated Array (FPGA) device with memory and programmable software available to customers to process and transfer digitized signals to the laptop for analysis.
- Antech Systems' proprietary passive ultrasound interrogator software to perform signal processing and advanced imaging analysis.
- Dispersion curve libraries and application software to furnish commercially focused solutions to customers, such as for NASA vehicles and Navy ships.

UMI is preferably implemented in a functional Structural Health Monitoring ("SHM") system to provide either passive or active monitoring of structures. The software delivering UMI capability preferably operates full time to deliver automated effective Structural Health Monitoring results with real time characterization of defects in the structure.

The number of sensors, materials used for the sensing elements, array size and geometry, and software analysis routines may be adjusted to the specific structure(s) being monitored based on dimensions (length, width, thickness) and type of material (steel, aluminum, composite) of the structure(s).

To a person skilled in the art, the use of artificial intelligence (AI) can also be used to identify wave modes in a wavelet transform image of a digital signal. In an alternative embodiment of the method, a library of possible dispersion curves for material type (in either isotropic or anisotropic material) is calculated. This library of calculated (theoretically generated) dispersion curves may be used to train an artificial intelligence system performing the UMI enhanced SHM analysis method of an embodiment to recognize the modes in the theoretically generated dispersion curves. The system can then be fed images of wavelet transforms of digital signals, and the AI system trained on the theoretical curves can determine if those same images exist in the wavelet transform images.

The passive monitoring or active inspection of plate-like structures using guided waves has been researched extensively, but the application of the technique has remained limited. This limited application of the technique is due to the complex wave propagation that occurs in plates and the difficulties the complex wave propagation causes in analyzing signals.

Guided wave signal analysis has been constrained by the 2D amplitude/time waveform representation of the propagating wave. Guided wave signals distort and change shape as the wave signals propagate due to dispersion, multiple wave modes, attenuation, and reflections. A single set of analysis parameters cannot accurately describe the wave signal at different points in time or propagation distances. Energy, amplitude, frequency content, and mode content change as the wave signal propagates. A set of analysis parameters that work for a given material, geometry, source, or propagation distance will result in an incorrect analysis if slight variations occur in these parameters. It would be preferred to use an analysis technique that can automatically adjust to the multitude of propagation effects as a function of material, structure geometry and source characteristics. Such analysis focuses on the invariant propagation parameters, such as velocity as a function of each wave mode at given frequencies. To accurately accomplish the analysis, theoretical prediction of all modes and dispersion characteristics over the frequency range of interest are desirably incorporated into the analysis. Current analysis techniques try to do this by using finite element analysis (FEA) software to model waveforms based upon the material and structural geometry. The modeled waveforms are cross-correlated against the captured signals to determine matches. However, this approach is time consuming and expensive. The correlations in waveform space are prone to errors due to small phase shifts between the modeled signal and the experimental signal caused by slight variations between the material and structural properties for the modeled waveform and the properties in the physical structure. Those errors result in poor correlations.

Figure 30:
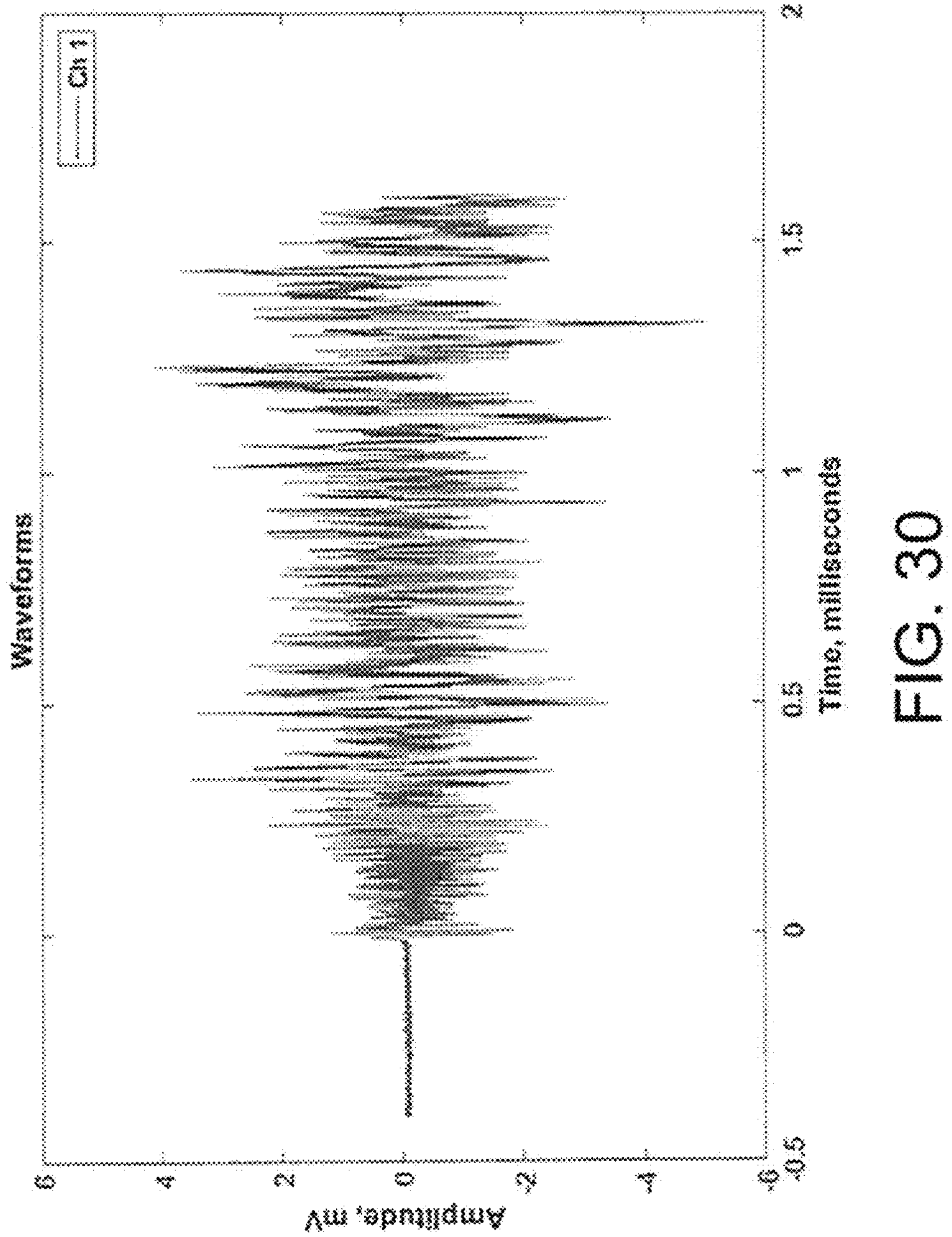
FIG. 30 is a two-dimensional representation of a broadband guided waveform after propagating in a plate structure, in which the horizontal axis represents time (milliseconds) and the vertical axis represents amplitude (mV).

As an example of the above-discussed principles regarding two-dimensional (2D) waveform representations of a propagating wave, a representative guided wave from a broadband impulse source (a Pentel 2H 0.5 mm lead break on the edge of a plate) is shown in FIG. 30. The wave propagation characteristics in the signal cannot be easily discerned in the 2D representation space of amplitude and time. The difficulty in discerning the wave propagation characteristics is due to the complex wave propagation that occurs in plates and the difficulties the complexity causes in analyzing signals. Dispersion, reflections, and attenuation all lead to a nearly intractable analysis environment when analyzing the captured waveforms from a source, whether passive or active. One approach is to try to limit the frequency and wave modes in the analysis in an attempt to allow conventional ultrasound analyses, such as peak amplitude detection, gating, threshold arrival times, or phase measurements of the signal, to be used. Another approach is to predict the waves excited using numerical methods software (e.g., finite element analysis (FEA)) and correlate the predicted waveforms to the experimentally captured waveforms to determine if there is a match. The modeled waveforms contain the dispersion, reflection, and attenuation effects of the wave propagation in the 2D waveform. While the FEA approach has had limited success, the FEA prediction of waveforms is very time consuming and expensive because many waveforms must be calculated to account for propagation distance and reflections. Furthermore, the source orientation and depth must also be accounted for because these factors control the modes excited. For a single location, multiple waveforms must be calculated. Thousands of waveforms may be needed to perform an acceptable inspection of commercially sized structures. Another drawback is that FEA software is expensive and requires a skilled individual to perform the analysis. Accordingly, waves in plate-like structures are very different from the typical bulk or surface waves found in conventional ultrasound methods, and thus, would benefit from different analysis approaches.

Figure 31:
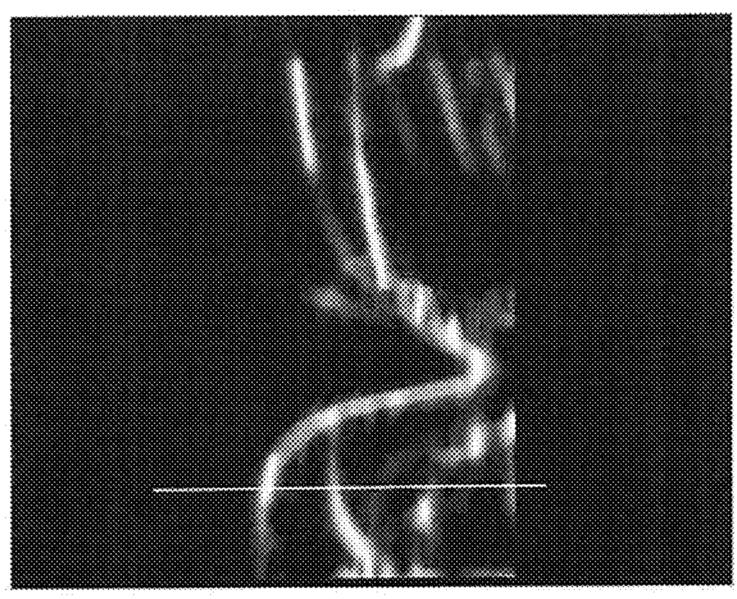
FIG. 31 is a three-dimensional representation of a wavelet transform image of the signal of FIG. 30, in which the horizontal axis represents time, the vertical axis represents frequency, gray scale represents amplitude, and the line in the plot references a frequency slice within the wavelet transform image.

Wavelet transform images expand the signal in time, frequency, and amplitude to give a three-dimensional (3D) representation of the signal, as shown in FIG. 31, allowing the wave propagation characteristics to be more easily observed. The mode content of the signal is shown as the light gray areas in FIG. 31. The wavelet transform provides the ability to generate wavelet transform images that expose the modes in the signal. However, the ability to autonomously detect and identify these modes in the wavelet transform images has heretofore not been robustly accomplished. The simple approaches assume that peaks in a search along a frequency slice in the wavelet transform images will correlate to each mode as they arrive in time. However, if noise or reflections are present in the signal, or a mode is not present, this "simple" approach will produce erroneous results. Other techniques look for ridges in the wavelet transform images and see if the ridges match a theoretical mode. Typically, the search for the ridge will use a penalty function to try to keep the search along the ridge. The penalty function uses a weighting factor that must be manually adjusted for the quality of the signal and the mode being searched for, requiring an expert to optimize the search. There are methods that back-propagate the signal for an assumed distance, and when the dispersed signal energy for a given distance and mode reaches a maximum, it is known that the mode is contained in the signal, as well as the propagation distance. However, noise and reflections can cause issues with the analysis.

Generally, according to exemplary embodiments described herein, digital image correlation techniques can quickly, automatically, and accurately identify details in images. When guided wave signals, which are very convoluted due to multiple modes, dispersions and reflections, are wavelet transformed, a 3D wavelet transform image of the wave propagation characteristics in the signal is created. The wavelet transform image is a mix of the propagating modes, the dispersion of the signal due to propagation distance, and material properties, as well as reflections, if any. In order to automate the detection and identification of these characteristics, a second image (also referred to as the theory or theoretical dispersion curve image) containing these dispersion characteristics can be created using guided wave theory. The theoretical dispersion curve image contains the signal propagation characteristics of the wave propagation in a structure. Correlation of the two images (i.e., the wavelet transform image and the theoretical dispersion curve image)

determines if the known signal characteristics in the theory dispersion curve image matches those in the unknown-signal wavelet transform image, resulting in an automated analysis of the wave modes contained in the signal. According to a robust approach of an exemplary embodiment discussed in further detail hereinbelow, invariant parameters (e.g., velocity of each mode) are used to autonomously identify the modes with a high degree of confidence.

According to an exemplary embodiment, a method is provided to determine the source of a guided wave in a structure using images of the dispersion curves for the structure and the wavelet transform of captured guided wave. The method involves cross-correlating the images of the dispersion curves and the wavelet transform to identify a match. This embodied method eliminates the phase shift errors contained in the waveform cross-correlation, because the wavelet transform shifts the analysis into group velocity, where phasing is no longer an issue. According to an embodiment, all the wave propagation characteristics for the structure are contained in the images, both theory (e.g., Lamb mode theory) and experimental (e.g., of unknown origin), of the dispersion curves. According to an embodiment, the image(s) of the theoretical dispersion curves are the complete wave propagation characteristics, optionally known a priori to capturing experimental data for the wave of unknown origin, while the experimental dispersion curves contain the modes excited by the source and structure. When the theoretical dispersion curve image is adjusted for propagation distance to match that of the experimental data, the modes contained in the signal can be identified (optionally automatically using a computer and software with a non-transitory, computer-readable media (e.g., program code) executable by a computer processor to carry out the various functions and steps described herein) and extracted from the correlation results.

Theoretical dispersion curves can be calculated using, for example, Lamb mode theory (e.g., for simple plates), or FEA analysis (e.g., for more complex structures). Material properties, such as geometry, stiffness, and density, can be adjusted until the best correlation is found between the two images.

A way to automate this analysis so that this high degree of confidence can be reached is to compare the Lamb theory dispersion curves directly to the wavelet transform images generated from the experimental data. Because the wave propagates according to theory, this theoretical a priori knowledge is a very powerful analysis tool to identify modes. This mode identification can be done either through image cross-correlation or the use of artificial intelligence (AI) analysis, e.g., using a neural network. For example, in isotropic structures, a single Lamb mode wave dispersion curve can be used to account for many different propagation distances, e.g., by changing an input variable or input variables of Equations (1)-(4). The Lamb mode wave dispersion curve (also referred to herein as an example of a theoretical dispersion curve) can be transformed mathematically (from velocity as a function of frequency) by dividing the propagation distance by each mode's velocity (calculated using the Lamb mode dispersion equations (1) and (2), and from that calculating the group velocity) to account for propagation distance, e.g., to transform the velocity that was calculated to a propagation time. The propagation time plotted as a function of frequency results in a 2D plot that matches the variables plotted in the wavelet transform image. Both methods (i.e., image cross-correlation and AI analysis) use the theoretical Lamb wave dispersion curves calculated via Lamb mode theory (or FEA for more complex structures) to either image cross-correlate or to be used as a training data set to determine the mode content of a signal.

A characteristic of this approach is that dispersion curves will only strongly cross-correlate with propagating guided waves contained in the waveforms since the guided waves propagate according to the theory. Other phenomena, such as electro-magnetic interference (EMI), flow noise (e.g., noise from turbulent flow of a gas or liquid), or mechanical noise, do not propagate as impulsively excited waves, and thus do not strongly cross-correlate to the theory. Reflections can also be identified in the image cross-correlation results and ignored in the analysis.

Based on the material properties and the thickness of the structure, Lamb wave dispersion curves can be calculated using Equations (1) through (4), which are provided above and reproduced below for convenience. Methods for solving the equations are well documented in the literature. See, e.g., Bakhcha, M. et al., "Lamb Wave Propagation Plotting the Dispersion Curves," ICCWCS 16 Conference, Proceedings 153-156, 2014, 150. Equation (1) represents the frequency equation for the propagation of symmetric waves, while Equation (2) represents the frequency equation for the propagation of asymmetric waves.

$$(\tan\beta h/\tan\alpha h) = -\left(4\alpha\beta k^2/(k^2-\beta^2)^2\right) \tag{1}$$

$$(\tan\beta h/\tan\alpha h) = -\left((k^2-\beta^2)/4\alpha\beta k^2\right). \tag{2}$$

$$\alpha^2 = \omega^2/c_1^2 - k^2; \tag{3}$$

$$\beta^2 = \omega^2/c_2^2 - k^2 \tag{4}$$

Figure 32:
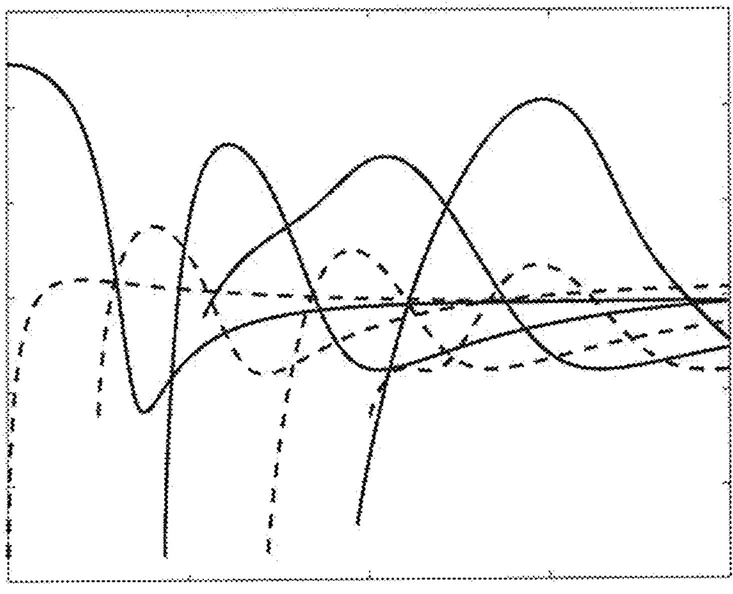
FIG. 32 illustrates theoretically calculated Lamb wave group velocity dispersion curves for a plate structure, in which the horizontal axis represents frequency and the vertical axis represents group velocity.

In the above Equations (1) and (2), k is the wave number, ω is angular frequency (ω=2πf, where f is frequency), $c_1$ and $c_2$ are phase velocities for the longitudinal and shear wave bulk mode velocities, and h is the half-thickness of the plate. When the equations are solved, the results are curves of the wave number as a function of frequency and mode. Solving the equations is known in the art. See, e.g., Graff, K., "Wave Motion in Elastic Solids," Dover Publications, 1991, pp. 59-62. The equations can be mathematically transformed by dividing the angular frequency by the wave number to give the phase velocity. Differentiating the angular frequency by the wave number ($c_g=d_\omega/dk$) results in the group velocity ($c_g$) curves, such as shown in FIG. 32. The group velocity/frequency curves can then be transformed into time/frequency curves by taking the propagation distance of the wave and dividing propagation distance by the group velocity of each frequency and mode in the theoretical curves.

Figure 33:
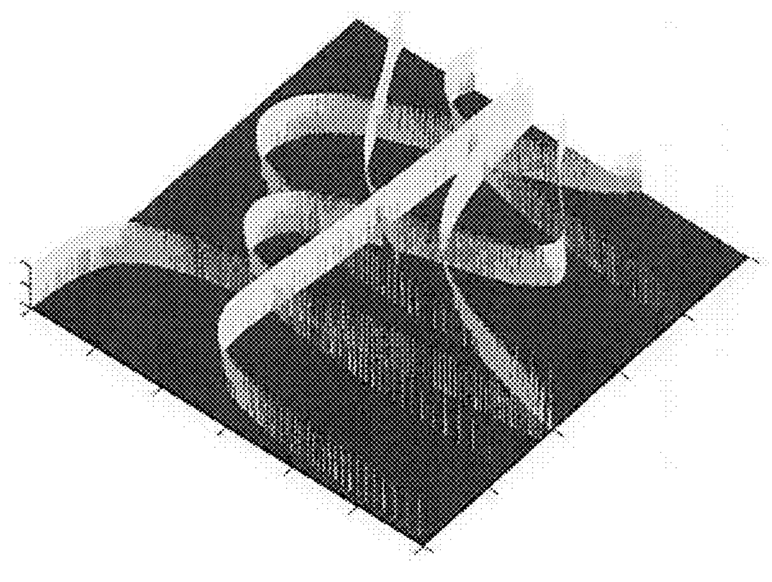
FIG. 33 illustrates a three-dimensional representation of the theoretically calculated Lamb wave dispersion curves for FIG. 32.

A 3D image of the time/frequency curve can then be generated by assuming a scalar value for each velocity point amplitude (e.g., an amplitude of one), and all other points have an amplitude of zero. In an embodiment, a value of one is assigned for each (x,y) (frequency, velocity) value calculated to create a 3D image. In this manner, a 3D Lamb wave theory image that simulates the wavelet transformation in time/frequency/amplitude is created. An example of a 3D Lamb wave theory image is illustrated in FIG. 33. In an embodiment, the image 3D Lamb wave theory image contains all the wave propagation characteristics for the structure, e.g., the plate. The 3D image of the time/frequency curve can be used for image correlation, since the image now has amplitude values for each pixel (point) in the image. This cross-correlation can be performed in other dispersion curve spaces, such as velocity and wave number.

The image of the group velocity Lamb mode theory dispersion curves (see FIG. 33) can now be digitally image cross-correlated against the image of the wavelet transform image generated from the experimental data, such as that of FIG. 31 discussed above.

An exemplary embodiment of image cross-correlation is described below. Generally, image cross-correlation according to exemplary embodiments eliminates the need for thresholding for signal arrival time measurements to perform source location calculations. Cross-correlation also allows for the detection of guided waves in a signal even if the signal-to-noise (SNR) is less than one. When the wavelet transform is performed, the signal that is propagating according to the theory will be observed in the wavelet transform image, because the noise will not propagate according to theory, and will be random. According to exemplary embodiments, the image cross-correlation with the theoretical (Lamb mode) dispersion curves will automatically identify the modes even in the presence of high noise levels.

Figure 34:
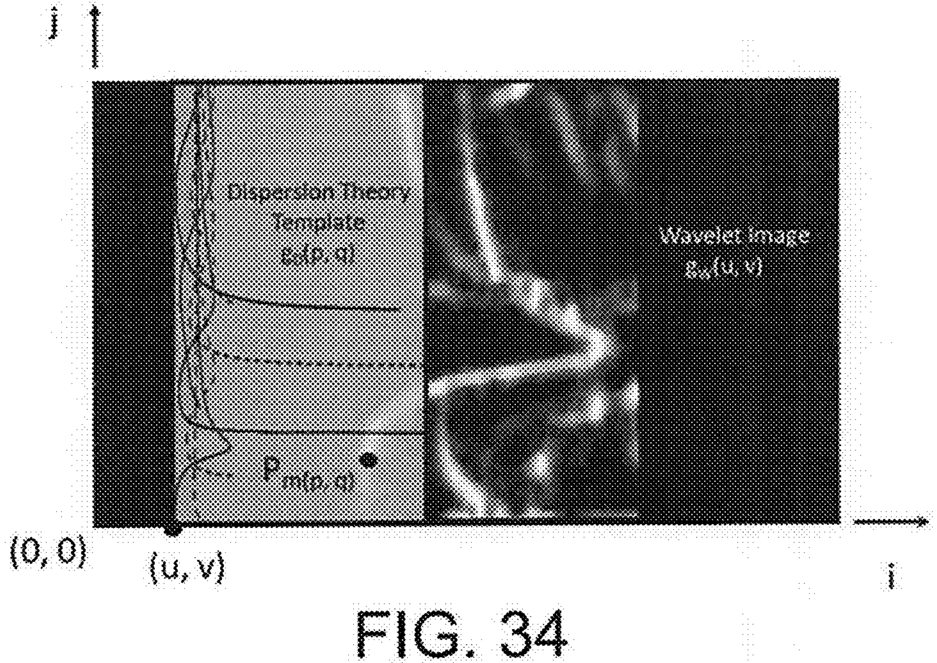
FIG. 34 illustrates a schematic representation and nomenclature of a cross-correlation of the image of the theoretically predicted dispersion curves in FIG. 33 and a wavelet transform image of the experimental data shown in FIG. 31, wherein the dark lines in the theory plot have an amplitude of one.

FIG. 34 shows schematically how image cross-correlation is performed according to an exemplary embodiment. The nonnormalized correlation coefficients are given by Equation (5):

$$\rho_{DW}(u, v) = \sum_{m=1}^{M} (g_D(p_m, q_m))(g_W(p_m + u, q_m + v)) \tag{5}$$

In Equation (5), $\rho_{DW}(u, v)$ are the correlation coefficients of each (u, v) location of the theoretical dispersion curve template (D) on the wavelet transform image (W), $g_D(p_m, q_m)$ are the points in the dispersion curve template, $g_W(p_m+u, q_m+v)$ are the corresponding points in the wavelet transform image that are within the boundaries of the template, and M is all the digital points in the template.

To perform the cross-correlation analysis in accordance with an exemplary embodiment, the theoretical dispersion curves (also referred to herein as the theoretical dispersion curve template) is placed over (or superimposed with) the wavelet transform image at point (u, v). Then, all the points in the theoretical dispersion curve template are multiplied by each matching point in the wavelet transform image and summed to determine the level of cross-correlation of the theoretical dispersion curve template and the wavelet transform image for a given (u, v) point, per Equation (5). The correlation curve is the plot of the correlation of the two images at each (u, v) point in the wavelet transform image.

Figure 35C:
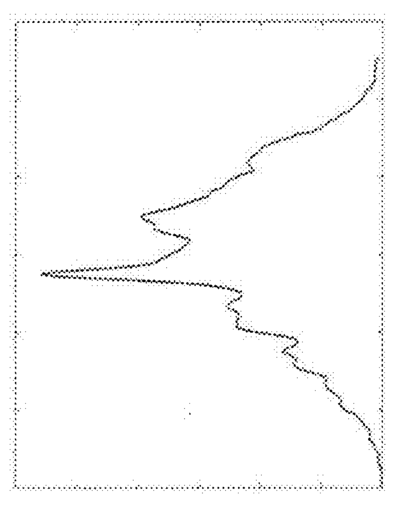
FIG. 35C illustrates a cross-correlation plot generated by a cross-correlation process of theoretical curves of FIG. 35A and the wavelet transform image of FIG. 35B, in which the cross-correlation plot of FIG. 35C has a horizontal axis representing time and the vertical axis representing non-dimensional correlation coefficients.
Figure 35B:
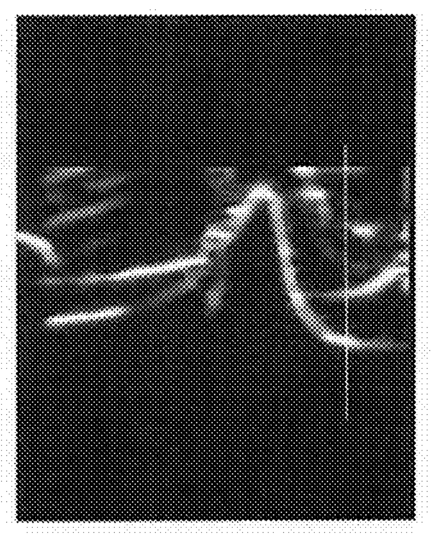
FIG. 35B illustrates a wavelet transform image with a slice represented by a horizontal line.
Figure 35A:
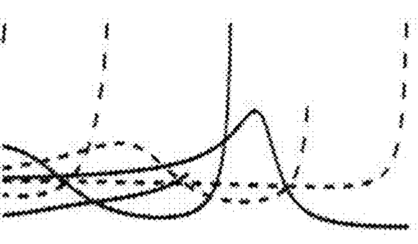
FIG. 35A illustrates theoretical dispersion curves.
Figure 36:
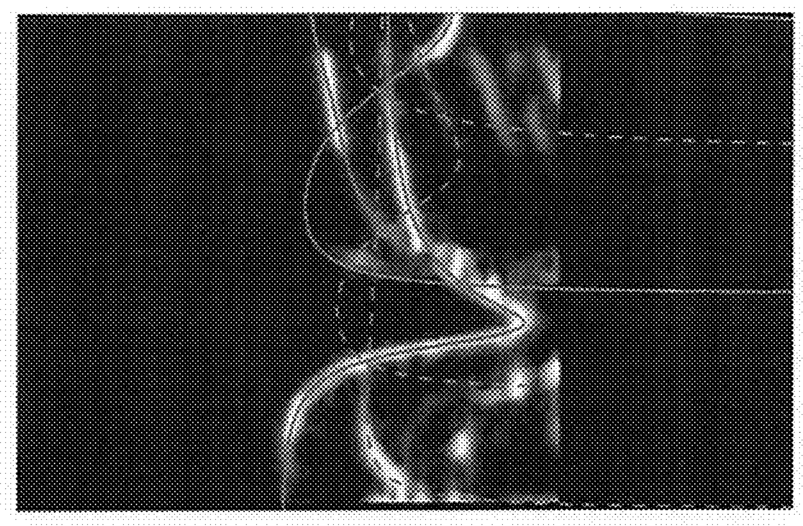
FIG. 36 illustrates theoretical dispersion curves overlaid on a wavelet transform image using the time at the peak in the FIG. 35C cross-correlation plot.

As noted above, FIGS. 35A, 35B, and 35C illustrate a cross-correlation process (of theoretical dispersion curves and a wavelet transform image) that results in a cross-correlation plot. In the cross-correlation plot of FIG. 35C, the horizontal axis represents time and the vertical axis represents non-dimensional correlation coefficients calculated using equation (5) above. FIG. 35A shows the distance corrected theoretical (e.g., Lamb mode) dispersion curve image. In an embodiment, the theoretical dispersion curve image is corrected for distance by dividing the distance of propagation by the velocity/velocities at that frequency. FIG. 35B shows the wavelet transform image of an experimental waveform. When the two images are cross-correlated, the resulting plot of the cross-correlation coefficients as a function of the time indexes is shown in FIG. 35C. When the theory dispersion curve image and the wavelet transform image match, a peak occurs in the cross-correlation plot, as shown in FIG. 35C. This peak shows in time (or waveform index) where the two images match, or in other terms, where the arrival of the signal occurs in the 2D waveform. This reduces the complicated 2D waveform in FIG. 30 to a simple peak search to determine the mode content in the signal. FIG. 36 shows the theoretically calculated dispersion curves overlaid (or superimposed) on the experimental data wavelet transform image based on the index peak in FIG. 35C. The theory matches the experimental data very closely, even though not all of the modes are present in the data. That is one of the strengths of the image analysis: any mode present will result in a correlation peak with the theoretical dispersion curve image. This automation of the mode identification is inherent in the image cross-correlation.

Figure 37A:
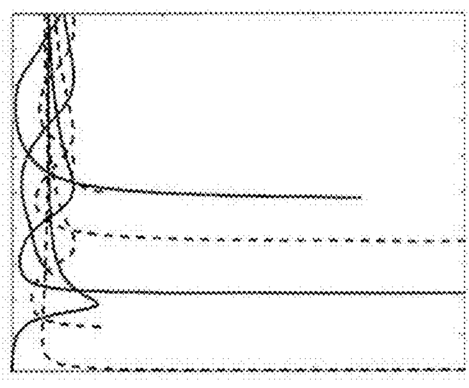
FIGS. 37A and 37B illustrate theoretical dispersion curves as a function of propagation distance, in which the horizontal axes represents time and the vertical axes represents group velocity, with the range of the horizontal time axes being the same for both plots.
Figure 37B:
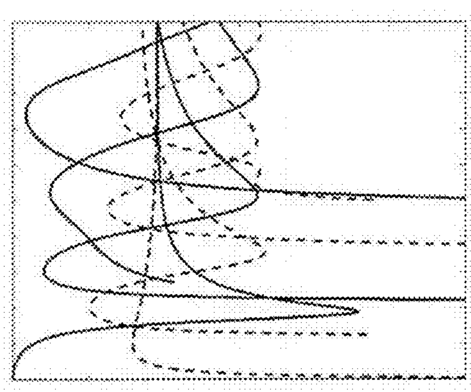

According to another embodiment, where the propagation distance is unknown, Lamb wave theory time/frequency/amplitude plots are calculated for multiple distances over the range of concern and a library of images created, for example, at propagation distances of 6, 12, 18, 24 . . . inches, although it is understood that different increment dimensions and units may be selected. According to an embodiment, this is done by dividing each of the propagation distances by the velocities in the theoretical dispersion curve—an efficient way to create the theoretical dispersion curve image library and simulate the wave propagation for the various propagation distances using images. This procedure is a much more computationally efficient approach over using FEA to create the 2D waveforms for the cross-correlation for each propagation distance. FIGS. 37A and 37B, discussed below, illustrate an embodiment in which the wavelet transform image is varied based on different propagation distances.

FIG. 37A illustrates the theoretical dispersion curves after a short propagation distance, while FIG. 37B illustrates the curves after a longer propagation distance. Both sets of curves have the same time scale. Comparing FIGS. 37A and 37B, it is seen that the theoretical dispersion curves spread as the propagation distance increases. According to an embodiment, each of the images in the library is cross-correlated against the experimental wavelet transform image. The Lamb mode theoretical dispersion curve image that has the largest cross-correlation peak with the wavelet transform image out of the library of images is identified as the propagation distance for the wave/signal. An iterative 'root' (or refinement) finding approach can be implemented to minimize the correlation time. For example, the image correlations can be performed over 12-inch intervals, the distance that gives the highest correlation is selected, and the correlations over 6-inch intervals around that distance are performed, and so on until the required ranging accuracy is attained. The library can also contain images that incorporate various plate thicknesses as well to account for changes due to corrosion or pitting.

In another exemplary embodiment, the ranging determination can also be performed by using the Lamb wave library of theoretical dispersion curve images in association with artificial intelligence. Rather than cross-correlating the theoretical dispersion curve images with respect to the wavelet transform image, the theoretical dispersion curve images are used as a training set for a neural network or other artificial intelligence software approach. The wavelet transform image of the captured waveform is then presented to the neural network for analysis and determination of which theoretical Lamb mode dispersion curve image propagation distance provides the best fit to the wavelet transform image of the experimental data.

According to an embodiment, the relative amount of energy in each mode can be determined by summing the wavelet coefficients of the wavelet transform image (calculated using Equation (5) above) along each theoretical mode line that has been overlaid on the signal via the image cross-correlation or AI analysis, as shown in FIG. 36. This provides an autonomous way to determine if a mode contains enough energy to provide a good source location or criticality measurement by looking at the relative energies between the modes. One may find a good source location by determining the amount of energy in the mode which allows a strong identification of the mode which means one can determine arrival times of the mode accurately which are then fed into the location calculation. (See, e.g., the delta t variable in equation 6.) One must know the arrival time at each sensor, and know that an arrival time is measured that is above the noise in the signal. The energy at the point in the wavelet transform determines if that tis a good measurement or not, and one then finds whether that point aligns with the theoretical dispersion curves that have been fit to the wavelet transform using the image correlation analysis. The relative energy ratios between the modes will also provide source information for criticality analysis. For example, a crack that has grown down through the plate near the mid-plane of the plate thickness will excite mainly the symmetric modes, whereas a crack grown near the surface of a plate will excite mainly the flexural modes due to the asymmetric nature of the source. The ratio of the relative energies of the modes will change as a function of source depth and orientation.

A more detailed discussion of exemplary embodiments of sensors and sensor arrays is now provided. Conventional methods of passive monitoring, such as acoustic emission (AE) and modal acoustic emission (MAE) use widely spaced transducer arrays. Due to dispersion, the wave can become severely distorted as the wave propagates. Determining if signals from two widely spaced transducers were excited by the same source can become extremely difficult. Using an array of relatively closely spaced transducers means that the signals between the transducers in the array are very similar, making the analysis of the signals much easier. The use of the wavelet transform also means that the analysis is performed in group velocity space, eliminating the errors that phase shifts can cause when conventional UT analyses are performed using array-based sensors. Other patents (e.g., U.S. Pat. No. 11,249,054) try to adjust for phase shift errors caused by dispersion by limiting the transducer spacing to less than one wavelength, which is difficult when dealing with dispersive broadband signals because each frequency will have a different wavelength.

When approaching the analysis using wavelet transform image processing, the spacing limitation is no longer an issue as to phase shift. Thus, spacing of the array transducers can be performed based on the location accuracy or monitoring range required, with no concern of phase shifts as a function of frequency occurring within the waveform.

According to an embodiment, to determine source location, an array of sensors is used to capture the signal over the known sensor spacings within the array. An example of an array characterized by a 2×4 arrangement illustrated in FIG. 38. The time differences between the various elements are used to calculate the angle of incidence using Equation (8) below:

$$\theta = \sin^{-1}\left(\frac{c\Delta t}{l}\right) \tag{6}$$

In Equation (6), θ is the angle of incidence, c is the propagation velocity of the mode and frequency used in the analysis, Δt is the time difference measurement between any two of the sensors and l is the spacing between the pair of sensors used for the incidence angle calculation.

Figure 38:
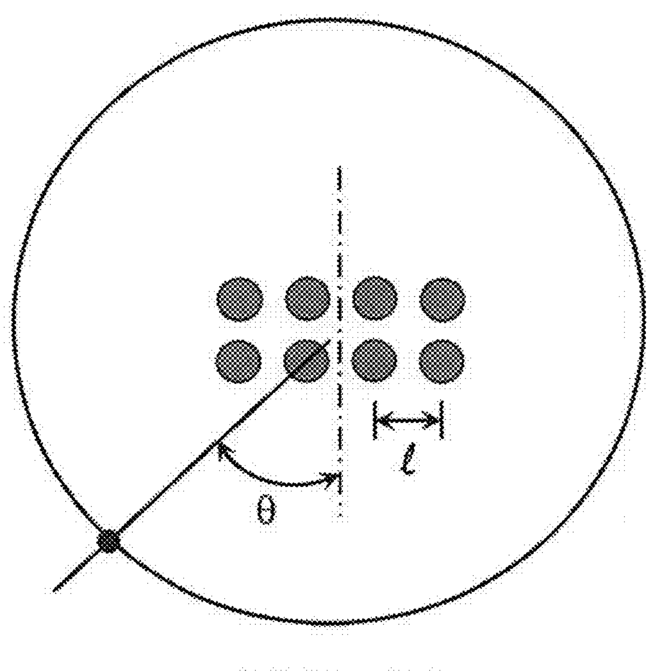
FIG. 38 illustrates a representative sensor array, an angle of incidence ray, and a ranging circle that are used to determine the location of a source according to an exemplary embodiment.

The array is not limited in shape, spacing, dimensions, or quantity of sensors to that shown in FIG. 38. The array can be, for example, circular, rectangular, or non-geometric. Spacing can be based on location accuracy required for the distance around the array to be monitored.

In other examples of incidence angle calculations using guided waves, such as in U.S. Pat. No. 11,249,054, sensor spacing must be less than one wavelength to ensure that phase wrapping does not occur when performing the time difference measurement between phase points in the capture waveforms. In contrast, in accordance with exemplary embodiments described herein, inter-element spacing when using 3D wavelet transform images can be greater than one wavelength because phase shifts between the sensors (also referred to as elements) due to the dispersion do not affect the time difference measurements, because the analysis is performed in group velocity space.

Figure 39:
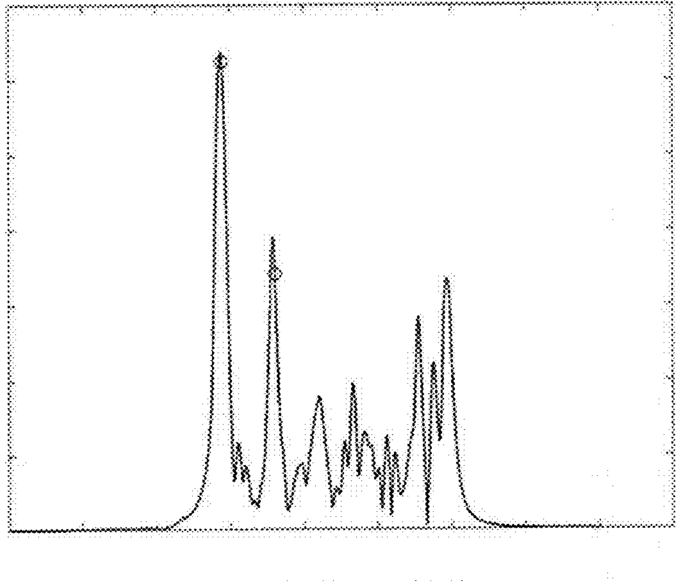
FIG. 39 is a plot for a frequency slice from the wavelet transform image of FIG. 31 shown at the location of the horizontal line in FIG. 31, in which the horizontal axis of the plot represents time and the vertical axis of the plot represents the amplitudes of the wavelet transform image coefficients.

In an embodiment, the time difference of arrival between the transducers is found by taking a frequency 'slice' of the wavelet transform image for each of the sensor responses in the array The horizontal line on FIG. 31 shows where the frequency slice represented in the plot of FIG. 39 was taken out of the wavelet transform image. The approximate arrival of the mode(s) within each slice is determined by the image correlation of the theoretical dispersion curve image and the wavelet transform image of the experimental waveform data. For the frequency slice in plot of FIG. 39, the circles on the cross-correlation curve show the theoretical mode position from the cross-correlation of the wavelet transform image and the dispersion curve theory template, as shown in FIG. 36. The theory (circles) and experiment do not match perfectly, i.e., the circles do not fit directly on the maximum value of the peaks, due to variations between the theoretical dispersion curve images and the wavelet transform images generated from the experimental data. By using the location of the theoretical arrival of the mode(s) based on the theory, the peak of the wavelet transform slice that is closest to the theoretical location can be found to further improve the arrival time analysis. The difference in the arrival times of the various modes and frequencies are then used to calculate the angle of incidence using Equation (6). The distance of propagation (ranging) of the signal is found from the image cross-correlation discussed earlier. The source can be at any point on a circle with a radius of the ranging distance found from the image correlation.

FIG. 38 shows the ranging circle. To uniquely determine the source location, the intersection of the angle of incidence ray and the ranging circle gives the location of the source, also shown in FIG. 38. This approach uses no threshold to determine the arrival times, or assumptions about which mode is being used. The image cross-correlation between theory dispersion curve image and the experimental data wavelet transform image automatically determines which modes are present and used in the incidence angle calculations. The analysis can use many different frequencies and modes (arrival time detection and velocity selection) to perform the location analysis. These can be used to determine the quality of the data from the signal, e.g., a determination of whether all the source location calculations result in the same location. A confidence level can be assigned based on the statistical quality of the data to alert the user as to the reliability of the captured data and resulting analysis.

The use of closely spaced sensor arrays has been shown. More widely spaced single sensor placements can benefit from the application of the image cross-correlation technique as well to identify and extract wave modes in the signals from the widely spaced sensors to perform mode identification and source location.

Figure 40:
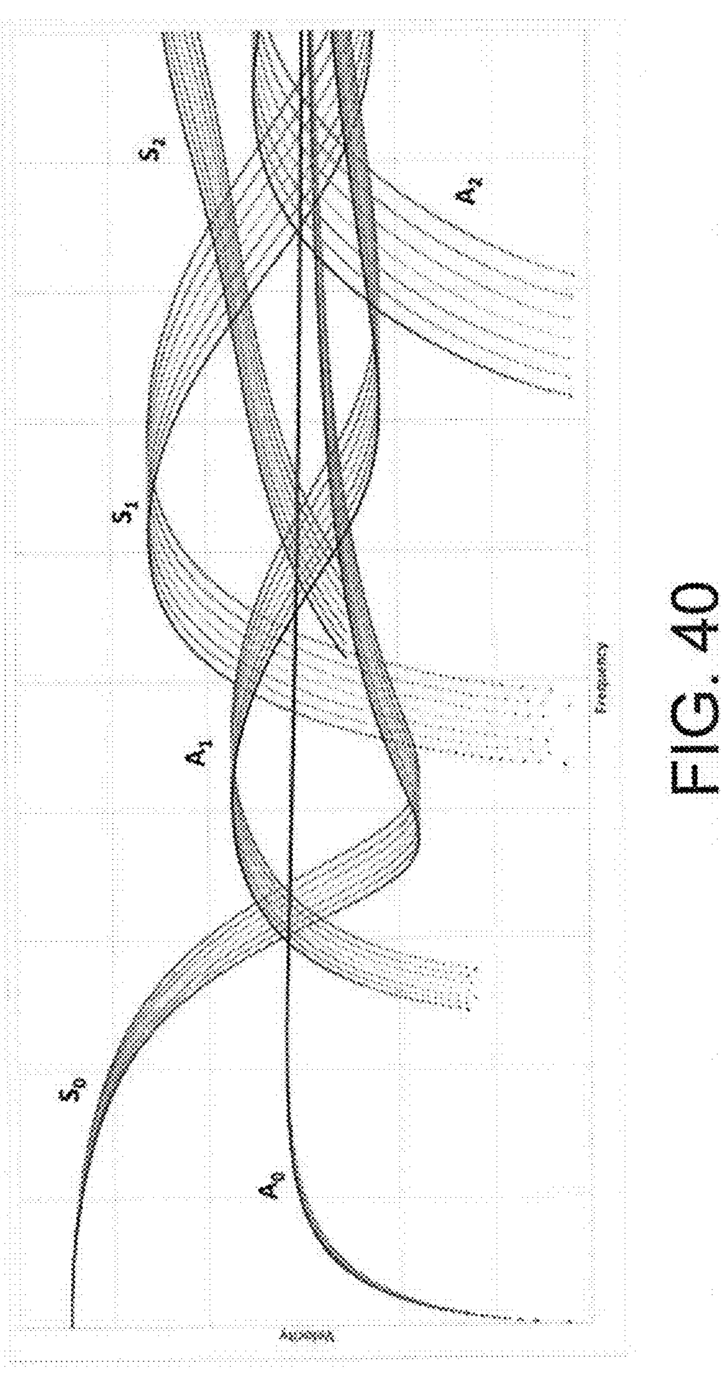
FIG. 40 illustrates Lamb mode theoretical dispersion curves for different thicknesses of plates, in which the horizontal axis represents frequency and the vertical axis represents velocity.

According to an embodiment, image cross-correlation can be used to detect plate thickness changes. When the thickness of a plate changes due to an effect such as corrosion, the velocities of the dispersion curves shift as a function of frequency. The effect is shown in FIG. 40. In FIG. 40, seven dispersion curves have been calculated from Equations (1)-(4) for seven different plate thicknesses, respectively. The curves show the velocity relationship between the various plate thicknesses. As the plates become thinner, the curves shift to the right. To determine if plates have thinned, sets of dispersion curve images for various thicknesses can be cross-correlated against the wavelet transform image of the signal. The theoretical dispersion curves that give the highest cross-correlation with the wavelet transform image determine the average thickness of the plate over the propagation distance of the measurement. This is a non-threshold, automated approach to determine plate thickness variations.

Figure 41:
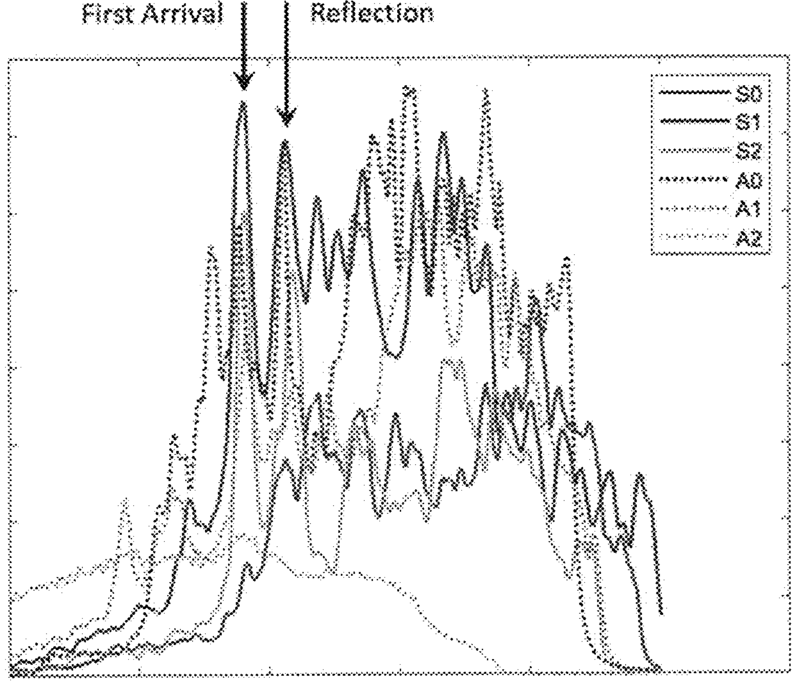
FIG. 41 illustrates cross-correlation plots for a wavelet transform image vis-à-vis each individual time synched Lamb wave dispersion curve modes, in which the horizontal axis represents time and the vertical axis represents the cross-correlation coefficients for each of the Lamb wave dispersion curve modes.

Determining the first arrival of the signal is difficult when reflections or noise are contained in the signal. By individually cross-correlating each of the modes that are time referenced to each other according to the Lamb wave dispersion curve plot in FIG. 32 with the wavelet transform image of a signal, multiple correlation plots are created, as shown in FIG. 41. The first arrival of the signal can then be determined by finding where the point occurs where the peaks in each of the plots first line up in time (or index), represented by the horizontal axis, in the plot. In FIG. 41, cross-correlation plots for multiple modes are shown for a signal containing reflections. When the image cross-correlation using all the modes at once is performed, the peak of the cross-correlation can be shifted to an incorrect arrival time due to the peak occurring later in the cross-correlation due to the reflection. To overcome this, an image of each mode, with the correct time delay for the propagation distance, is cross-correlated with the wavelet transform image. FIG. 40 shows a plot with six mode correlations. The first arrival is determined by finding the first instance where multiple peaks in the cross-correlation plot are closely located, as shown for example in FIG. 41, in which the first arrival peak and the first reflection peak are labeled. Locations of similar arrival times after this will be due to reflections.

Figure 42B:
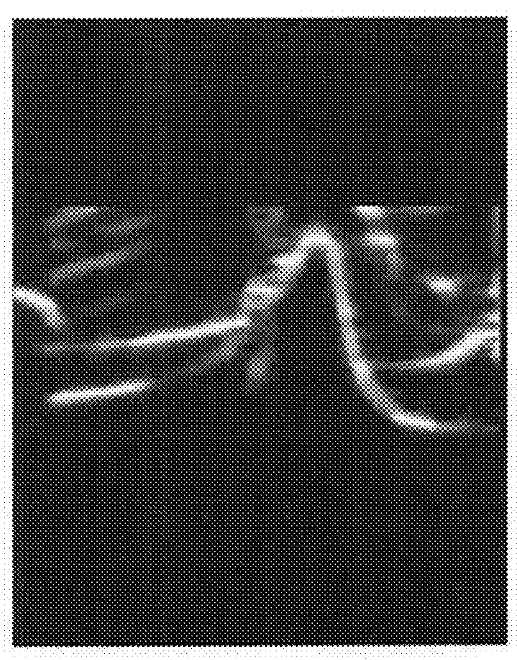
FIGS. 42A and 42B illustrates an original and enhancement, respectively, of a wavelet transform image using neural networks analysis to remove noise, wherein the horizontal axis represents time, the vertical axis represents frequency, and the shading represents amplitude.
Figure 42A:

According to additional embodiments, digital image enhancement can be used to improve the images for the analysis. FIG. 42A shows a wavelet transform image of a guided wave. Due to the source orientation, sensor response and source frequency content, various frequency ranges may not have a large response. The wavelet transform image may contain the response of these frequencies, but their amplitude within the wavelet transform images is so small relative to the larger amplitudes that the responses are lost in the scaling of the image. FIG. 42B shows the image after it has been scaled by selective pixel stretching. The amplitudes of the higher frequencies have been enhanced by selectively increasing them frequency-by-frequency. In this example, the average image pixel amplitude of the entire image is calculated by summing all the pixel amplitudes, and then dividing by the total number of pixels. The average amplitude of each frequency slice, as shown in FIG. 39, in the image is calculated by summing the amplitudes of a frequency slice, and then dividing by the number of samples in the slice. The average amplitude of the entire image is then divided by each amplitude average of each slice to calculate a multiplier for each frequency slice. All the points in each frequency slice are multiplied by that frequency's multiplier to increase or decrease the pixel amplitudes to 'flatten' the image. If a frequency slice has an average amplitude that is much greater than the image average, the multiplier calculated will be less than one, and when multiplied by the pixel amplitudes in the slice, will decrease them. The opposite is true if the amplitude average of the frequency slice is less than the amplitude average of the frequency slice. The multiplier calculated will be greater than one, and the subsequent multiplication will increase the amplitude of the pixels in that frequency slice. By selectively increasing or decreasing the amplitudes of slices this way, features that cannot be observed in FIG. 42A can be seen in FIG. 42B.

Figures 43A, 43B:
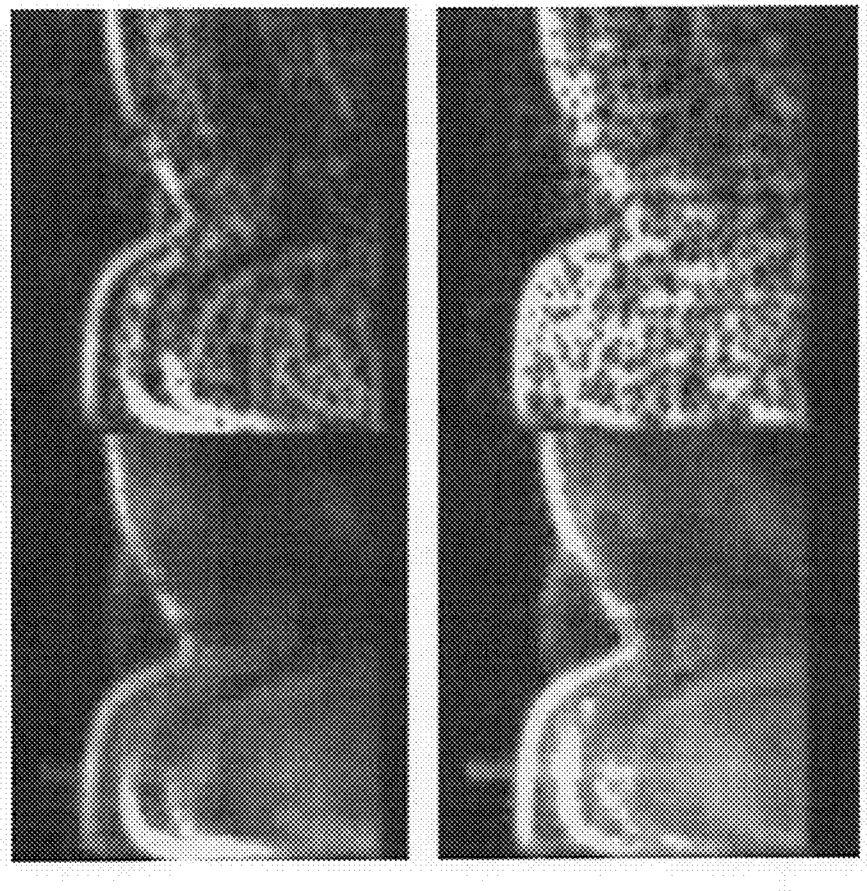
FIGS. 43A and 43B illustrate the effect of the use of neural networks to enhance wavelet transform images containing noise, wherein the horizontal axis represents time, the vertical axis represents frequency, and the shading represents amplitude.

Images can be enhanced using a neural network (NN). Examples of image enhancement according to an exemplary embodiment are illustrated in FIGS. 43A and 43B. A NN can be trained using theoretical, FEA, or wavelet transforms from experimental data, generated dispersion curves. The trained NN is then used to identify dispersion curve shapes in the experimental data and enhances those shapes to improve the image quality. In FIGS. 43A and 43B, the upper row represents the unenhanced experimental wavelet transform images. The lower row of FIGS. 43A and 43B shows the enhanced images where the NN has removed noise from the wavelet transform images.

Digital signal conditioning is also much simpler and wide-ranging when performed in the wavelet transform image space. In an embodiment, filtering can be used on digital waveforms to eliminate or attenuate frequency bands to remove noise or unwanted frequencies. Filtering can be performed by simply zeroing out the portion of the image no longer wanted, with no edge effect issues typically encountered in Fast Fourier Transform (FFT) approaches to digital filtering of the wave form, a Finite Impulse Response (FIR) filter, or an Infinite Impulse Response (IIR) filter. Sensor response can be removed from the image by simple division along each mode, as opposed to the errors of infinity that can occur when deconvolution is performed using an FFT approach. The images can be enhanced with well-known image analysis techniques, such as filtering, edge detection and sharpening, pixel stretching or neural networks to improve the analysis.

The methods, systems, and approaches described herein can be used in, for example and without limitation, plate-like structures, such as tanks, pipes, pressure vessels, aircraft frames, ship hulls and rocket motor casings. The techniques described herein can be used to both passively listen for flaw growth in real time or be used as an active inspection technique to detect and characterize flaws. The image cross-correlation analysis extracts the wave modes and their relative energies which contain detailed criticality information about the source.

Figures 44, 45A:
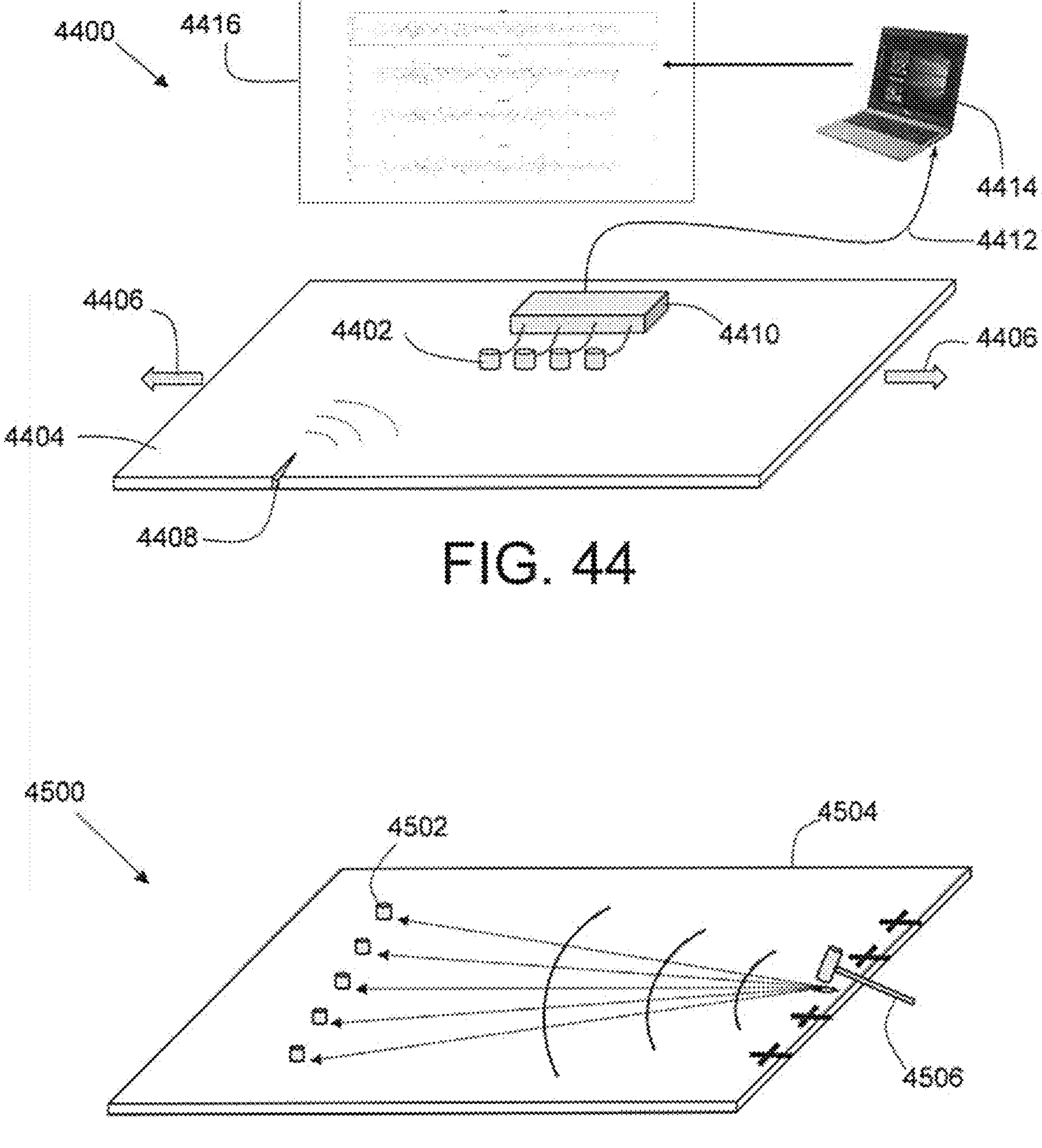
FIG. 44 illustrates an embodiment of the technology for the passive monitoring of a plate-like structure.
FIGS. 45A, 45B, and 45C illustrate an embodiment of the technology for the active inspection of a plate-like structure.

FIG. 44 shows an example of a system 4400 constructed to carry out passive monitoring. A sensor array 4402 is coupled to a structure 4404, embodied in system 4400 as a plate. The structure 4404 is stressed by an applied load, as shown by the arrows 4406. A growing flaw 4408 is shown on the edge of the plate 4404. As the flaw 4408 grows due to the applied load, energy from the flaw 4408 growth is released, and part of this energy is converted into a propagating wave. The surface displacement of the wave is converted into a voltage by each sensor in the array 4402 using piezoelectric, fiberoptic, capacitive, or other sensing elements. Electronics 4410 near the array 4402 amplify and filter the analog voltage signal. Analog-to-digital converters convert the analog voltage signal to a digital representation, which is sent over a communications cable 4412, such as Ethernet, to a computer 4414, where the data is stored, analyzed and displayed 4416. This embodiment reduces noise due to the short analog cables, as well as simplifies installation since the long coaxial cables used in conventional passive monitoring systems (AE and MAE) for each sensor are eliminated. The digital signals are then image correlation analyzed to determine and extract mode content to identify the mode. The array configuration shown in FIG. 44 results in the waveforms from each sensor being very similar. This makes analysis more robust. In conventional AE and MAE passive monitoring systems that use widely spaced single element transducers, the complex wave propagation can lead to analysis errors due to the dispersion, multiple modes and reflections modifying the signal to a high degree over large propagation differences between sensors. Multiple arrays can be mounted on a structure to provide increased coverage as well as source identification and location between the arrays for increased verification of the criticality of the source.

The automation of mode detection simplifies the use of guided waves for active inspections. In conventional ultrasound approaches, single frequency pulses are used to simplify the analysis of the propagating ultrasonic wave. Typically, an ultrasonic wedge is used to insert the signal into the structure to try to excite a single mode. Using image analysis, mechanical sources, such as a hammer tap or a particle impact, can be used to excite a wave in a structure. The image cross-correlation will then automatically identify the mode(s) that have been excited, and the analysis can incorporate the mode propagation velocities by frequency into any flaw detection analysis.

Figure 45B:
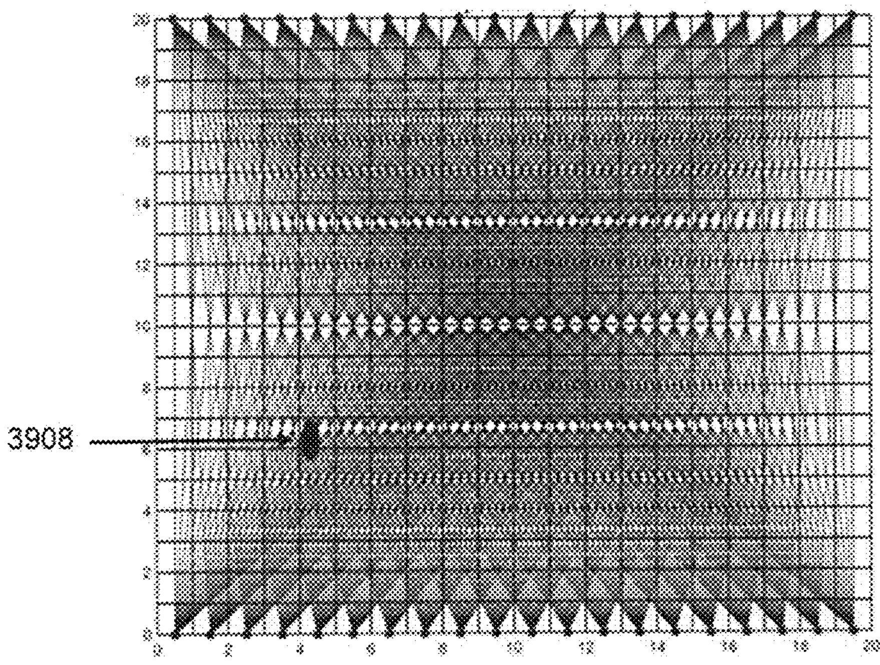
Figure 45C:
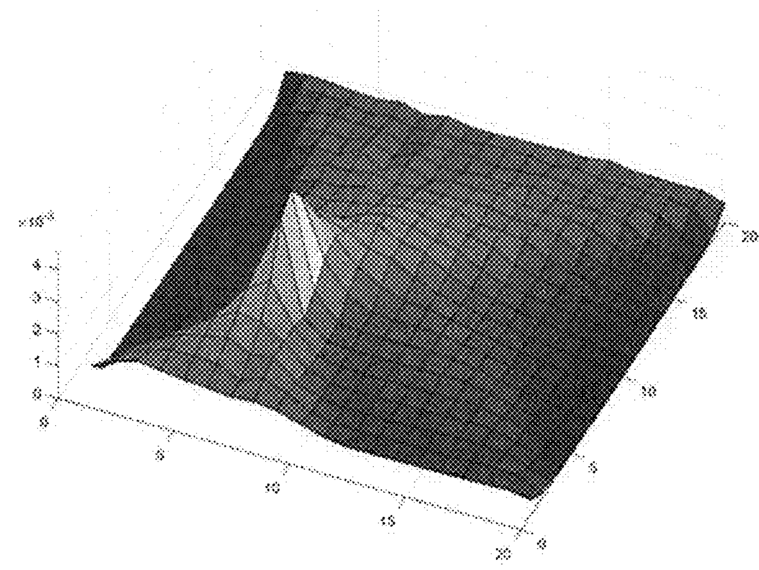

FIGS. 45A-45C show an embodiment of a system 4500 designed for the active use of the image cross-correlation. In the embodied system 4500 of FIGS. 45A-45C, a sensor array 4502 is placed on a structure 4504, which in FIG. 45A is embodied as a plate. A source 4506 is used to create a propagating wave in the plate 4504. In this example a hammer tap (as the source 506) is shown, but other sources such as ultrasonic transmitting sensors, particle impacts, or electric shock sources can be used. Multiple source locations are created as shown by the x's in FIG. 45A. FIG. 45B shows the direct propagation rays that are created by twenty sources and twenty receiving transducers or sensors. The wavefront propagating along the rays will interact with any flaws in the plate 4504 (e.g., the oval 3908 in FIG. 45B shows a possible flaw location), and each of the waves captured at each of the sensors are image processed to identify and extract the modes that have been altered by the flaws. The image cross-correlation mode identification and extraction will automatically determine the modes that are contained in the signal. As opposed to conventional ultrasound techniques in plate-like structures that use single frequency sources, shaped pulses, and wedges to control the modes excited, the image cross-correlation technique of embodiments described herein analyzes the modes contained in the signal over a broad frequency spectrum. The measurements can then be input into tomography software which will then image the condition of the plate, as shown in FIG. 45C. Flaws that will affect the wave propagation include cracks, corrosion, plate thinning, and changes in material properties.

Persons of skill in the art will appreciate that through the use of an image cross-correlation process, identification of the wave modes in a guided wave signal can now be automated without the use of assumptions—that has never been done to a high degree of robustness because of the complexity of the guided wave in 2D space. The Lamb mode dispersion curves, when calculated using either Lamb mode theory for simple plates, or FEA for complex plates, contain all of the propagation characteristics of the wave in that structure in the image—so an entirely new process for waveform analysis is provided. When cross-correlated with the wavelet transform of an unknown signal, the correlation automatically identifies the wave propagation characteristics in the Lamb mode dispersion curves contained in the sensed or detected (unknown) signal, and to what degree. This is done without assumptions and in a deterministic fashion, i.e., causally determined and not subject to random chance or choice. It also overcomes reflections that can cause erroneous results in the analysis of an unknown signal. By doing so, we can now identify the criticality of sources to a much higher degree from the information contained in the modes of the waveform. This application describes exemplary uses for image enhancement to guided wave wavelet transform images, and the use of the cross-correlation of individual wave modes to identify the first arrival of a signal that contains reflections.

Persons of skill in the art will also understand and construe the terms “automating”, “automated” and “automation” to indicate use of a programmed computer or processor and software prepared in accordance with the present invention to accomplish the signal processing and image processing tasks described above and illustrated in the attached figures, and more specifically, subjecting the dispersion curves described above to mathematical changes so they can be compared to the wavelet transform images described above and illustrated in the attached figures.

Benefits, other advantages, and solutions to problems have been described above with regard to specific embodiments. However, the benefits, advantages, solutions to problems or needs, and any feature(s) that may cause any benefit, advantage, or solution to occur or become more pronounced are not to be construed as a critical, required, or essential feature of any claim unless recited in the claim.

For example, the specification describes and the drawings illustrate embodiments of Applicant’s work in developing a more accurate, reliable and economical non-destructive, non-invasive system and method for automatically locating and characterizing defects in fluid container structural members (e.g., a tank wall or bottom). However, the claims should not be construed to be limited to embodiments that encompass or attain each of these features or advantages, unless expressly called for by the claim.

As used herein, the terms “comprises,” “comprising,” “includes,” “including,” “has,” “having” or any other variation thereof, are intended to cover a non-exclusive inclusion. For example, a process, method, system, or apparatus that comprises a list of features is not necessarily limited only to those features but may include other features not expressly listed or inherent to such process, method, system, or apparatus. Also, the use of “a” or “an” are employed to describe elements and components described herein. This is done merely for convenience and to give a general sense of the scope of the disclosure. This description should be read to include one or at least one and the singular also includes the plural unless it is obvious that it is meant otherwise. If a specific number of an introduced claim element is intended, such intent will be explicitly recited in the claim, and in the absence of such recitation no such limitation is present. For a non-limiting example, as an aid to understanding, to the extent that the following appended claims contain usage of the introductory phrases “at least one” and “one or more” to introduce claim element, the use of such phrases should not be construed to imply that the introduction of a claim element by the indefinite articles “a” or “an” limits any particular claim containing such introduced indefinite article and claim element to embodiments containing only one such element, even when the same claim includes the introductory phrases “one or more” or “at least one” and indefinite articles such as “a” or “an”; the same holds true for the use in the claims of definite articles. As used herein, the term “and/or” means either or both (or any combination or all of the terms or expressed referred to).

The various components and features of the above-described exemplary embodiments may be substituted into one another in any combination. It is within the scope of the invention to make modifications necessary or desirable to incorporate one or more components and features of any one embodiment into any other embodiment. One skilled in the art, using the disclosures provided herein, will appreciate that various steps of the methods can be omitted, rearranged, combined, supplemented with additional steps, and/or adapted in various ways.

The foregoing description of the exemplary embodiments and exemplary methods has been provided for the purpose of explaining principles of the invention and its practical application, thereby enabling others skilled in the art to understand the invention for various embodiments and with various modifications as are suited to the particular use contemplated. The description is not necessarily intended to be exhaustive or to limit the invention to the precise embodiments disclosed.

The flowchart and block diagrams in the Figures illustrate the architecture, functionality, and operation of possible implementations of systems, apparatuses, and methods according to various embodiments of the present embodiments. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images; and wherein the comparing comprises applying an artificial intelligence model trained with the theoretical dispersion curves.

2. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images;

wherein the comparing comprises cross-correlation;

wherein the cross-correlation comprises, for each of a plurality of the theoretical dispersion curves, multiplying matching points of the theoretical dispersion curve and the wavelet transform to calculate products, and adding the products together to provide a sum associated with the theoretical dispersion curve; and said method further comprising analyzing the respective sums of the plurality of theoretical dispersion curves as a function of time to identify a wave arrival time relative to a sensor.

3. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images;

wherein the comparing comprises cross-correlation;

wherein the cross-correlation comprises, for each of a plurality of the theoretical dispersion curves, multiplying matching points of the theoretical dispersion curve and the wavelet transform to calculate products, and adding the products together to provide a sum associated with the theoretical dispersion curve; and said method further comprising analyzing the respective sums of the plurality of theoretical dispersion curves as a function of time to identify a wave arrival time relative to a sensor; and further comprising graphically representing the results of the cross-correlation and selecting an initial peak as a wave arrival time relative to a sensor.

4. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images; and including use of individual mode correlations to sort out direct arrivals from reflections and overcome reflections.

5. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images; and using group velocity inherent in the wavelet transform image analysis for the arrival time difference calculations in a sensor array analysis to overcome the effects of phase shifts due to the dispersive wave propagation in plate-like structures.

6. A method comprising: detecting a signal propagating in a structure using a sensor positioned on the structure, the signal emanating from and/or interacting with a defect in the structure; converting a waveform of the signal to a wavelet transform image;

accessing a plurality of theoretical dispersion curve images associated with the structure;

automatically comparing the wavelet transform image with the theoretical dispersion curve images; and determining flaws in plates by correlating different sets of dispersion curves calculated to include various flaws, such as plate thinning and cracking, and comparing the theoretical dispersion curves to the wavelet transform of the unknown signal to determine the flaw type and criticality.

* * * * *